(12) United States Patent
Takahashi et al.

(10) Patent No.: US 6,424,429 B1
(45) Date of Patent: Jul. 23, 2002

(54) FILE SYSTEM AND A RECORDING MEDIUM WITH A PROGRAM USED IN THE SYSTEM STORED THEREIN

(75) Inventors: Hiroshi Takahashi, Kanagawa; Kiyoshi Suzuki, Tokyo; Takashi Harada, Kanagawa; Atsushi Hanai, Kanagawa; Hirofumi Endo, Kanagawa, all of (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/191,382

(22) Filed: Nov. 13, 1998

(30) Foreign Application Priority Data

| Nov. 14, 1997 | (JP) | ............................................. 9-313051 |
| Nov. 14, 1997 | (JP) | ............................................. 9-313055 |
| Nov. 14, 1997 | (JP) | ............................................. 9-313056 |

(51) Int. Cl.$^7$ .............................. G06F 15/00; G06K 1/00
(52) U.S. Cl. ........................ 358/1.16; 358/403; 707/500
(58) Field of Search .............................. 358/1.15, 1.16, 358/403, 448; 707/1, 10, 100, 3, 500, 200, 205

(56) References Cited

U.S. PATENT DOCUMENTS 6,029,160 A * 2/2000 Cabrera et al. ................ 707/1
6,115,739 A * 9/2000 Ogawa et al. ............... 358/403
6,144,969 A * 11/2000 Inokuchi et al. ............ 707/200

FOREIGN PATENT DOCUMENTS

| JP | 5-35737 | 2/1993 |
| JP | 6-119393 | 4/1994 |
| JP | 9-34905 | 2/1997 |

* cited by examiner

*Primary Examiner*—Kimberly A. Williams
(74) *Attorney, Agent, or Firm*—Oblon, Spivak, McClelland, Maier & Neustadt, P.C.

(57) ABSTRACT

According to the a processing command for the copy function or the like, the copying machine 11 sends the processing conditions like the user ID or the coping density as appended data along with the document data to the server 12 through the Intranet. The server 12 accumulates the document data in the infinite memory server 13 and Web IMS 16 and simultaneously stores the accumulated addresses and other appended data in relation to each of the user IDs in a retrieval possible way in the database inside the hard disk drive 43. When the document data is to be reused, the server 12 displays the appended data so that it can be easily selected and sends the selected appended data along with the document data to the copying machine 11.

46 Claims, 35 Drawing Sheets

| 26H | REGISTERED NUMBER DATA |
|-----|------------------------|
| 27H | DOUBLE-SIDED MODE (DATA) |
| 28H | DIVISION MODE (DATA) |
| 29H | INTEGRATION MODE (DATA) |
| 2AH | PRINT MODE (DATA) |

| 31H | FEED PAPER POSITION DATA |
|-----|--------------------------|
| 32H | AUTO-DENSITY SELECTION MODE |
| 33H | DENSITY SETTING DATA |
| 34H | EDIT MODE (DATA) |
| 35H | SIZE CHANGE MODE (DATA) |

FIG.19

BYTE NUMBER

| 27 | 03 | $d_1$ |
|----|----|----|

| $d_1$ | CONTENTS OF DATA |
|----|----|
| 00 | RESET |
| FF | NOT FIXED |

FIG.20

BYTE NUMBER

| 27 | 04 | $d_1$ | $d_2$ |
|----|----|----|----|

| $d_2$ | CONTENTS OF DATA |
|----|----|
| 00 | CANCEL |
| 02 | SETTING IS OVER |
| FF | NOT FIXED |

| $d_1$ | CONTENTS OF DATA |
|----|----|
| 00 | RESET |
| 02 | DOUBLE-SIDED TO DOUBLE-SIDED |
| 03 | BOOK TO DOUBLE-SIDED |
| 04 | BOOK TO BOOK |
| 05 | DOUBLE-SIDED TO SINGLE-SIDED |
| 06 | SPREAD PAGE TO SINGLE-SIDED |

| YEAR ○○○○ | Calendar | | RETRIEVAL | SCREEN-OUT | CALL | ↓ ↑ ↟ ↡ |
|---|---|---|---|---|---|---|
| MONTH ○ | SUNDAY | MONDAY | TUESDAY | WEDNESDAY | THURSDAY | FRIDAY | SATURDAY |
| | 26 | 27 | 28 ☐☐☐☐ | 29 | 30 | 31 | 1 |
| | 2 | 3 ▦▦ | 4 | 5 ☐ | 6 | 7 ☐☐☐☐ | 8 |
| | 9 | 10 ☐☐☐ | 11 | 12 | 13 | 14 ☐☐☐☐ | 15 |
| | 16 | 17 ☐☐☐☐ | 18 ☐☐☐☐ ☐☐ | 19 | 20 | 21 | 22 |
| | 23 | 24 | 25 | 26 ☐☐☐ | 27 ☐☐☐☐ | 28 ☐ | 29 |
| | 30 | | | | | | |
| MONTH ○ | SUNDAY | MONDAY | TUESDAY | WEDNESDAY | THURSDAY | FRIDAY | SATURDAY |
| | 1 | | 2 | 3 | 4 | 5 | 6 |
| | 7 | 8 | 9 | 10 | 11 | 12 | 13 | ns
FILE SYSTEM AND A RECORDING MEDIUM WITH A PROGRAM USED IN THE SYSTEM STORED THEREIN

FIELD OF THE INVENTION

The present invention relates to a file system as well as to a recording medium with a program used in the system and is applicable in a processing system for executing data processing such as data copying, facsimile communications, and printing, capable of backing up treated data, and further making it possible to read out desired data easily.

BACKGROUND OF THE INVENTION

Conventionally, important documents (with images or characters displayed thereon) or documents which may be of use in the future are printed on a paper and filed in a book shelf or some other place. However, in business offices or other similar places where a vast quantity of documents are treated, a large space is required for storage of the documents, and also a long time is required for finding out a desired document.

In recent years, in association with sophistication and the tendency for a higher data processing speed in the data processing technology, and also in association with advent of lower price storage units, the so-called file system has appeared, in which documents required to be stored are read with a scanner and accumulated in a large capacity storage unit. Such a file system has been introduced not only into business offices but into other facilities too.

As this type of file system, there is one in which documents are systematically classified according to the type and stored in a database so that related document can easily be retrieved, and recently various types of more sophisticated file system each with further improved convenience in use have been proposed. As the conventional technology, for instance there are those disclosed in Japanese Patent Laid-Open Publication No. HEI 5-35737 and Japanese Patent Laid-Open Publication No. HEI 6-119393.

However, with the file systems based on the conventional technology as described above, it is necessary to read each document with a scanner, so that, if each document is not processed on time, the work needs to be done afterwards and many documents are piled up. To put the piled documents into order it is necessary to read each document to be stored with a scanner and to execute a work for inputting data for classification, even if it is tried to execute a filing work all at once, the work is very complicated and, after all, a number of documents to be stored is reduced.

The documents to be stored in a file system are selected because of their importance, if a document is abolished and not stored it can not be used even if it becomes necessary later.

Therefore, when each document is checked for its necessity of storage, as the determination is not always easy for every document, a long time is required for this work. Furthermore, a document once decided as unnecessary may become necessary in the future.

Documents stored in a file system include copied documents to be used in a conference, those transmitted to or received from business partners through a facsimile machine, or those prepared with a workstation (WS) or a personal computer (PC) and printed therefrom. In brief, a document to be stored is converted to an electric signal at least once and outputted for recording onto a paper.

The present inventor decided to solve the problems in file systems based on the conventional technology. They closely checked the process up to storage of each document in the file systems, gave a thought on the usage of this document data, and succeeded in solving the problems applying a result of the strenuous studies.

In the file systems based on the conventional technology, image data produced by reading each document with a scanner is accumulated, and when the document is required later, the image data is retrieved, read with a reader and outputted for recording, and in this step sometimes input of the output conditions or other data is required. Especially, like in a case of a file system proposed by this applicant and described later, when attention is put on data processing and the data is accumulated as it is, the case can easily be anticipated where it is hoped to quickly fetch a document subjected to the same processing like that in copying by easily retrieving the desired data.

SUMMARY OF THE INVENTION

It is an object of the present invention to provide a file system with improved convenience in use in which it is possible to back up treated data as well as to easily use processed data whenever required by fetching and accumulating the same data as those to be processed in the processing step. In addition, make it possible to eliminate the necessity of operating the system paying attention to backing up as well as to store and manage data without executing the filing work itself. Furthermore, make it possible to quickly obtain desired data by realizing the processing enabling easy retrieval of desired data without requiring complicated operations.

It is another object of the present invention to provide a file system with higher convenience in used in which it is possible to back up treated data by fetching and accumulating the same data as those to be processed and to easily use any processed data whenever required.

It is another object of the present invention to provide a file with improved convenience in use in which it is possible to back up treated data by fetching and accumulating the same data as those to be processed and to easily use any processed data whenever required, and further it is required to insure security of the backed-up data.

With the present invention, the same data as those processed by a processing system such as a copying machine, a communication unit, or a printer when a processing instruction is inputted by a user is accumulated together with data on conditions for processing the data in a storage unit. Therefore, data to be processed is processed according to a processing instruction and also can be stored for management together with the processing conditions.

With the present invention, processed data corresponding to the processing conditions outputted for display and selected is read out from a storage unit according to an inputted processing instruction. Accordingly, processing data satisfying the selected processing conditions is outputted to and processed by a function or a unit capable of processing the data. In this step, by appending the processing conditions to the processed data and outputting the processed data, it is also possible to process data under the same processing conditions.

With the present invention, processed data corresponding to the processing conditions specified according to an inputted processing instruction is outputted for display and those selected from the displayed processed data is read out and outputted. Furthermore, because the processing conditions are specified, also processed data corresponding other processing conditions or other processing conditions are outputted for display, and processed data selected after this repetition is read out and outputted. Therefore, it is possible to search for processed data in a storage unit according to memory and to read out the data after a reading range is limited and output the read-out data to a function or a unit capable of processing the data. In this step, by appending processing conditions to processed data, the data can always be processed under the same processing conditions.

With the present invention, when a document is copied, data on at least one of a number of copies, size and orientation of a document, and size and orientation of a paper is accumulated. Therefore, it is possible to selectively read out and output processed data by specifying these parameters within a range of memory.

With the present invention, when a document is copied, data on at least copy density, imaging mode, size change ratio, post-processing, divided copying, integrated copying, printing while copying and edited copy is accumulated. Therefore, it is possible to selectively read out and output processed data by specifying these parameters within a range of memory, and further by appending the read-out data to processed data, it is possible to output images for recording under the same processing conditions.

With the present invention, one processing condition is accumulated in correlation to one processing in a storage unit. Therefore, waste of memory can be reduced as compared to a case where processing conditions are accumulated for each page.

With the present invention, processed data is automatically accumulated in a storage unit without requiring a user to carry out any specific input operation (regardless of whether an accumulate instruction is inputted or not). Therefore, the processed data is backed up even if the user does not pay any specific attention to it, and the user can freely read out the data at any time.

With the present invention, even in a case of processed data which is automatically accumulated regardless of whether a user inputs an accumulate instruction, the accumulating operation is stopped and the accumulated data is deleted when an accumulation cancel command is inputted before start of or during the accumulating operation. Therefore, for instance, when it is not desired to file (back up) processed data, accumulation of processed data is not executed by inputting an accumulation cancel instruction.

With the present invention, a program is read out from a recording medium and executed by a central processing unit, so that the central processing unit functions as the accumulation control unit or output control unit.

With the present invention, the same data processed by a processing system upon input of a processing instruction by a user is correlated to ID information for the processed data, and when the processed data has any relativity with processed data in any other storage unit, the processed data is correlated to link information for linking the processed data to those in the other storage unit and stored in a storage unit. A portion of or ID information of the data in the storage unit is outputted for display to a display unit when a processing instruction is inputted from an operating unit, and can be outputted for display in the state where the processed data is correlated to other processed data linked by this link information, and is outputted to and processed, when selected, by a processing site connected thereto such as a processing system. Therefore, processed data is processed according to a processing instruction, and is stored in correlation to other processed data, so that the processed data can selectively be outputted for display together with correlated other processed data and the selected processed data can be outputted to and processed by a function or a unit capable of processing the data.

With the present invention, when a data to be newly processed is the same as the data that has been already processed, the newly processed data itself is not accumulated, and ID information for the newly processed data is correlated and linked as link information indicating the same data to the already processed data. Thus, the same newly-processed data as existing processed data is correlated to the existing processed data without consuming a storage capacity of a storage unit, and when selected according to ID information or relativity to the existing processed data, the existing processed data is processed as the newly-processed data.

With the present invention, if newly-processed data is obtained by updating a portion of existing processed data, the newly-processed data is correlated with link information indicating updated data to the existing processed data, and only the updated data in the newly processed data is accumulated in a storage unit. When the newly processed data is selected according to ID information or relativity to the existing processed data, a portion of the existing processed data is substituted as updated data and restored in the newly-processed data, and then processed. Thus, newly-processed data obtained by updating existing processed data is correlated to the existing processed data without consuming a storage capacity of a storage unit, and is processed, when selected, by replacing a portion of the existing processed data with updated data like in a case where the entire newly-processed data is accumulated.

With the present invention, a keyword, appended information (such as a title), or an important sentence is correlated as ID information to newly processed data, and when any of the ID information is identical to that of the existing processed data, the newly-processed data is correlated to the existing processed data with link information indicating related data. Thus, processed data is correlated to other processed data according to the contents, and similar processed data can easily be selected.

With the present invention, when newly-processed data is correlated to any existing processed data because of coincidence of the keyword, the coincident keyword is additionally appended to other existing processed data correlated to the existing processed data (a keyword not having been used as ID information is added thereto). Therefore, processed data not including a keyword but having related contents can be retrieved according to the keyword.

With the present invention, processed data in a storage unit is correlated and linked to the link information according to relativity with other processed data upon an input from an operating unit. Thus, relating processed data not satisfying the conditions described above can be stored in correlation to each other and managed.

With the invention, a program is read out from a recording medium and executed by a central processing unit, so that the central processing unit functions as the accumulation managing unit and output managing unit.

With the present invention, the same processing processed by a processing system upon input of a processing instruction by a user is accumulated in a storage unit with at least processing data information of the processed data as ID information appended thereto. Processed data in this storage unit is outputted for display, when a processing instruction is inputted from an operating unit and a calendar screen is displayed on a display unit, at a position for the processing data and time, and is also selected outputted to a function connected thereto such as a processing site like a processing system. Thus, once processed data is backed up, the processed data can easily be selected from contracted images arrayed on the calendar screen in time series of works, so that the processed data can be used again in the outputting site.

With the invention, of contracted images of processed data for a plurality of pages, processed data for all of the pages, or processed data for several pages which can easily be determined (such as a cover or contents table) are outputted for display on the calendar screen. Therefore, it is possible to confirm contents of as much processed data as possible with one screen, and desired processed data can easily be selected. It should be noted that, when contracted images of processed data can not be accommodated in a display column of the calendar screen, scrolling or page-turning may be employed for switching displays.

With the present invention, contracted images which can easily be determined for all pages or a portion of pages of processed data is outputted for display on a display column on a calendar screen in different colors or different format. Thus, whether all of processed data or a portion thereof is displayed can easily be grasped, and desired processed data can easily be selected.

With the present invention, the current or inputted date and time are displayed at the final end of the calendar screen on a display unit. Thus, as many contracted images as possible for data processed in the past can be displayed for selection.

With the present invention, current or input date and time are displayed at an intermediate point or at the head of a calendar screen on a display unit. Thus, contracted images for processed data for future (such as processed data accumulated when a date and time for reusing processed data can be inputted as processing date and time information) can be outputted for display singly or together with those for data processed in the past.

With the present invention, data on events each executed according to a specific date and time (such as schedule or events) is inputted as ID information and accumulated together with processed data, and the event information is outputted for display together with contracted images of processed data at a position for corresponding date and time in a calendar screen. Thus, processed data for confirming contracted images can be filtered according to contents of the processed data and relativity with each event, so that desired processed data can easily be selected.

With the present invention, by using a function for inputting and managing a schedule to be carried out according to date and time, contracted images for processed data corresponding to the processing date and time in a calendar screen displaying the schedule with the function. Therefore, it is possible to screen out processed data for confirming contracted images according to contents of processed data as well as according to relativity to the schedule without requiring any specific operation for preparing a dedicated calendar screen or for inputting a specific schedule, so that desired processed data can easily be selected.

With the present invention, by using a function for inputting and managing a schedule to be executed according to date and time, accumulation information for processed data corresponding to the processing data and time in a calendar screen displaying a schedule with the function, and output processing centering on processed data for the corresponding date and time can be executed. Thus, even with a scheduling function incapable of outputting for display any contracted image, it is possible to screen out desired processed data according to an actual result of accumulation of processed data as well as to relativity with the schedule, and then contracted images for the processed data can be outputted for display or can directly be read out and outputted.

With the present invention, processed data is accumulated with ID information such as processing date and time or a keyword correlated thereto, and inputted ID information is outputted for display in a calendar screen in such a way that contracted images for common processed data can easily be discerned. Thus, it is possible to screen out processed data for confirming contracted image, and desired processed data can be selected easily and quickly.

With the present invention, by inputting a security instruction for processed data, the processed data is accumulated in a storage unit with an operator's password correlated thereto, and also a security mark is displayed in place of the contracted image on a calendar screen, so that, unless the password is entered, the contracted image is not displayed nor is readout for output from the storage unit. Thus, processed data that requires higher degree of security can not be exposed to nor can be used by a third party.

With the present invention, by inputting a coding instruction for processed data, the processed data is encrypted to a data which can not be used as it is, and then is accumulated in a storage unit with an operator's password correlated thereto, and also a coding mark is displayed in place of the contracted image on a calendar screen, so that the code is not decrypted and the contracted image is not displayed nor outputted unless the password is entered. Thus, processed data that requires higher degree of security can not be exposed to nor can be used by a third party.

With the present invention, when processed data relates to other processed data, link information for each processed data is appended to the processed data, and the relating processed data is displayed together with the contracted images in a calendar screen. Thus, desired processed data can easily be selected by successively checking contracted images for processed data by referring to related images.

With the present invention according to the present invention, a line connecting a contracted image to another one, an arrow mark or the like are displayed as related image d on the calendar screen. Thus, desired processed data can easily be selected, for instance, by checking contracted images of processed data following the line, arrow mark or the like.

With the present invention, contracted images of relating processed data are displayed as relating images above or under the processed data or side by side with the processed data on the calendar screen. Thus, it is possible to simultaneously confirm contracted images for relating processed data.

With the present invention, a program is read out from a storage unit and executed by a central processing unit, so that the central processing unit functions as various units.

Other objects and features of this invention will become apparent from the following description with reference to the accompanying drawings.

BRIEF DESCRIPTION OF THE DRAWINGS

FIG. 19 is a list showing an appended data according to Embodiment 1 which is different from those shown in FIG. 12 to FIG. 18;

FIG. 20 is a list showing an appended data according to Embodiment 1 which is different from those shown in FIG. 12 to FIG. 19;

FIG. 21 is a display screen showing the processing for referring to the filed data according to Embodiment 1;

FIG. 28 is a view showing a display screen of the file unit according to Embodiment 2;

FIG. 34 is a view showing a display screen according to Embodiment 3;

DESCRIPTION OF THE PREFERRED EMBODIMENT

Detailed description is made hereinafter for a file system and a recording medium with a program used in the file system stored therein according to the present invention in order of Embodiment 1 to Embodiment 8 with reference to the related drawings.

FIG. 1 to FIG. 24 are views showing one of the embodiments of the file system functioning according to a program in the recording medium according to the present invention.

Figure 1:
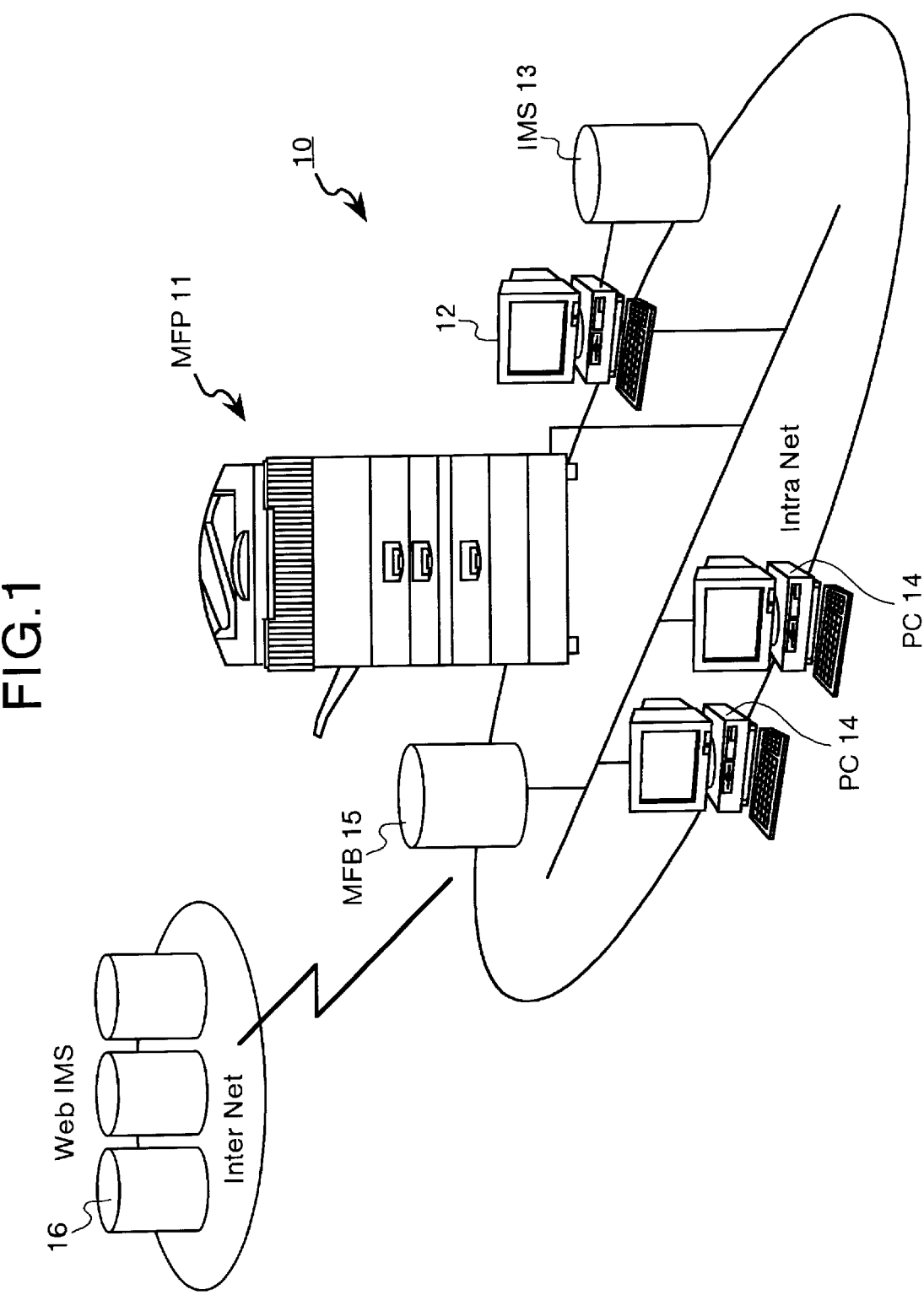
FIG. 1 is a conceptual view showing one embodiment of a file system functioning according to a program stored in a recording medium according to the present invention and also showing the general configuration thereof.

In FIG. 1, the reference numeral 10 indicates a data management system constructed for making the effective use of data, and this data management system functions as a data backup system for saving backup copies of data handled by a user and also functions as a file system as required by the user so that data can be reused, and is constructed with a multi-functional printer (MFP) 11 (hereafter, copying machine 11), a server 12, an infinite memory server (IMS) 13, personal computer/s (PC/s) 14, a multi-functional box (MFB) 15 and a Web IMS 16 in a service provider for providing services on the Internet described later.

Figure 2:
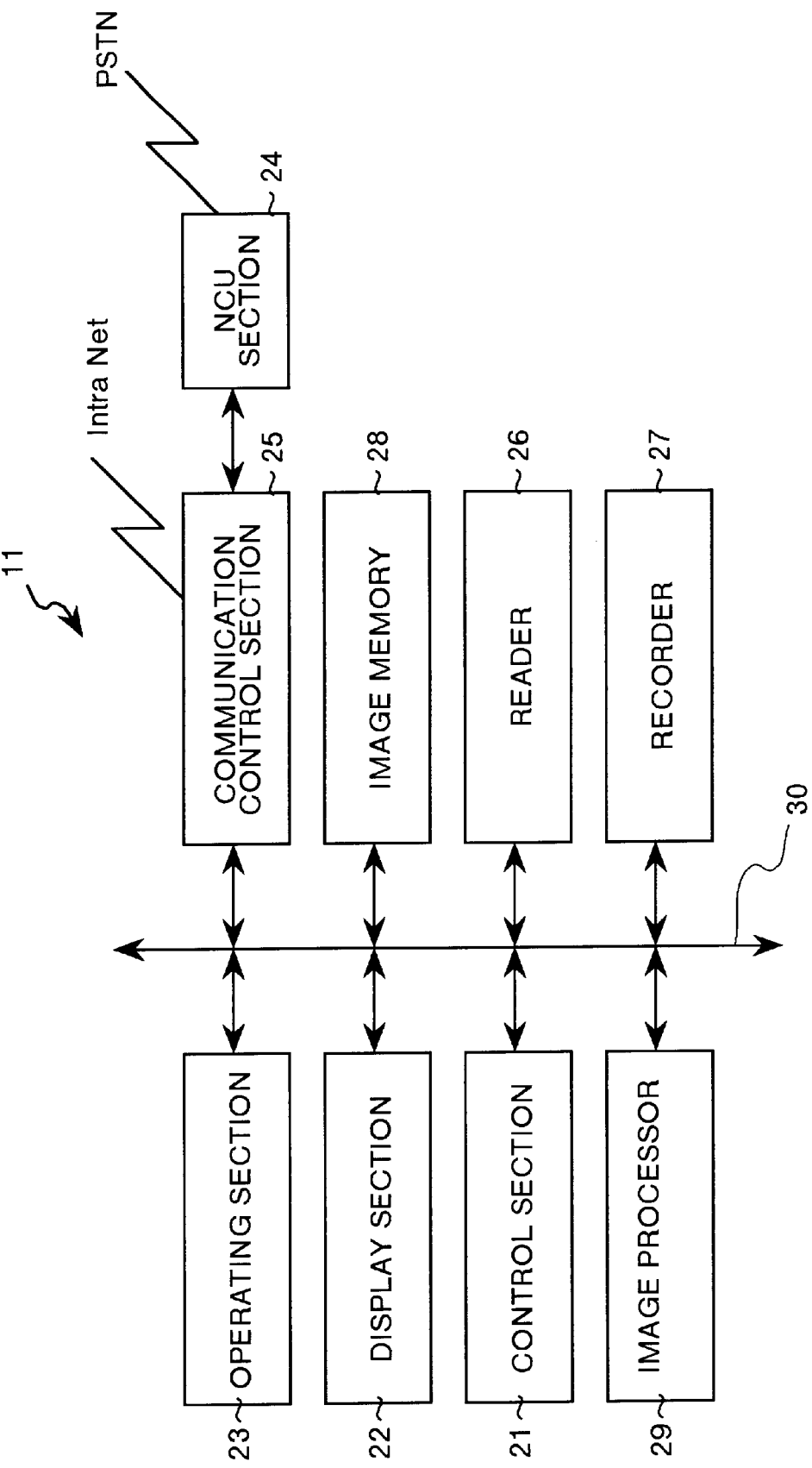
FIG. 2 is a block diagram showing a processor in the system according to Embodiment 1.

In the copying machine 11, as shown in FIG. 2, a control section 21 for integrally controlling each section of the device is connected with a display section 22, an operating section 23, an NCU section (Network Control Unit) 24, a communication control section 25, a reader 26, a recorder 27, an image memory 28, and an image processor 29 through a bus 30. The control section 21 stores therein various information such as driving conditions of each section of the device as well as managed data according to a control program read out from a ROM (Read Only Memory) by a built-in CPU (Central Processing Unit) and also executes various types of processing according to the present invention by using a RAM (Random Access Memory) for storing therein required data for an operation together with each function described later.

Figure 3:
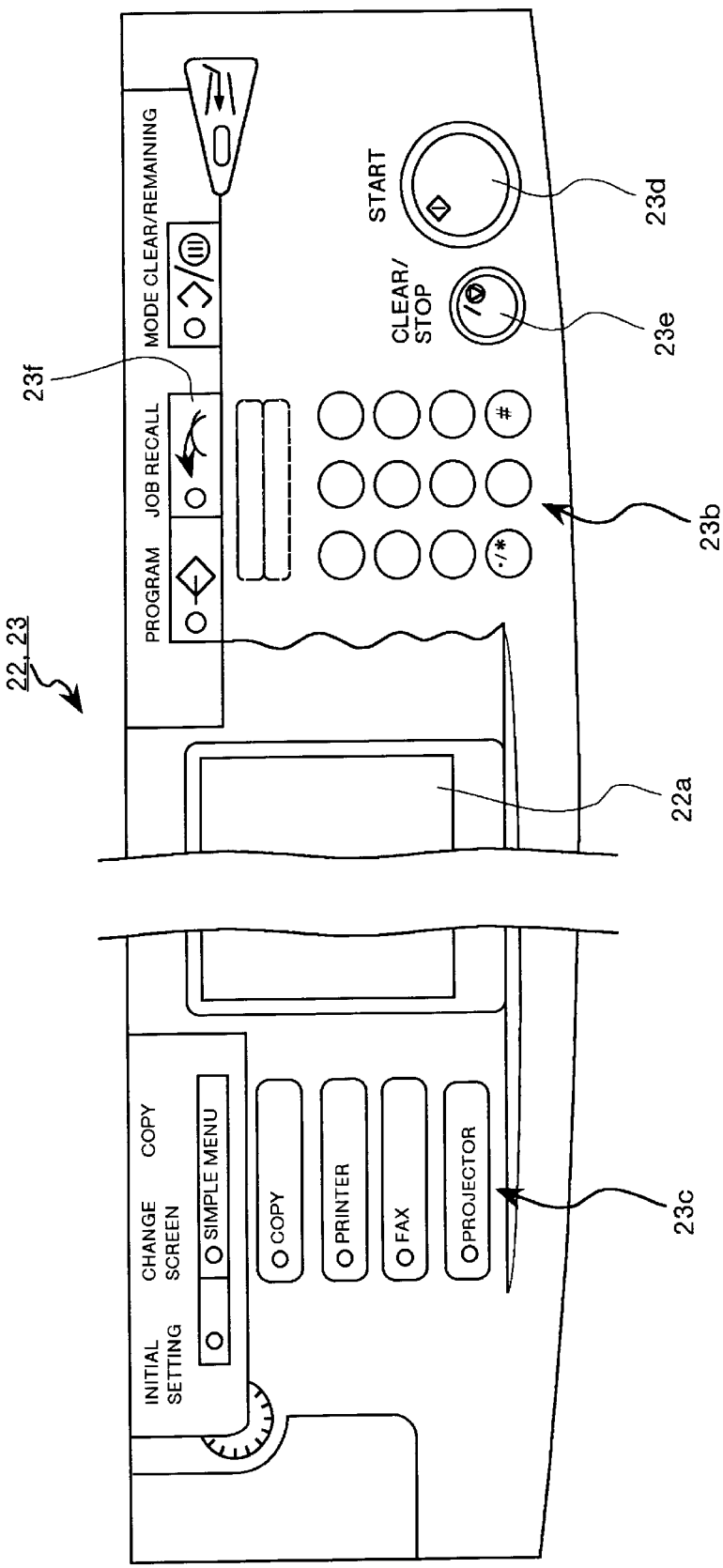
FIG. 3 is a flat view showing a display unit and an operating unit according to Embodiment 1.

The display section 22 and operating section 23 are constructed, as shown in FIG. 3, in an operation display panel provided on the top surface of the front section of the device. A display operating LCD (Liquid Crystal Display) 22a with a touch panel for displaying the driving conditions, a status of the device, or various information such as input information and inputting data for setting or instructions by a user; a ten-key 23b; function keys (F keys) 23c; a start key 23d; a stop key 23e; and a job recall button 23f are provided on the display operating section. Not shown in the figure, but there is also provided a slot for setting an ID card to read data from and write data in the ID card is arranged thereon.

The communication control section 25 is connected to the NCU section (Network Control Unit) 24 for connecting or disconnecting a line by executing prespecified line control when a call is transmitted and received through a PSTN (Public Switched Telephone Network). The communication control section 25 modulates or demodulates image data and various sequential signals with a built-in modem, executes facsimile communications (data transaction) through the NCU section 24, and executes transaction (transmission) of document data such as image data and character data by being connected to Intranet with an I/F not shown in the figure.

Figure 4:
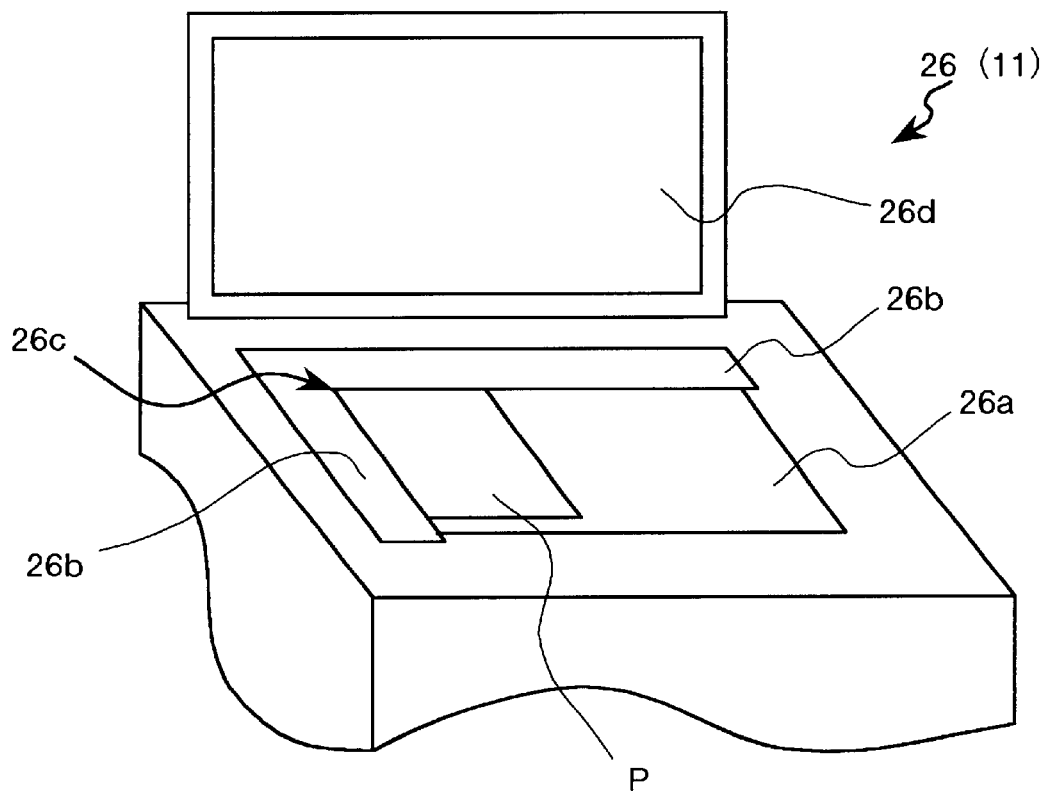
FIG. 4 is a perspective view showing a reader according to Embodiment 1.
Figure 5:
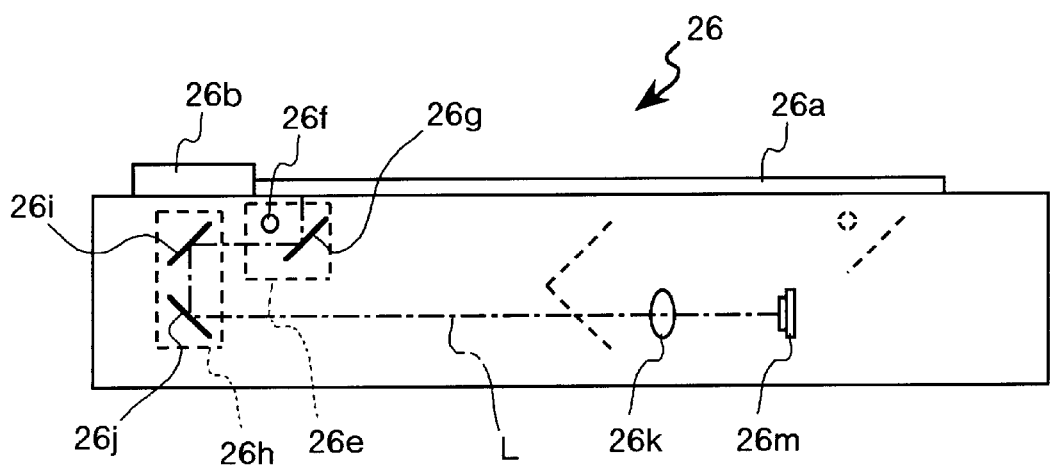
FIG. 5 is a perspective conceptual side view showing the reader according to Embodiment 1.

The reader 26, as shown in FIG. 4 and FIG. 5, reads out a document P placed and positioned on a contact glass 26a having a large area so that a corner of the document matches with a document position reference 26c formed with an angle between document scales 26b, image data transmitted from the document P and to be copied in a state in which the document P is contacted the contact glass 26a by a pressure plate 26b mounted thereon so that the plate can contact the document or separate therefrom. Light is irradiated on the document P from an exposure lamp mounted on a first carriage 26e moving in an auxiliary scanning direction and extending in a main scanning direction, and the light reflected from the image surface is deviated by a first mirror 26g. Further, the reflected light is inverted by the second and third mirrors 26i and 26j mounted on a second carriage 26h for maintaining an optical path length L of the reflected light at a constant value by moving the reflected light at a speed of ½ of the first carriage 26e. Finally, the inverted light is projected on the CCD (Charge Coupled Device) with an image-formation lens 26k, and image data is obtained through photoelectric transfer. It is needless to say that, this reader 26 may incorporate therein an ADF (Auto Document Feeder), in place of the pressure plate, for automatically feeding the document P set on a document table onto the contact glass 26a, reading data, and discharging the document P onto a discharged paper table so that a plurality sheets of document P can automatically be processed.

The recorder 27 records an image of received and read-out image data subjected to bit-map development and stored in the image memory section 28 comprising a hard disk drive onto a paper, for example, according to a known electrophotographic recording system under the conditions of 400 dpi and 256 levels of gray. Although detailed description is not made herein, the recorder 27 forms an electrostatic latent image by optically writing the image onto a photoconductor electrified while it is rotated according to the received and read-out image data, deposits toner onto the image for toner development, feeds a paper suited for an image to be recorded or with a specified size from a sheet feeder cassette, transfers the toner image onto the paper, fixes the image thereon, and ejects the paper outside the device. It should be noted that, the recorder 27 may employ some other system such as an ink-jet system, a thermal head system, or a dot impact system other than the electrophotographic recording system.

The image processor 29 compresses and encodes image data to be transmitted, and, on the other hand, functions as a DCR (Data Conversion Receiver) for decompressing and decoding the received image data, and also performs processing that character data (code data) for a document or the like created by a user with a PC 14 is subjected to map development in the image memory section 28 and converted to image data according to a request from the user. It should be noted that, the compression of image data performed by this image processor 29 is for the purpose of reducing the amount of data, therefore, any of the known systems may be employed on condition that both of the copying machine 11 and the server 12 can support the processing of the system, and it may be considered as an example that bit-map data with 400 dpi and 8 bits for each pixel in the image memory 28 is compressed in a GBTC (Generalized Block Truncation Coding) system.

This copying machine 11 constitutes a processing unit. This processing unit has a transfer function to execute facsimile communications for transferring image data and data communications for transferring document data with PCs 14, a copying function to output the read image data on a paper for recording, and a recording function to output the received document data onto a paper for recording. Thus, the copying machine 11 is designed not only as a copying machine but also as a facsimile machine, a printer, or a scanner. It should be noted that, processing conditions such as telephone numbers of receiver of a fax, addresses of PCs 14, or a reduction ratio in copying and user IDs as well as user names are recorded in an ID card to be set in the operating section 23 of the copying machine 11. Therefore, the copying machine 11 is programmed to read out the processing conditions, when the start key 23d is pressed after a function is selected by pressing the F key 23c on the operating section 23 (no function is selected when copying is to be executed), so that any of the various functions can easily be used. The copying machine 11 can also concurrently read out a user ID from the IC card (by receiving it together with document data when the copying machine is used by the PC 14), store management information such as used processing functions and a number of copied sheets in the RAM of the control section 21 for each user ID so that the management information can be used for accounting or the like. Therefore, document data to be processed can be subjected to desired data processing according to a processing instruction by a user (including a processing instruction from the PC 14 and a record-output instruction for received document data to be processed in the machine) depending on the installed functions, and is also regarded as appended data (particular information) by using the processed data without requiring for inputting a user ID when the processed document data is to be sent out to the server 12 described later, and adds the appended data to the original document data. It should be noted that, when the copying machine 11 is operated without inserting an IC card (without supplying a user ID) at that time, a shared ID previously allocated to the copying machine 11 used on a shared cost at the time of accounting is read out from the non-volatile RAM, the shared ID is used as a user ID, and the document data is processed as shared document data.

The multi-functional box 15 functions as a network hub of the copying machine 11, server 12, and the terminals such as PCs 14 to construct a local area network (LAN) environment by relaying data communications between devices, and also constructs an Intranet environment by being connected to the Internet to access a service provider on the Internet from the copying machine 11, server 12, or PC 14 to function so that any of the devices can use various information therethrough.

The PC 14 comprises a CPU, a memory (ROM, RAM), and an I/O (Input/Output) circuit. The PC 14 is designed to be used as a system in which various types of processing such as creation of a document and an image are carried out by performing operation processing according to an application program read-out from a hard disk drive not shown herein (storage medium) through the operation of a keyboard or a mouse by a user while viewing a display. The document data can be printed out or sent by fax to the inputted destination for transmission by using various functions of the copying machine 11 with a user ID and a processing instruction sent out to the copying machine 11, and also the PC 14 can receive image data that the copying machine 11 has received by fax, and receive image data read-out by the copying machine 11.

The Web IMS 16 is connected to the Internet through a not shown communication control unit of a service provider. The communication control unit writably and readably opens the Web IMS 16 in response to an access from an authorized user according to the control program read out from the recording medium by the CPU, and accumulates document data correlated to appended data (particular information) described later as it is continuously sent when an accumulate instruction for backup is issued. When a reference instruction for the document data to be accumulated is issued in continuation with the access, for example, when a transfer instruction for the document data whose address is specified by identifying the appended data (user ID) through the server 12 is sent, the communication control unit reads out the document data with the address from the Web IMS 16 and sends the data back to the destination for transfer according to the reference instruction.

Figure 6:
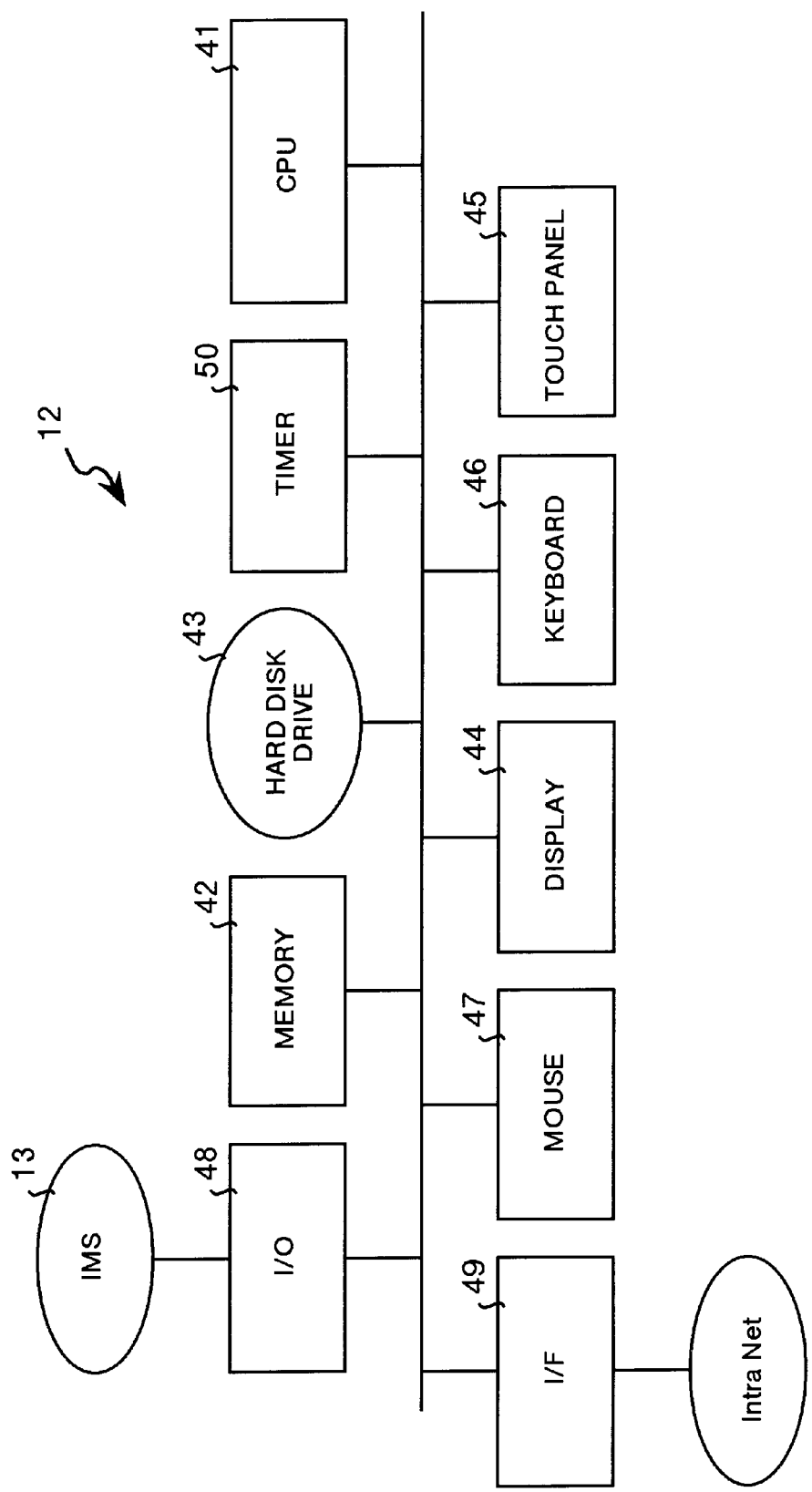
FIG. 6 is a block diagram showing a key section constituting a file unit in the system according to Embodiment 1.

The server 12 comprises, as shown in FIG. 6, a CPU 41, a memory (ROM, RAM) 42, a hard disk drive (recording medium) 43, a display 44, a touch panel 45, a keyboard 46, a mouse 47, an I/O circuit 48, a network I/F 49, and a timer function 50, and is constructed by a PC usable in the same manner as the PC/s 14. The CPU 41 executes various types of processing according to the present invention by integrally controlling the sections 42 to 49 of the device according to the application program read out from the hard disk drive 43. Connected to this server 12 is the infinite memory server 13 through the I/O circuit 48, and an Ethernet cable for constructing Intranet in the network I/F 49 is also connected to the server 12. In order to receive backup services of the provider, data required for receiving services from the provider through connection to the Internet such as the address of the provider, a registration ID (which is a user ID used for receiving services from the provider, so it may be the same user ID in the ID card for using the copying machine 11), and a password is stored in the non-volatile RAM in the memory 42.

The server 12 receives data to be processed by the copying machine 11 through the Intranet, transmits the data to the infinite memory server 13 on the Intranet constituting the storage unit, and accumulates the data therein as it is, and at that time, when a used amount of capacity (accumulated amount of data) in the infinite memory server 13 is checked and it is found that the amount exceeds the preset amount, the access to the provider on the Internet is made with the address of the provider, registration ID, and the password stored in the memory 42 before or after document data is accumulated to successively read out a specified amount of document data in the order from the oldest one to be transferred, and the transferred data is accumulated in the Web IMS 16. In addition, this server 12 reads out a portion of the document data or appended data (e.g., a thumbnail image in the header page) accumulated in the infinite memory server 13 in response to the request from the user and outputs the data for being selectably displayed on the display 44, reads out the selected document data from the infinite memory server 13 to transfer the data to the copying machine 11, and functions as a file unit and also functions the data management system 10 as a file system by, for example, outputting the data for recording, and when it is required to refer to the document data transferred from the infinite memory server 13 to and accumulated in the Web IMS 16, the access to the provider on the Internet is made with the address of the provider, registration ID, and the password stored in the memory 42, and the same processing is performed. Namely, the server 12 constitutes an accumulation managing unit as well as an output managing unit.

Figure 7:
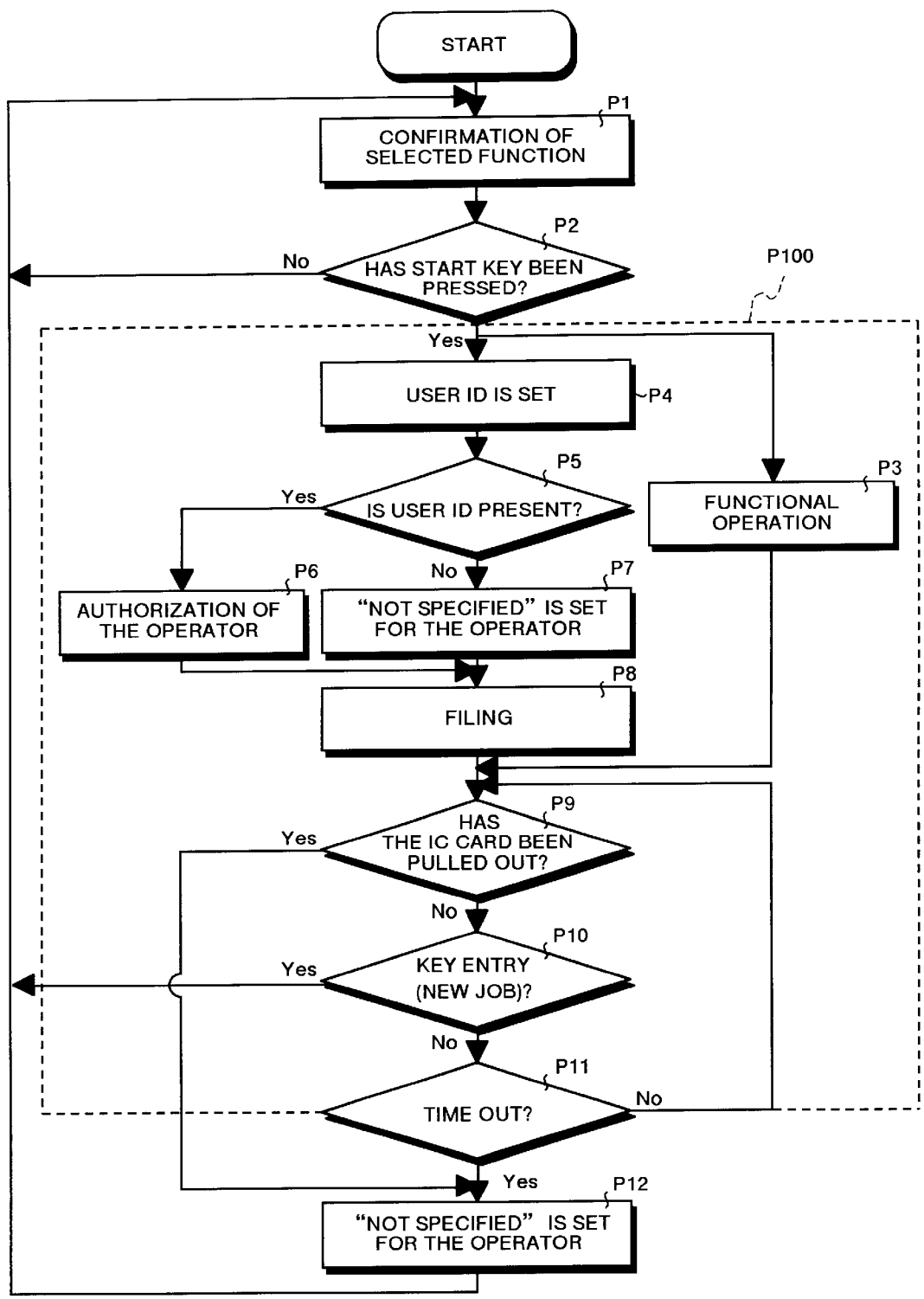
FIG. 7 is a flow chart showing a portion of the file processing as a file unit according to Embodiment 1.

Specifically, as shown in the flow chart in FIG. 7, in the copying machine 11, when copying is selected by pressing the start key 23d (step P1, P2) through the operating section 23 of the copying machine 11, document data from the document image set on the reader 26 for copying is read (step P3), and at the same time an operator (a user using the copying machine 11) is authorized and set according to the user ID read out from an IC card when the IC card is set in the operating section 23 (steps P4, P5 and P6). On the other hand, when a user ID can not be acquired, a shared ID read out from the non-volatile RAM of the control section 21 is regarded as the user ID, and "Setting is not specified" is set for authorization of the operator (step P4, P5 and P7).

Figure 8:
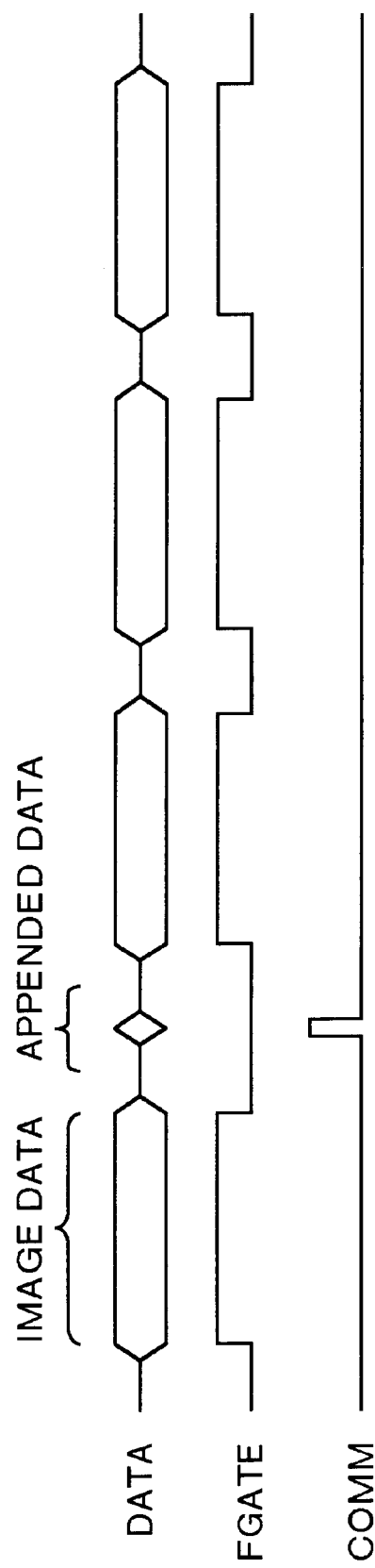
FIG. 8 is a timing chart showing data to be filed according to Embodiment 1.
Figure 9:
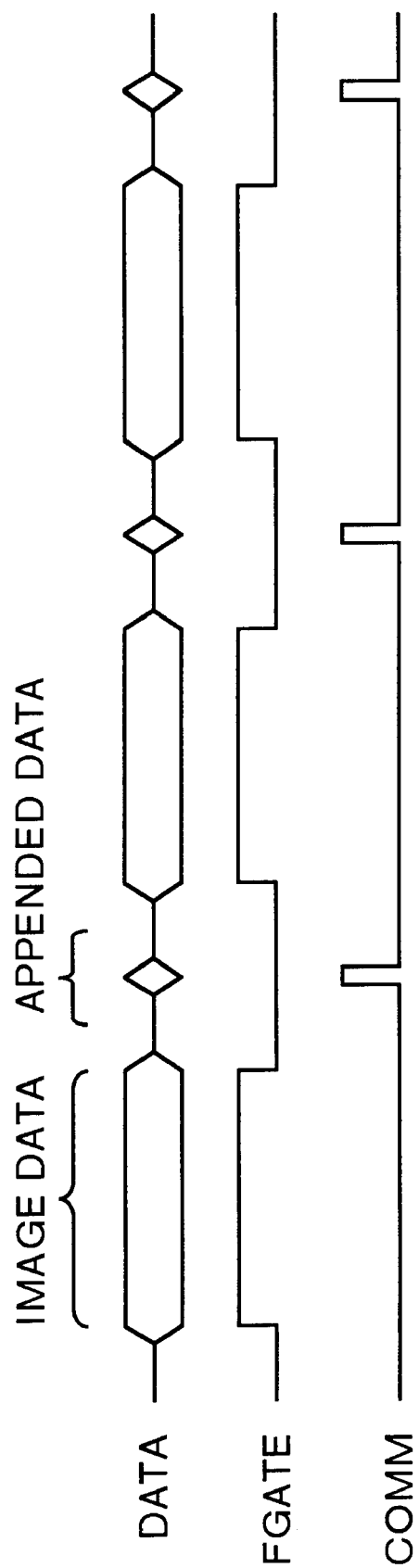
FIG. 9 is a timing chart showing a file processing according to Embodiment 1 which is different from that shown in FIG. 8.

The copying machine 11 encodes and compresses the same document data by the image processor 29 in parallel to the processing by a selected function, and then adds information for date to be processed measured by a timer function which is not shown together with the user ID and conditions (such as a reduction ratio) for processing to the document data as the appended data (code data) in order to file the data in the infinite memory server 13 on the Intranet, and sends out the added data to the server 12 which accumulates (on file) the data therein (step P8). At this point of time, the document data is sent to the server 12 in synchronism to a FGATE signal indicating an image area after being temporarily stored in the image memory section 28, while the appended data is sent thereto in synchronism to a COMM signal indicating information area, and the appended data at that time is made to a single block of processing in correlation to processing conditions and accumulated by being sent in a form of following only the header or the last document data, as shown in FIG. 8, even when the document P consists of a plurality of pages, so that a data amount for storage occupied (used) in the infinite memory servers 13 and Wed IMS 16 can be reduced. It is needless to say that document data for each page may be accompanied with appended data and sent to the server 12, as shown in FIG. 9, when the user wants to know more detailed processing conditions for adjusting copying density or the like for each page at the time of copying processing.

Accordingly, as for the same document data to be processed by the copying machine 11, a particular input operation is not required other than the operation required for performing the processing (regardless of whether an accumulate instruction is inputted or not), however, appended data to identify the document data is added (correlated) thereto to automatically be accumulated, and backup copies thereof are saved. At that time, even if the data is document data to be processed without a user ID, the data is also accumulated using the shared ID without requiring entry of the user ID.

It is determined that the operator has ended the processing when he/she pulls the IC card out (step P9), and it is also determined that the operator ends the operation when a period of time after the processing of reading a document set on the reader 26 ends is measured by a timer function which is not shown and it is detected that a time-out has occurred (step P11). A user ID for identifying an operator performing the processing to document data is cleared when either of the conditions is satisfied, and a shared ID as the default is set (authorized) just in case where a user ID can not be acquired so that an operator column is set to "Setting is not specified", and with those operations, the possibility that the same user ID is used by different users can be prevented (step P12). Then, in steps P9 and P11, when a start instruction to new processing is issued through other key entry, for example, by pressing the F key 23c or the start key 23d before the time-out measured by the timer function does not occur with the IC card kept to be set in the copying machine 11 (step P10), the processing returns to step P1 by maintaining the same user ID, and the same processing is repeated.

Accordingly, a user ID is added to document data without fail by being fetched again when it is accurately detected that the operator has changed.

At this point of time, the copying machine 11 is programmed to skip a step of backup processing in the control program and continue only the processing for a provided function by pressing an "undo" button (which is different from the "job recall button" 23f in FIG. 3) not shown in the figure provided on the operating section (Operation display panel) during the steps P2 to P11 (step P10), and it is also programmed, when the "undo" button is pressed after accumulation of document data is started by executing the processing in step P8, to delete the appended data for accumulated data during accumulation or immediately after the accumulation before the next processing instruction is executed, invalidate the processing of reading out the document data to be deleted, and cancel the accumulation of the document data. It should be noted that, the same processing as that when the "undo" button is pressed is performed when the "job recall button" 23f is pressed to cancel the instruction for copying itself.

Therefore, as for document data of which backup copies are saved without requiring any entry operation other than the operation for using functions of the copying machine 11 by the user, the accumulation thereof can be canceled only by pressing the "undo" button on the operating section 23 during steps P2 to P11. Thus, when a highly confidential image is to be copied, for example, it can be prevented that the document data for the image is reusably saved on file.

Herein, as appended data to be sent out to the server 12 by the copying machine 11, transmission processing conditions such as a telephone number and an address of a destination to be transmitted required for transmission processing, and processing conditions consisting of document/paper conditions on a document and a paper required for copying (recording) and an image processing condition on processing to image data are received (fetched), and added to document data to be accumulated. Any data may be used for this appended data on condition of identifying the processing, and, for example, when copying is to be executed, in order to improve convenience of copying, this copying machine 11 is designed to enable selection of processing conditions such as a copy density; an image mode; a size change ratio; post-processing for papers such as discharging by sorting papers having been copied or binding the papers by a stapler; copying of an image on both surfaces of a paper; divided copy of an image; integrated copy of an image; printing of date, stamps, and pages added to an image when copying; and edited copy of an image. Thus, these image processing conditions are received (fetched) as the processing conditions together with document/paper conditions including a number of copies to be obtained through a copying operation, size and orientation of a document for automatically identifying any size in a range from A3 at the maximum to B6 at the minimum, and size and orientation of a paper for being selected according to setting, and then these conditions are added to document data to be accumulated.

Figure 10:
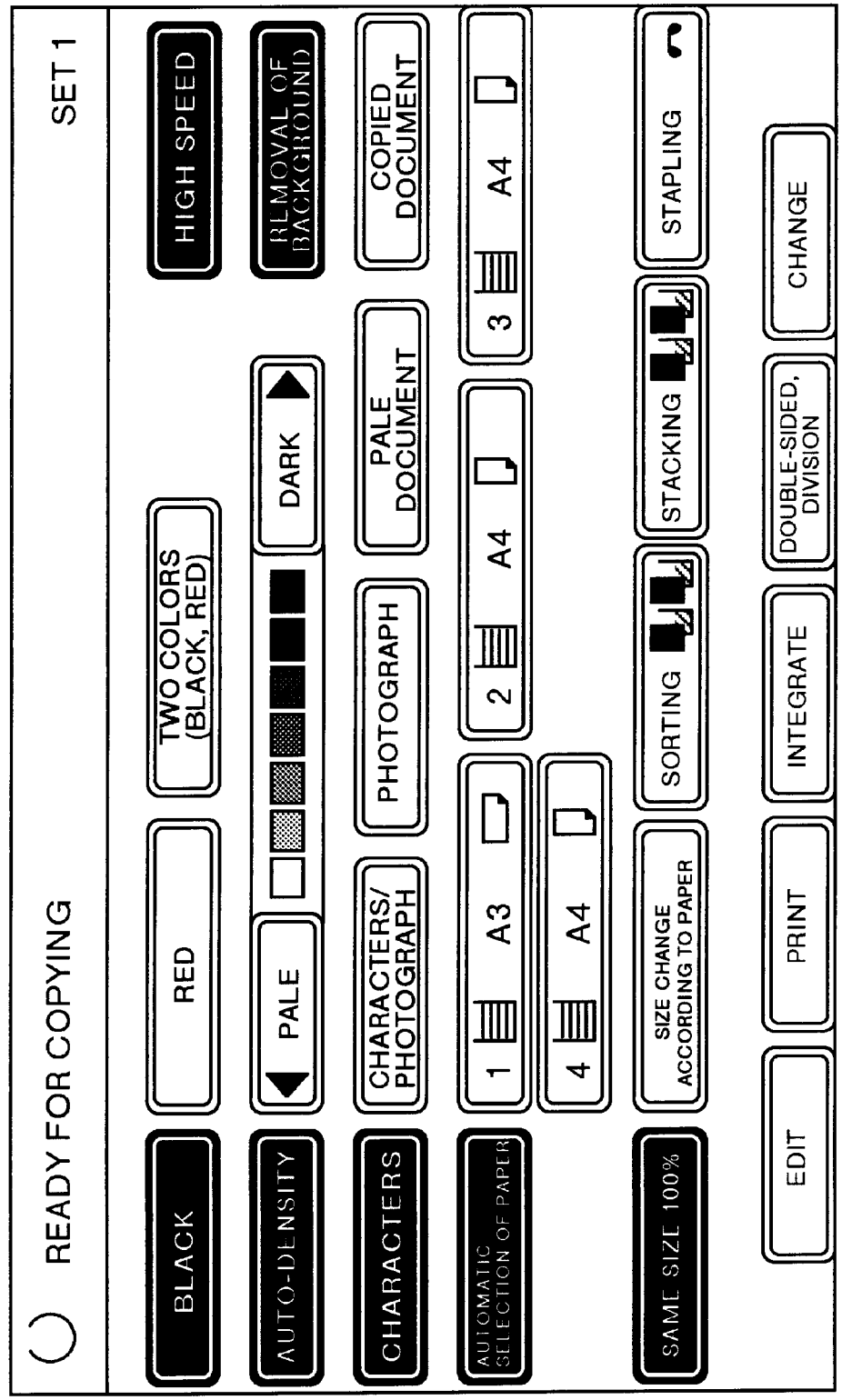
FIG. 10 is a flat view showing a display for explaining appended data to be filed and a portion of the operating unit according to Embodiment 1.
Figures 11, 12:
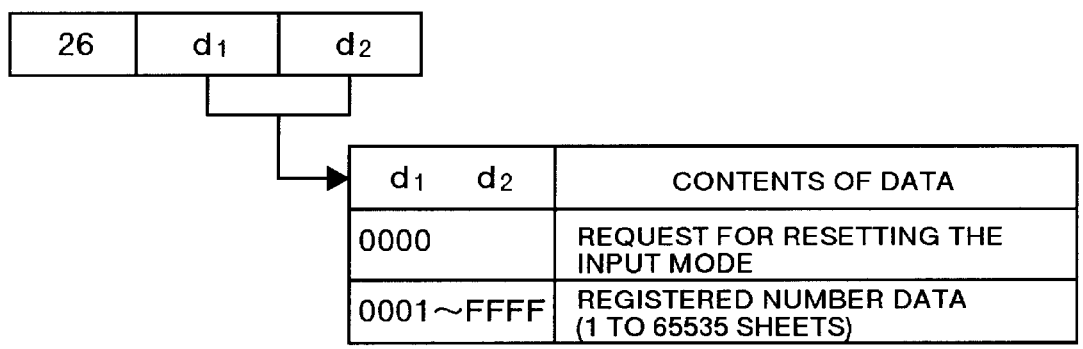
FIG. 11 is a list showing appended data to be filed according to Embodiment 1.
FIG. 12 is a list showing one of appended data according to Embodiment 1.

It should be noted that, in this copying machine 11, a document is not copied under the default copying condition (e.g., automatic paper selection, a size change ratio: 100%, and automatically adjusted density) obtained by just pressing the start key 23d when copying, but when the F key 23c is pressed to select a copying function, the screen shown in FIG. 10 appears on the display operating LCD 22a, which a user operates through the ten-key 23b, and with those operations, numerical values and various modes (commands in FIG. 11) for the document/paper conditions and image processing conditions can be selected for setting, and as an example, a number of copies to be obtained through a copying operation inputted from the ten-key 23b (a number of copies capable of being set at the default) follows, when registered number data accompanying a command 26H is "1", the command like "26" "00" "01" as shown in FIG. 12 to be set as appended data.

Figure 13:
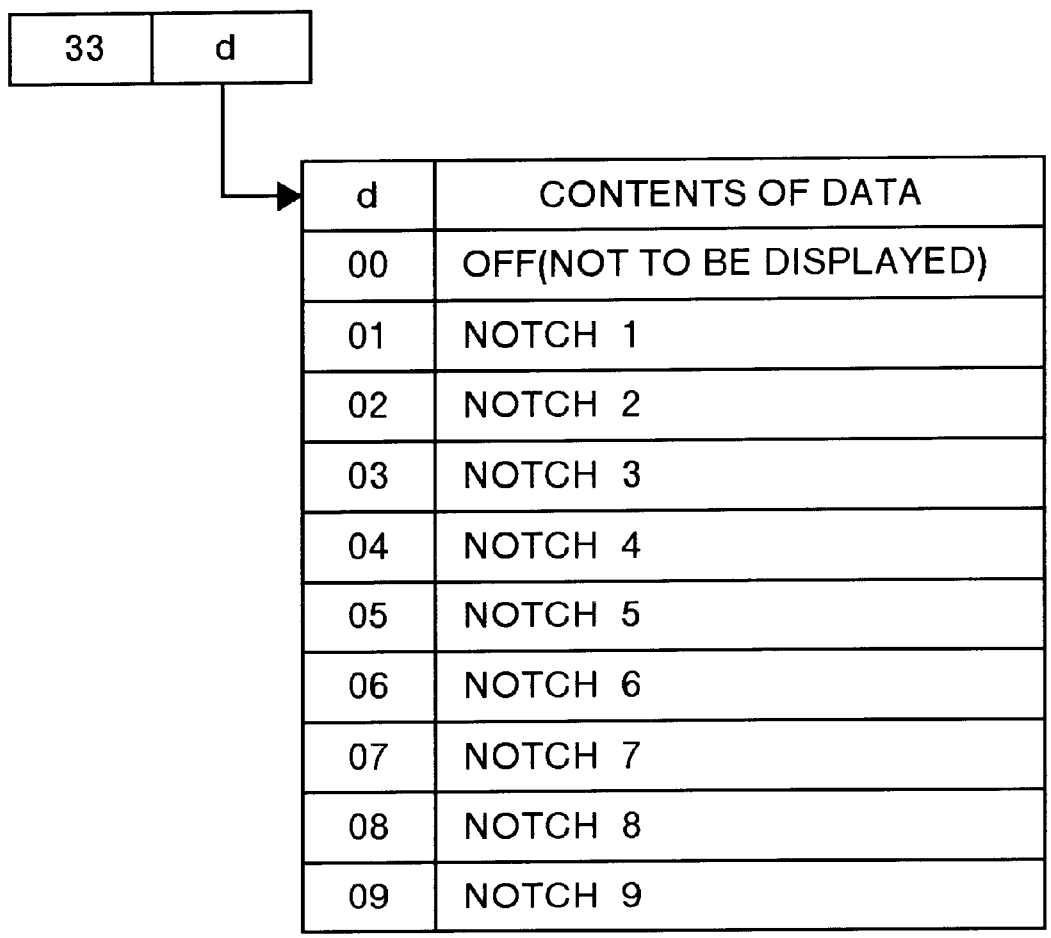
FIG. 13 is a list showing an appended data according to Embodiment 1 which is different from that shown in FIG. 12.
Figure 14:
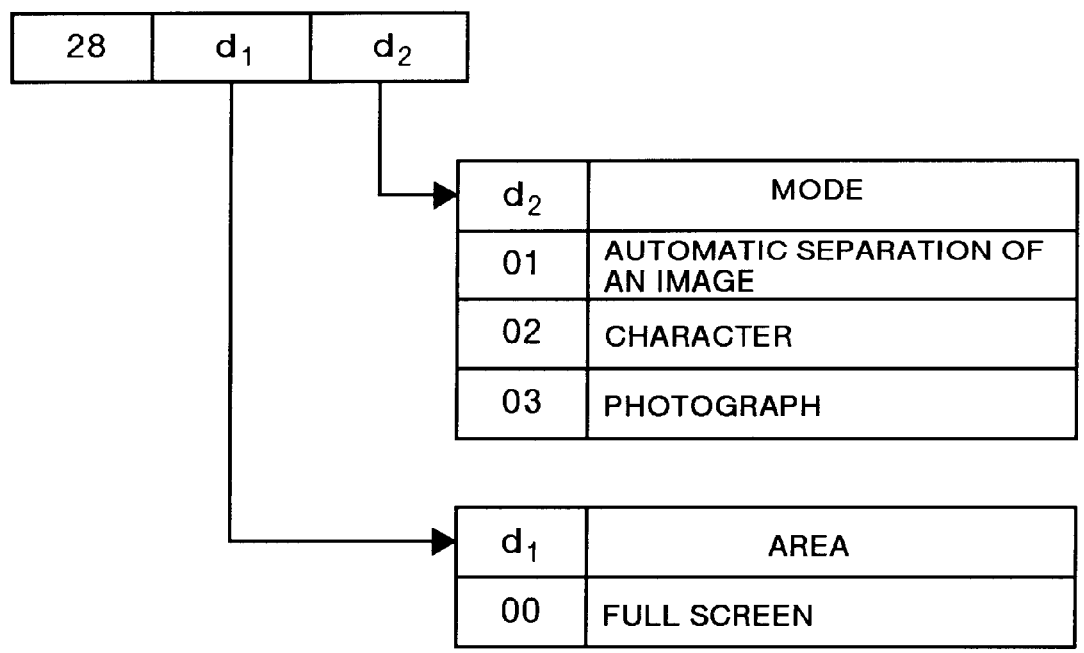
FIG. 14 is a list showing an appended data according to Embodiment 1 which is different from those shown in FIG. 12 and FIG. 13.
Figure 15:
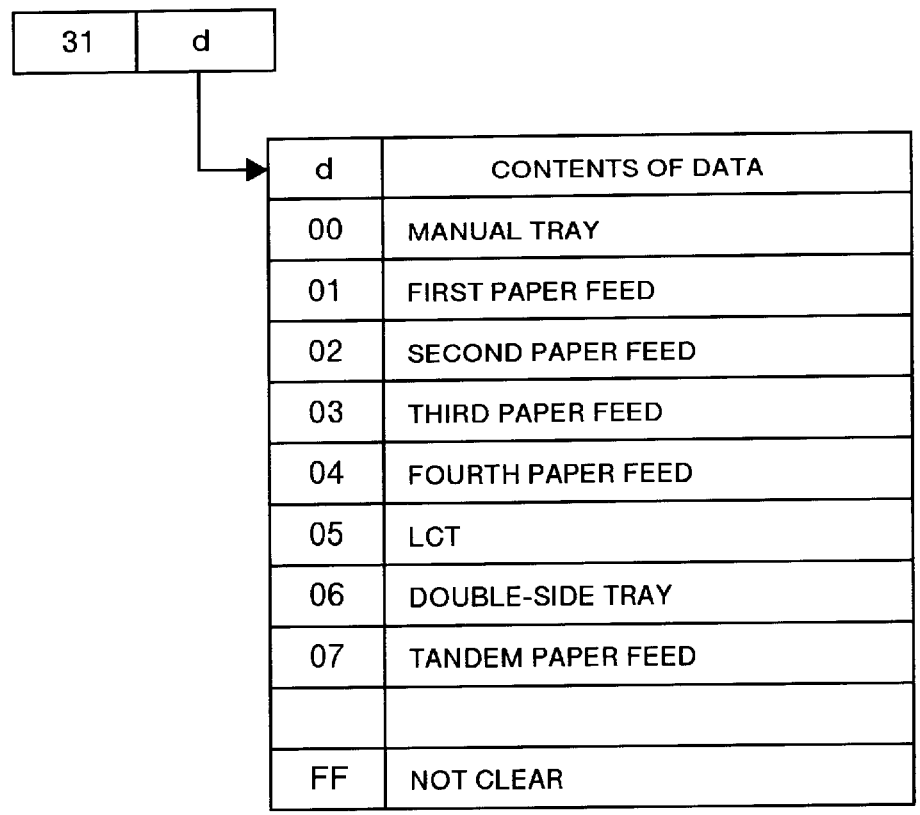
FIG. 15 is a list showing an appended data according to Embodiment 1 which is different from those shown in FIG. 12 to FIG. 14.
Figure 16:
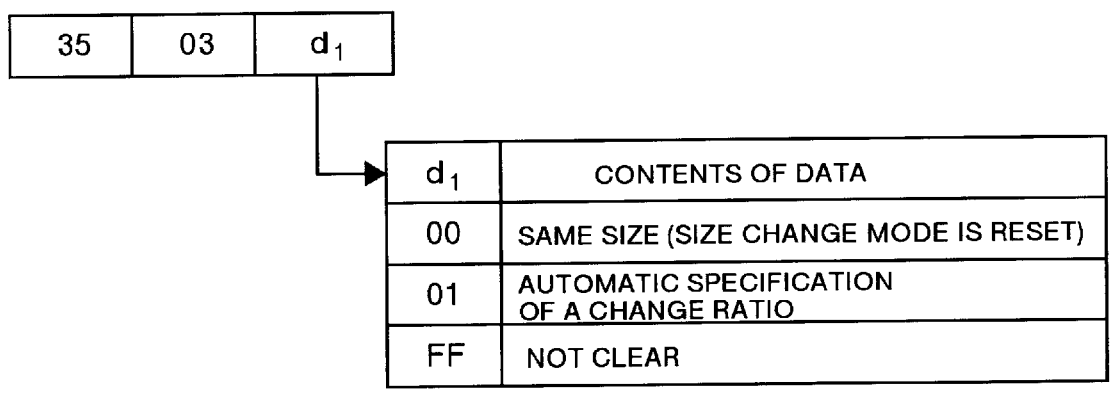
FIG. 16 is a list showing an appended data according to Embodiment 1 which is different from those shown in FIG. 12 to FIG. 15.
Figure 17:
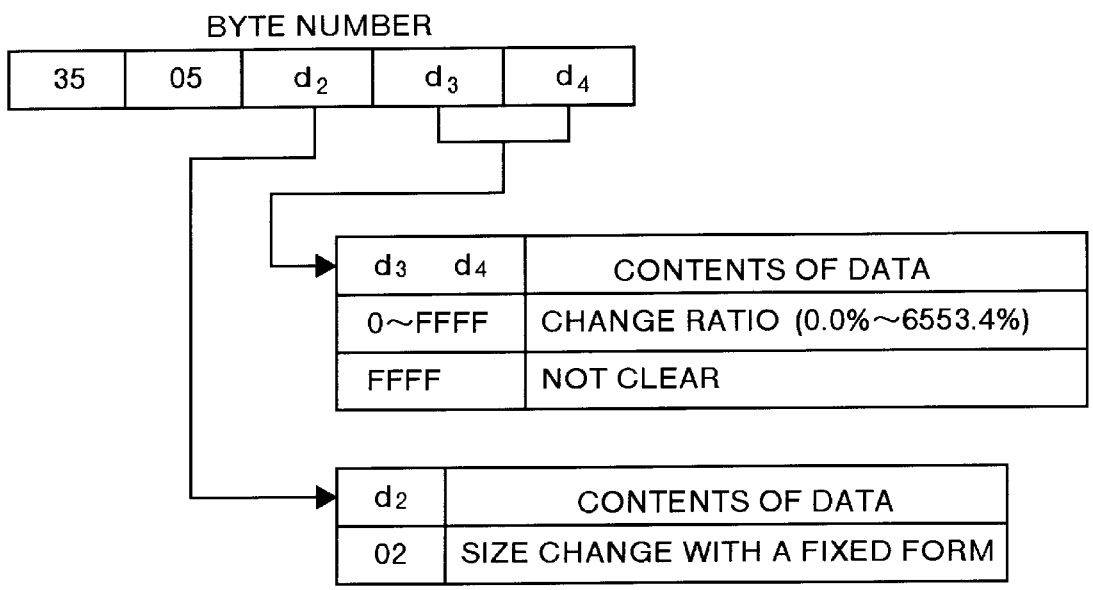
FIG. 17 is a list showing an appended data according to Embodiment 1 which is different from those shown in FIG. 12 to FIG. 16.
Figure 18:
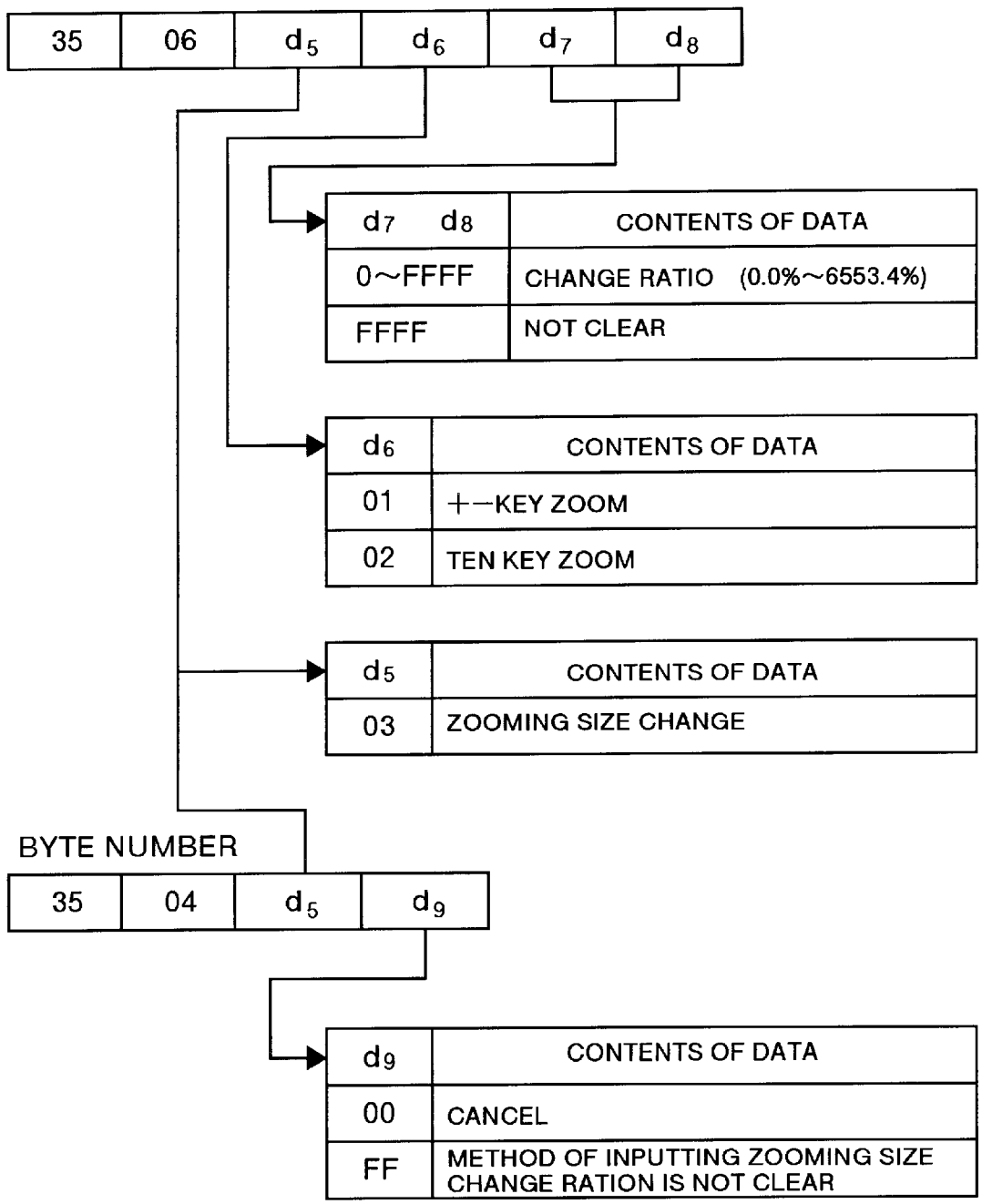
FIG. 18 is a list showing an appended data according to Embodiment 1 which is different from those shown in FIG. 12 to FIG. 17.

As appended data for the document/paper conditions and image processing conditions inputted from the display operating LCD 22a, there are used density setting data in command 33H shown in FIG. 13 for deciding automatically-adjusted copied density for making copied density appropriate according to an image or 7-step arbitrarily-adjusted copied density; document type data included in command 28H shown in FIG. 14 for deciding a type of image quality of a character or a photograph in a document image; fed sheet position data in command 31H shown in FIG. 15 for deciding size and orientation of a paper by specifying any of the sheet feeder cassettes for a paper to be used; setting data for an automatically adjusted density selection mode in command 32H for automatically selecting a sheet feeder cassette (papers) according to a document size and a size change ratio as size and orientation of a document; setting data for size change modes in command 35H shown in FIG. 16 to FIG. 18 for deciding a size change ratio such as a fixed scaling decided by a document size and a paper size, a zoom by 1% according to entry for arbitrary setting, dimensional scaling by inputting each length of a document image and of a copied image for setting, and discrete scaling by inputting a different scaling factor for longitudinal and lateral sides of an image respectively for setting; setting data for a double-sided mode shown in FIG. 19 and FIG. 20 as copying on both surfaces of a paper for recording images on a double-sided or a single-sided document or on a double-page spread document on both surfaces of a paper; setting data for a division mode in command 28H shown in FIG. 14 as divided copy for recording images on a double-sided document or on a double-page spread document on each one surface of papers; setting data for an integration mode in command 29H for integrating a plurality of document images on one surface or on both surfaces of a paper; setting data for a printing mode in command 2AH as printing in copying for automatically adding a processed date, stamps such as "Urgent" and a mark used for a user, and page numbers to a copied image; and setting data for an editing mode in command 34H as edited copy such as double copy for arranging the same image in one surface of a paper, margin creation for setting a margin at a center or a periphery of a book document, binding margin creation for setting a margin on one of the sides of a paper, and deletion processing for deleting only a specified color.

On the other hand, in the server 12, the CPU 41 fetches appended data for identifying document data and adds the appended data to the document data in order to easily use the server as a file unit, and fetches, more specifically as this appended data, in addition to a user ID, additional information such as a title, given to document data received from a PC 14, with which the document data can be fetched; keywords each obtained by subjecting document data to processing by an OCR (Optical Character Reader) to encode character data and repeatedly used in a text to be extracted; and particular information for contents of document data such as a number of output times that the same document data is repeatedly reused.

Accordingly, any of the document data accumulated in the infinite memory server 13 and Web IMS 16 can easily be identified with those appended data.

Then, the server 12 has database with appended data stored therein prepared by being divided into each user ID in the hard disk drive 43 for the purpose of enabling easy retrieval of the document data accumulated in the infinite memory server 13 and Web IMS 16, and addresses in the infinite memory server 13 and Web IMS 16 in which document data is accumulated for each user ID added to the document data are stored in this database, and the fetched appended data is stored in a column prepared for each type of the data.

Figure 21:
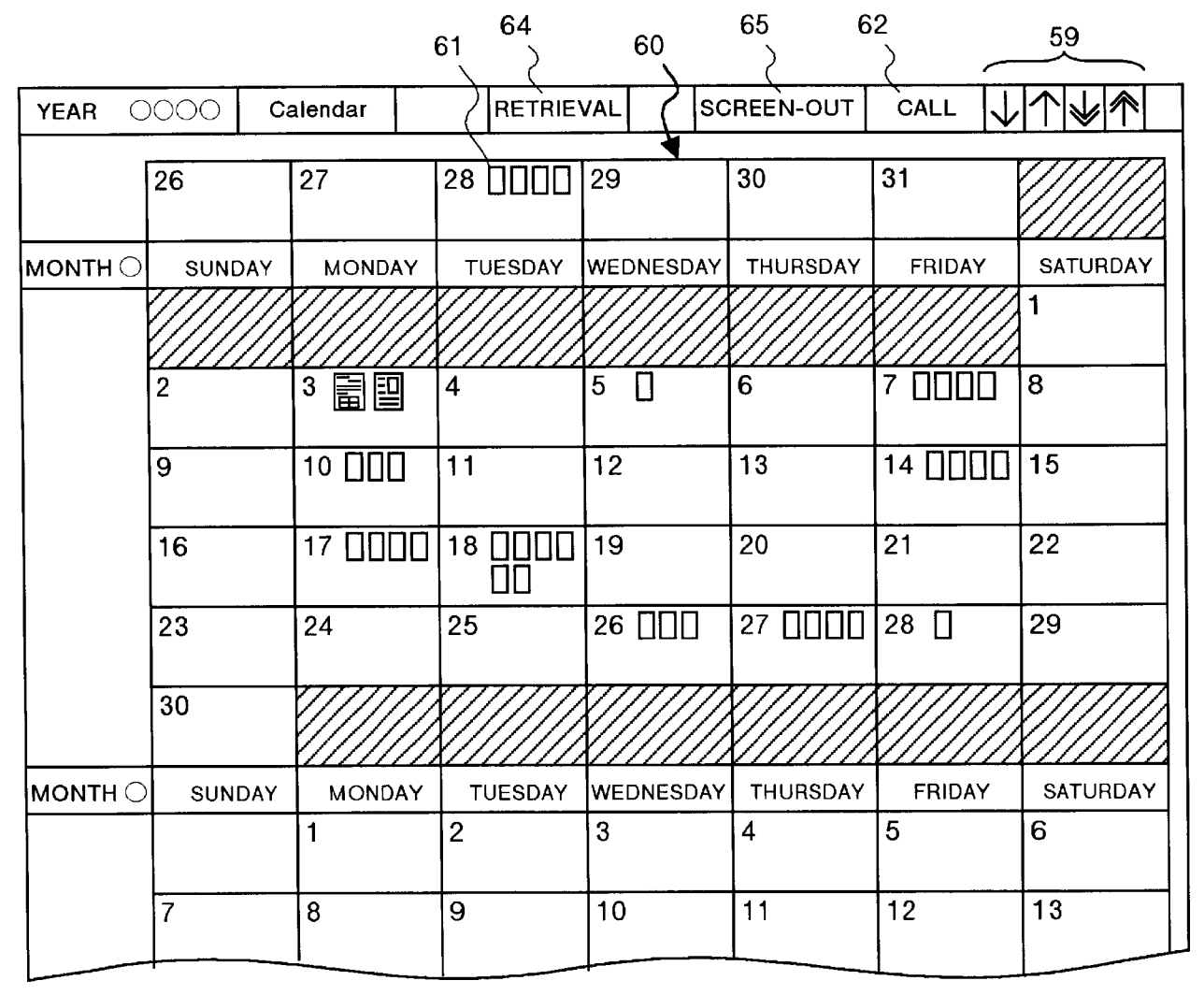
Figure 22:
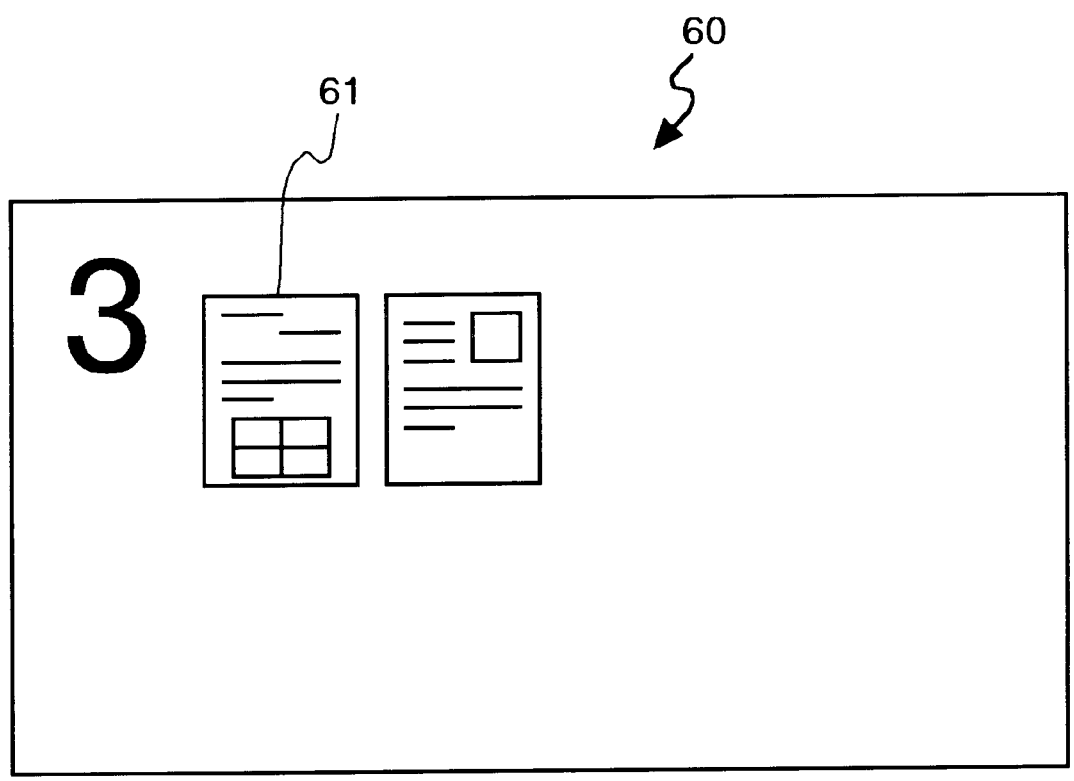
FIG. 22 is a partially enlarged view showing the display screen according to Embodiment 1.

Therefore, in the server 12, when a user inputs the user ID for giving a request to refer to document data, the CPU 41 reads out the document data correlated to the user ID from the infinite memory server 13 and Web IMS 16 according to the reference instruction, and selectably outputs the document data as a thumbnail image (a displayed image obtained by reducing encoded image data on the header page) 61 for each processed date (processed data information) on the screen of the display 44 with a calendar-view format 60 thereon that can be scrolled at high speed or low speed by the scroll button 59 as shown in FIG. 21 and FIG. 22 so that the user can retrieve and confirm the data, and when the user wants to check document contents such as characters, selected document data capable of scrolling can be outputted for filling the screen of the display 44 by selecting the thumbnail image 61 through clicking on it with a mouse 47 or pressing its displayed point on the touch panel 45 and further selecting a call button 62.

Figure 23:
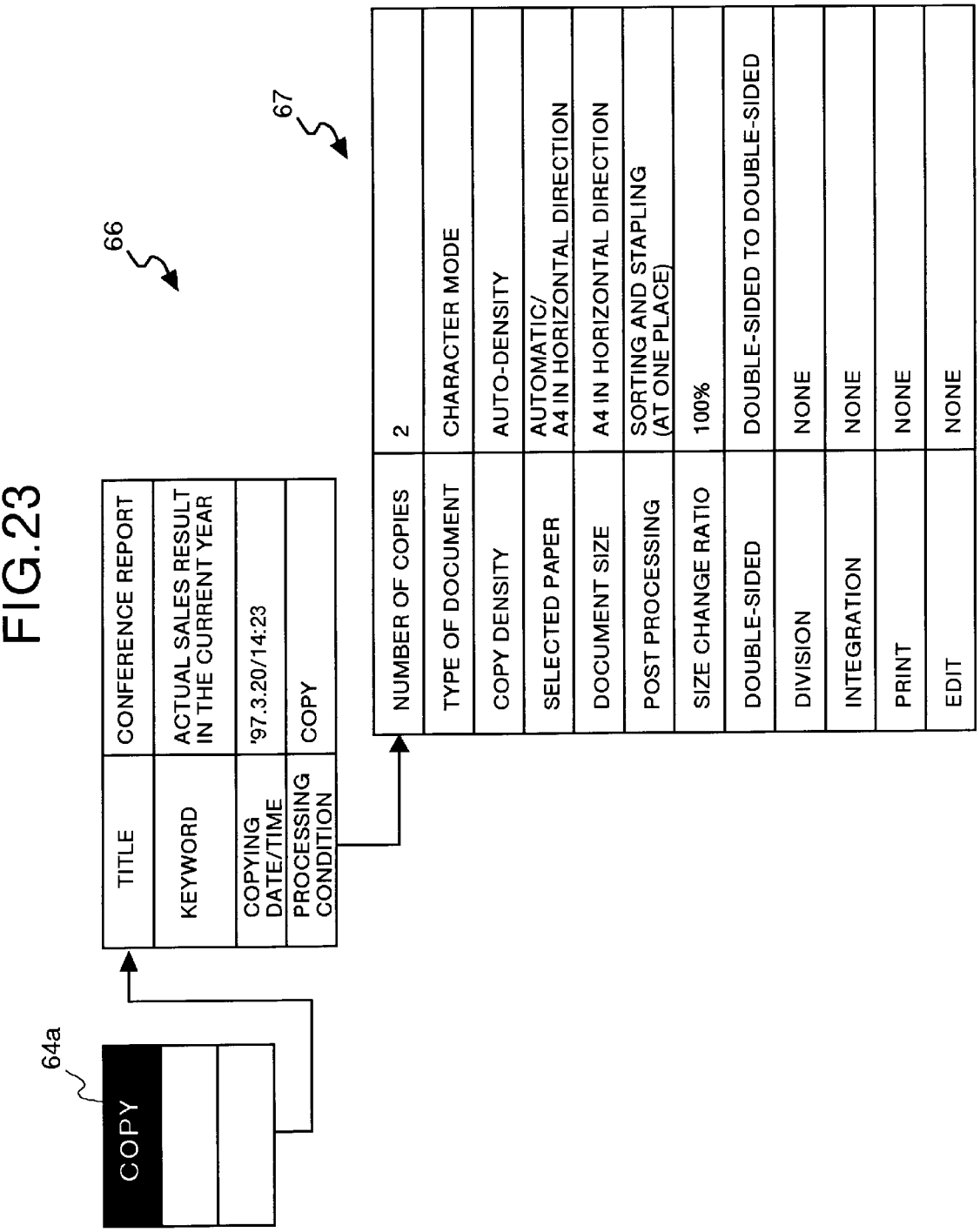
FIG. 23 is a flow chart showing the processing for referring in succession to FIG. 22 according to Embodiment 1.

Furthermore, the list shown in FIG. 23 can successively be displayed from the upper side in the left thereof by selecting a retrieval button 64 on the screen with the calendar-view format 60 thereon of the display 44 so that the processing for the document data can be checked, and when a copy button 64a is selected for confirming contents such as the type of document data having been copied, the list 66 of appended data such as a title and keywords of the document data is outputted for display so that the data can be confirmed, and if the processing condition in the list is further selected, the list 67 of appended data such as a number of copies and a type of document is outputted for display so that the data can be confirmed. It should be noted that, during the above operation, the server 12 executes, when the user specifies an arbitrary period as appended data through entry of date and time information and requests to refer to document data included in this period, reference processing according to the calendar with the period displayed therein.

Figure 24:
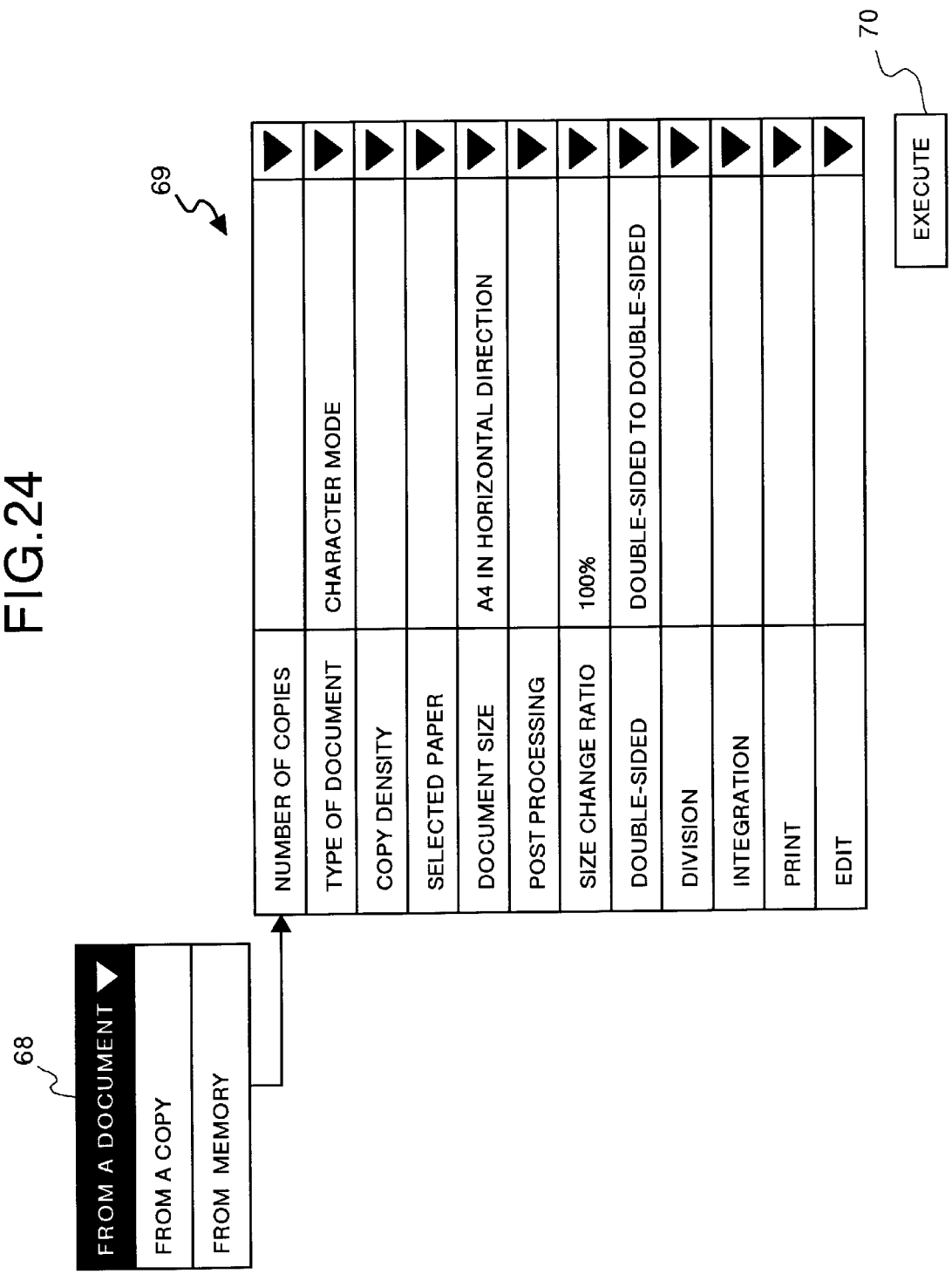
FIG. 24 is a flow chart showing the processing for referring to filed data in succession to FIG. 22 and different from FIG. 23 according to Embodiment 1.
Figure 25:
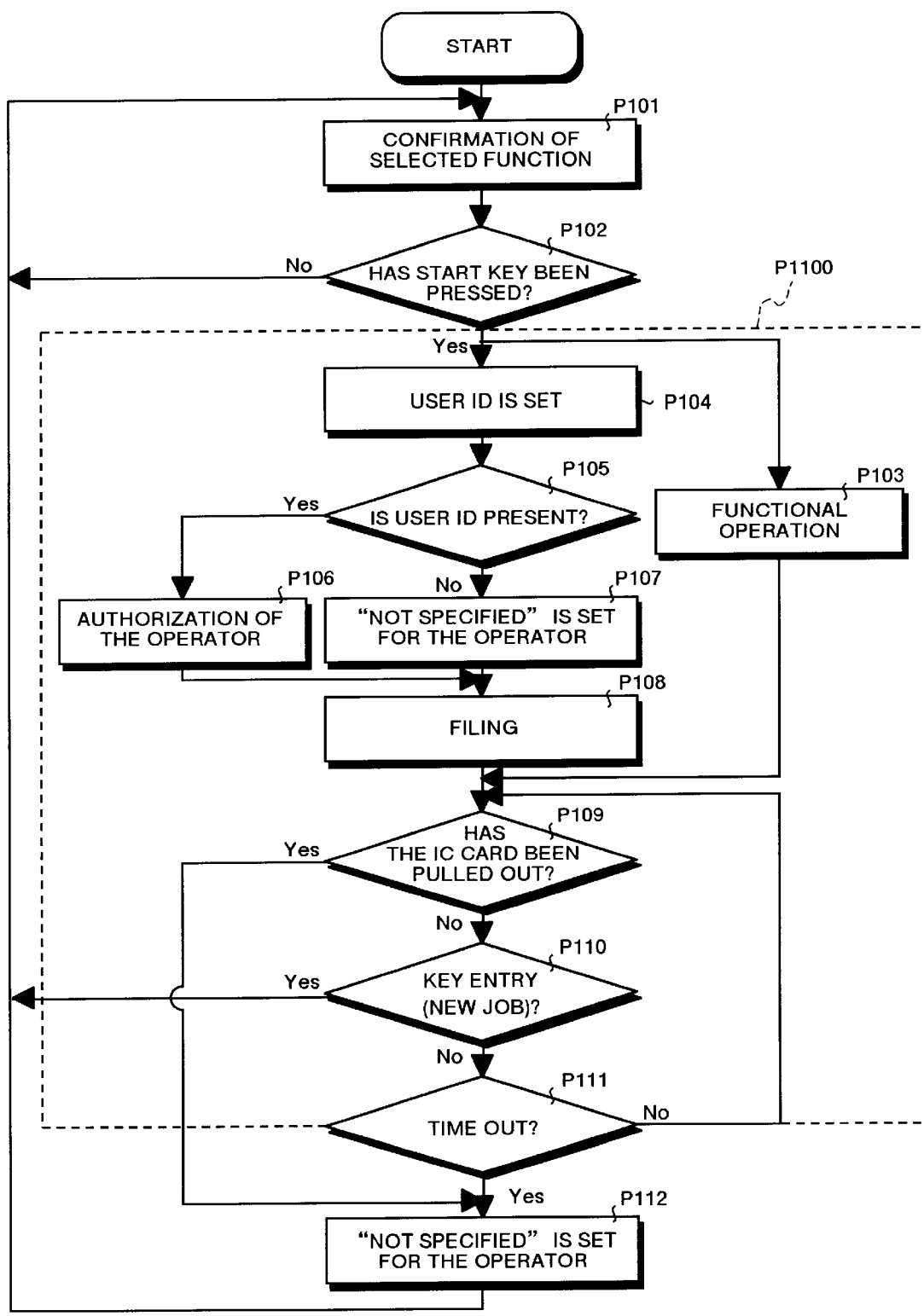
FIG. 25 is a flow chart showing a portion of the file processing according to Embodiment 2.

Furthermore, the server 12 successively displays, when the user inputs the user ID and requests to refer to document data, the list shown in FIG. 24 from the upper side in the left on the display 44 by selecting the screen-out button 65 shown in FIG. 21, and can selectably output a thumbnail image for display in the calendar view 60 without unnecessary document data therein by selecting a type of appended data tracing the memory in processing, and for this reason, when retrieval is made from appended data for a document, a condition capable of setting a mode can be specified by selecting a document button 68 and clicking on an icon "∇" in the right column for size and orientation of a document, and a thumbnail image 61 in the calendar view 60 of the document data correlated to corresponding appended data is displayed in reverse video with flashing red color by successively displaying, for example, in a case of the double-sided mode, a single surface both surfaces, both surfaces both surfaces, both pages in the right and left sides, and both pages in the back and rear sides for selecting, and then selecting an execute button 70 for concurrently outputting all the condition for display, on the other hand, when there are a plurality of corresponding document data, similarly to the description above, the list 66 of the appended data such as the title and keywords of the document data is outputted for display by selecting the retrieval button 64 and copy button 64a shown in FIG. 21 to confirm the data, and by selecting the thumbnail image 61 and call button 62, desired document data can also be outputted for filling the screen of the display 44.

Accordingly, the server 12 can display, when the user selects a menu for requesting to refer to document data processed by the copying machine 11 on the screen to reuse the document data, thumbnail images 61 matched with the user ID in a calendar format thereon in order of the latest one or of an arbitrary period, and reads out full document data (fetches again full document data having been processed) easily selected from the thumbnail images 61 by the user with a mouse to send the read-out data to the copying machine 11 together with the appended data, while the copying machine 11 can decode the document data by the image processor 29 to recover it and also output the data for recording according to the appended data used for processing of the image, so that the user can obtain the same document data as that having been outputted for saving backup copies thereof by reproducing it without inputting the processing conditions. It should be noted that, during the operation above, the appended data to be used for processing of the image may be inputted from the operating section 23 of the copying machine 11 by the user having referred thereto.

In addition, the server 12 reads out, when older document data than that accumulated in the infinite memory server 13 is instructed to be referred to, data such as the address of the provider, the registration ID and password for each user ID from the built-in non-volatile RAM to get access to the provider on the Internet and sends the reference instruction for the document data thereto, and through those operations, the server 12 can perform the processing of referring to any of the accumulated document data also by handling the Web IMS 16. Also the server 12 can also perform, for the shared document data having been processed without inputting a user ID, processing of referring to the document data correlated to the user ID (shared ID) by regarding a shared ID used for the copying machine 11 as a user ID used for referring thereto according to the reference instruction for the shared document data on condition that the user ID used for the copying machine 11 is inputted.

In Embodiment 1 as described above, the same document data processed by the copying machine 11 can automatically be accumulated (backup copies thereof are saved), because the operator can accurately be authorized by the user ID read out from the IC card ("Setting not specified" is set according to the shared ID when there is no user ID) without requiring a particular input operation, in the infinite memory server 13 on the Internet so that data can easily be stored and managed, and data can also be accumulated, through the service by the provider when the infinite memory server 13 becomes full of data, in the Web IMS 16 on the Internet, therefore, the copying machine 11 can be used without preparing an extremely large-capacity storage unit for each user as well as worrying about overflow or the like. In addition, the document data can be obtained again by issuing an instruction for reference processing through the server 12 when it is required and by being transferred from the infinite memory server 13 and Web IMS 16 to be outputted for recording by the copying machine 11 or in some other way.

During the operation above, a processing condition for document data processed by the copying machine 11 is correlated to the document data as appended data and accumulated and managed, and when the document data having been copied is retrieved and identified to be outputted again for recording, a user can select desired document data according to data such as a number of copied, size and orientation of a document, size and orientation of a paper in the appended data by referring to thumbnail images 61, and also select desired document data by retrieving some thumbnail images 61 (an area to be selected) required for checking by tracing the memory, while for re-processing of selected document data, appended data such as a copy density, an image mode, a size change ratio, post-processing, copying on both surfaces of a paper, divided copy, integrated copy, printing when copying, and edited copy is added to selected document data as processing conditions for copying and sent to the copying machine 11, and through the operation, the document data whose backup copies have been saved can be reproduced in the same format without inputting any of the processing conditions. Also appended data correlated to document data is changed to appended data with one processing condition added to one document data, which allows storage capacity of the hard disk drive 43 to be made the effective use of. Therefore, desired document data can easily be retrieved and also can be processed in the same format as that in accumulation by omitting an input operation such as a processing sequence by the copying machine 11 and processing conditions by a user, which allows usability to be enhanced.

As accumulation of document data can be canceled by pressing the "undo" button (as the processing of reading data out is disabled), data clearly unnecessary to save backup copies thereof or data requiring security can be prevented from its accumulation, so that a bad effect due to automatic saving of the backup copies can be resolved.

As a first mode of Embodiment 1 although it is not shown in the figure, when the file system is so configured that one user ID is acquired and further other user ID can be inputted therein and also when a plurality of user IDs are added to document data as appended data, each address of document data for each user ID and other appended data are stored in a database of the hard disk drive 43, so that the system may be programmed, if document data is shared materials for meeting and circulation, to enable reuse of the same document data identified by each user with own user ID.

As a second mode of Embodiment 1, although it has been determined that the same operator ends the processing by detecting a setting state of the IC card or detecting a time-out by a timer function, a "Document Break" button not shown in the figure is provided in the operating section 23, and the system may be designed, when a plurality of documents are to be processed, to separate document data for each document and send it to the sever 12 by pressing the "Document Break" button between documents processed by an operator, and to make the infinite memory server 13 and Web IMS 16 accumulate the separated document as discrete document data so that each of the documents can be referred to and reused.

As a third mode of Embodiment 1, a server may directly be connected to the copying machine 11 or may be incorporated in the copying machine 11. Also, by directly connecting a buffer to the copying machine 11 to relay document data or the like to the server 12 and directly accumulating the document data or the like in an infinite memory server without using Intranet, backup copies of the document data can be saved without fail by eliminating deletion of the document data on the Intranet even when any trouble occurs in the multi-functional box 15 and server 12, and in this case, even if the copying machine 11 is a device for performing high-speed data processing, the data is accumulated in the buffer without any load applied thereon and can be sent to the server 12 within the capacity thereof. It should be noted that the copying machine 11 and server 12 have a higher degree of flexibility if they are connected to each other through the Intranet taking into consideration restriction of a place to be installed or the like, so that it is most suited in this case to directly connect the buffer to the copying machine 11 from the viewpoint of reliability.

It should be noted that, in the embodiment described above, description has assumed the case where each person has own user ID, but it is needless to say that the file system according to Embodiment 1 can be used without any trouble even if the user ID is owned by each group such as each Department.

As the file system according to Embodiment 2 of the present invention has the basically same configuration as that according to Embodiment 1, so that illustration and description of the common sections are omitted herein and description is made herein only for characteristic sections in Embodiment 2 with reference to FIG. 25 to FIG. 32.

For instance, if the copy mode is selected by operating the operating section of the copying machine 11, the copying machine 11 copies document data obtained by reading an image of a document set on the reader 26 (step P103) when the start key is pressed (step P101, P102), and when an IC card is set on the operating section 23, the copying machine executes authorization setting for an operator (a user of the copying machine 11) according to the user ID read out from the IC card (steps P104, P105 and P106).

On the other hand, when the user ID can not be fetched, a shared ID read out from the non-volatile RAM in the control section is regarded as the user ID, and "Setting is not specified" is set for authorization of the operator (steps P104, P105 and P107).

Then the copying machine 11 encodes and compresses the same document data with the image processor 29 in parallel to the processing with the selected function, and appends the user ID and other data such as processing date and time information concerning the time of processing counted by a timer function not shown herein or processing conditions (such as a reduction ratio) as appended data (code data) to the document data to accumulate the data in the infinite memory server 13 on the Intranet, and transmits the data to the server 12 to have the data accumulated (filed) therein (step P108).

Thus, the same document data processed by the copying machine 11 is automatically accumulated with appended data identifying the document data appended (correlated) thereto without requiring an operation to carry out any specific input operation for execution of the processing (regardless of whether an accumulate instruction is inputted or not), and a back up copy of the document data is automatically prepared. In this step, also document data to be processed without any user ID is similarly accumulated as it is by using the command ID without requiring input of the user ID. It is needless to say that the date and time information for the accumulation processing counted by the timer function 50 of the server 12 may be used as the processing date and time information as appended data, but as the date and time information from the copying machine 11 is that inputted by an operator, configuration according to Embodiment 2 is more preferable.

When the IC card is pulled out, it is determined that the processing has been terminated by an operator (step P109), and also when time after completion of the processing for reading a document set on the reader 26 is counted with a timer function not shown herein and passage of a preset period of time previously set is detected, it is determined that the processing has been terminated by the operator (step P111), and with either one of the two conditions above is satisfied, a user ID identifying the operation having executed the operation for processing the document data is cleared, and a default shared ID to be used when a user ID can not be fetched is set (authorized) and "Setting is not specified" is set for authorization of the operator, so that a case where different users use the same user ID can be prevented (step P112).

In the steps P109, P111, when it is determined in the state where an IC card is kept set that a preset period of time counted by the timer function has not passed and a start instruction for new processing is issued, for instance, by pressing the F key or start key (step P110), system control returns to step P101 with the user ID validated as it is, and the same processing sequence is repeated.

Therefore, access by a different operation can be detected without fail, and the user ID is again fetched and accurately appended to the document data.

When the "undo" button provided in the operating section 23 for inputting an accumulation suspend instruction is pressed in any of the steps P102 to P111 (step P110), the copying machine 11 skips a step of backup processing in the control program and continues only the processing with its own functions, and if the "undo" button is pressed after accumulation of document data in step P108 is started, appended data for accumulated data being accumulated or just having been accumulated is deleted to disable an operation for reading out the document data, and accumulation of the document data is canceled.

Accumulation of document data filed without requiring a user to carry out an input operation other than an operation for using any function of the copying machine 11 is canceled only by pressing the "undo" button in the operating section 23 in any of the steps P102 to PP111, so that, when an image with higher degree of security is copied, it is possible to prevent the document data to be filed with the intention to use the document data again. It is needless to say that, even if accumulation of document data has not been canceled by pressing the "undo" button in the operating section 23 of the copying machine 11, the document data can be deleted (or accumulation of the document data is canceled) by inputting the user ID in the server 12.

Figure 26:
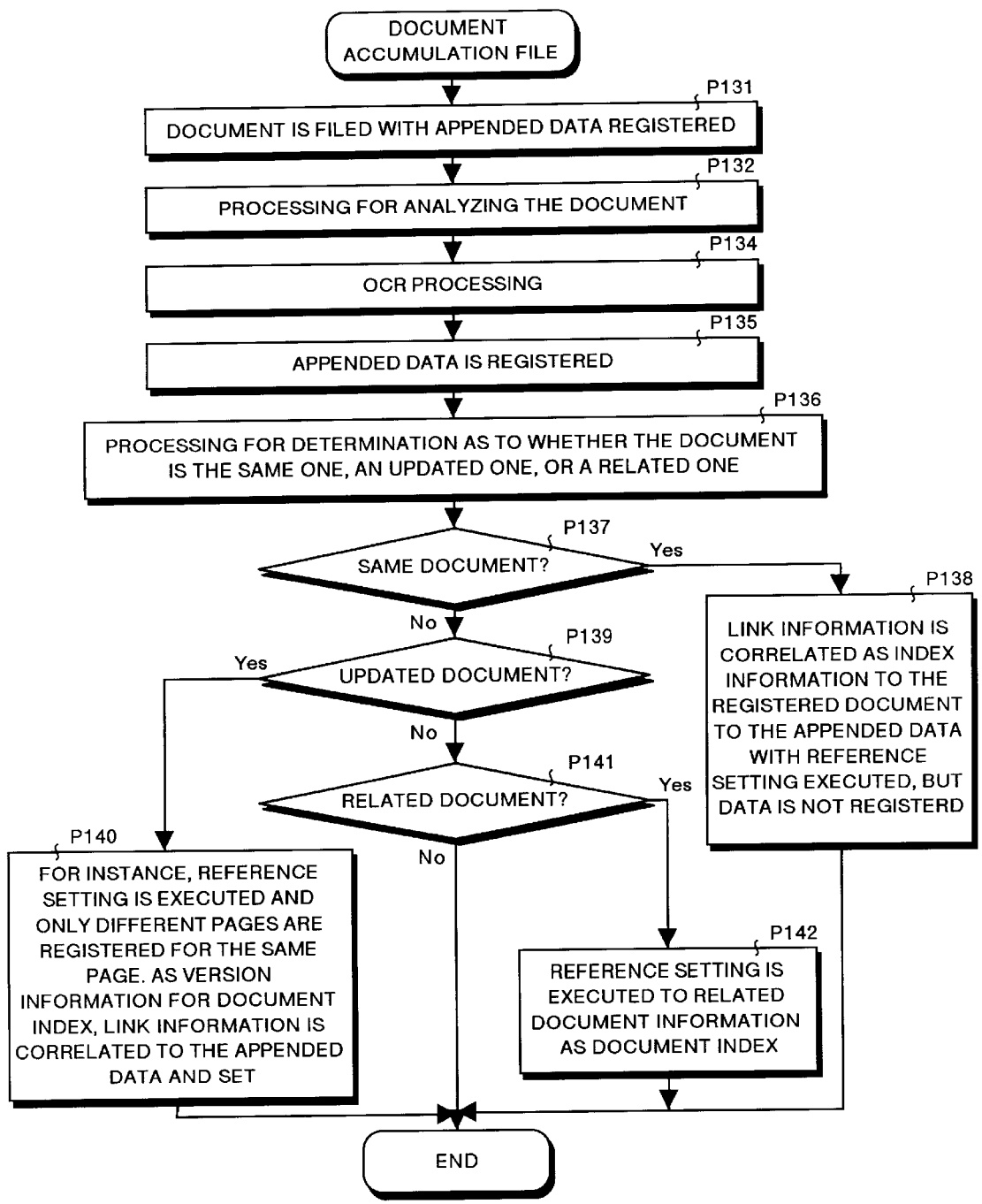
FIG. 26 is a flow chart showing a portion of the file processing according to Embodiment 2 which is different from that shown in FIG. 25.

On the other hand, in the server 12, for the purpose to enable easy retrieval of document data accumulated in the infinite memory server 13 and Web IMS 16, a database for storing therein appended data is prepared for each user ID in the hard disk drive 43, and when appended data including a user ID, processing date and time information, processing conditions, a tile appended to document data received from the PC 14 is received together with the document data from the copying machine 11 through the Intranet upon execution of operation in step P101, as shown in FIG. 26, at first the received document data is accumulated and filed in the infinite memory server 13 and at the same time the appended data sent from the copying machine 11 such as the processing data and time information, processing conditions, and a tile each for identifying the document data is registered in correlation to the user ID in a column prepared for each type in a database in the hard disk drive 43 so that it can easily be used as a file unit (step P131).

Figure 31:
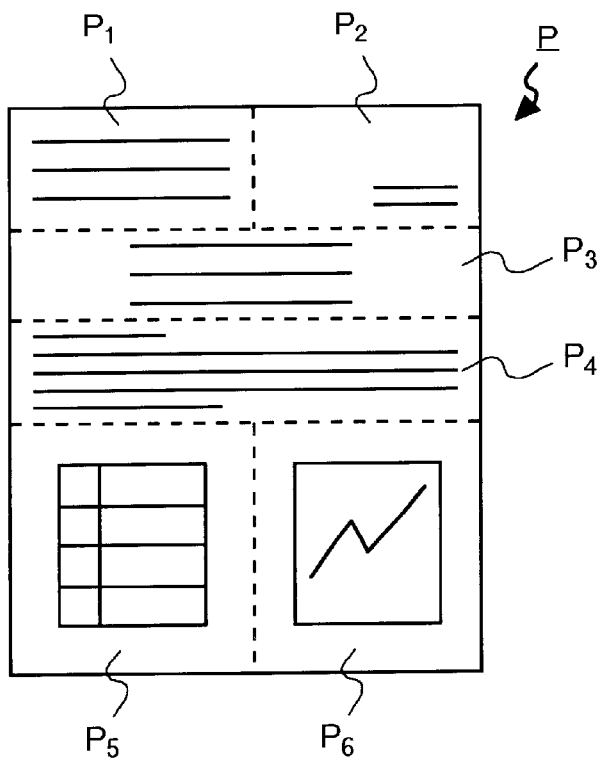
FIG. 31 is a conceptual view showing one example of document to be filed according to Embodiment 2.

To fetch further appended data for identifying document data, after the PC 14 executes the processing for correcting or supplementing document data or the document analysis processing such as the processing for recognizing the document areas p1 to p4 or image areas p5, p6 in the document shown in FIG. 31, the server 12 subjects the document data to the OCR (Optical Character Reader) processing to code the character data or to fetch keywords repeatedly used in the document (step P134) and registered in the databases in correlation to the accumulated document data (step P135). Therefore, the document data accumulated in the infinite memory server 13 and Web IMS 16 can easily be identified also according to the appended data.

Figure 27:
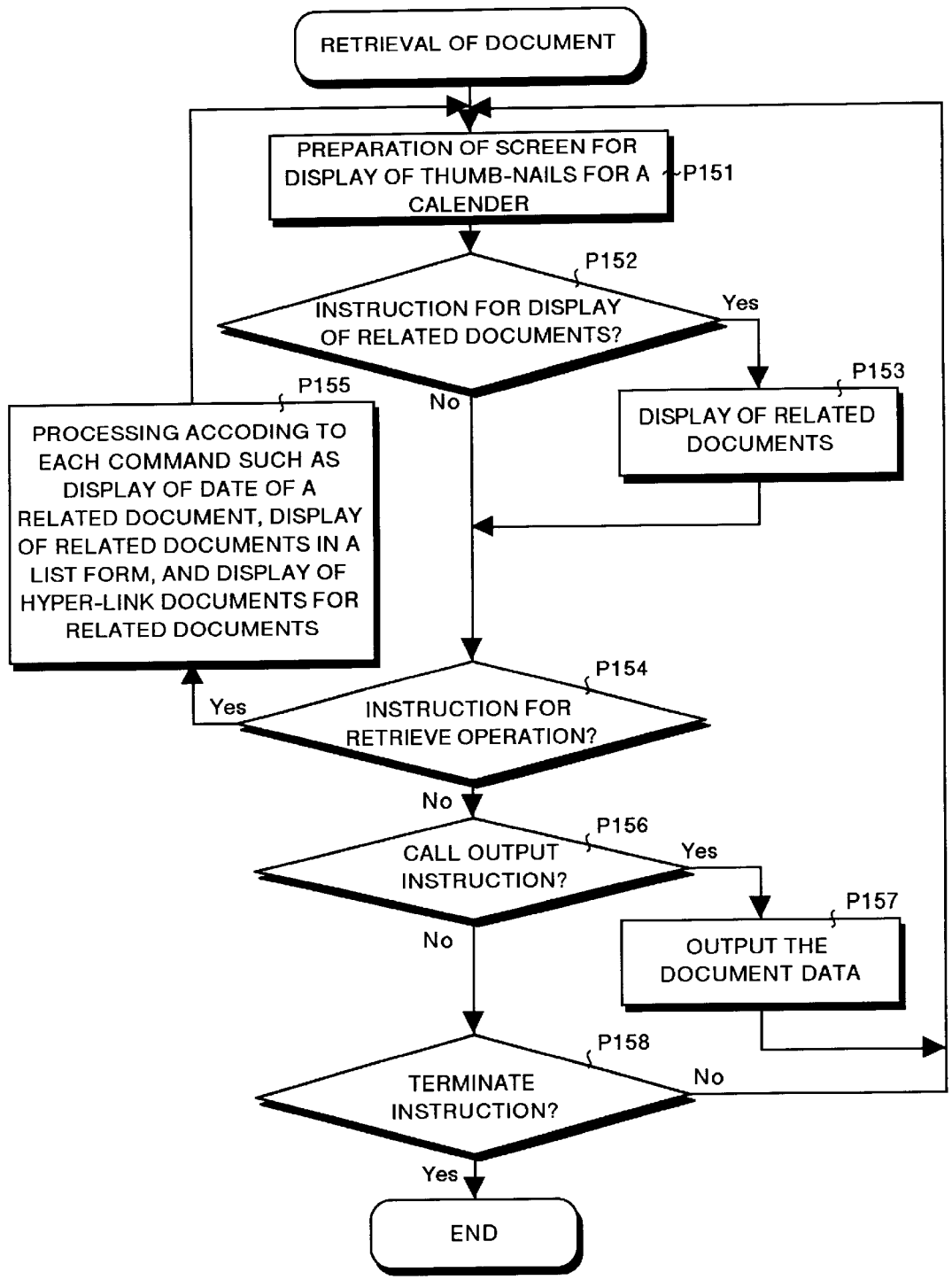
FIG. 27 is a flow chart showing reuse of processed data which has been already filed according to Embodiment 2.
Figure 28:
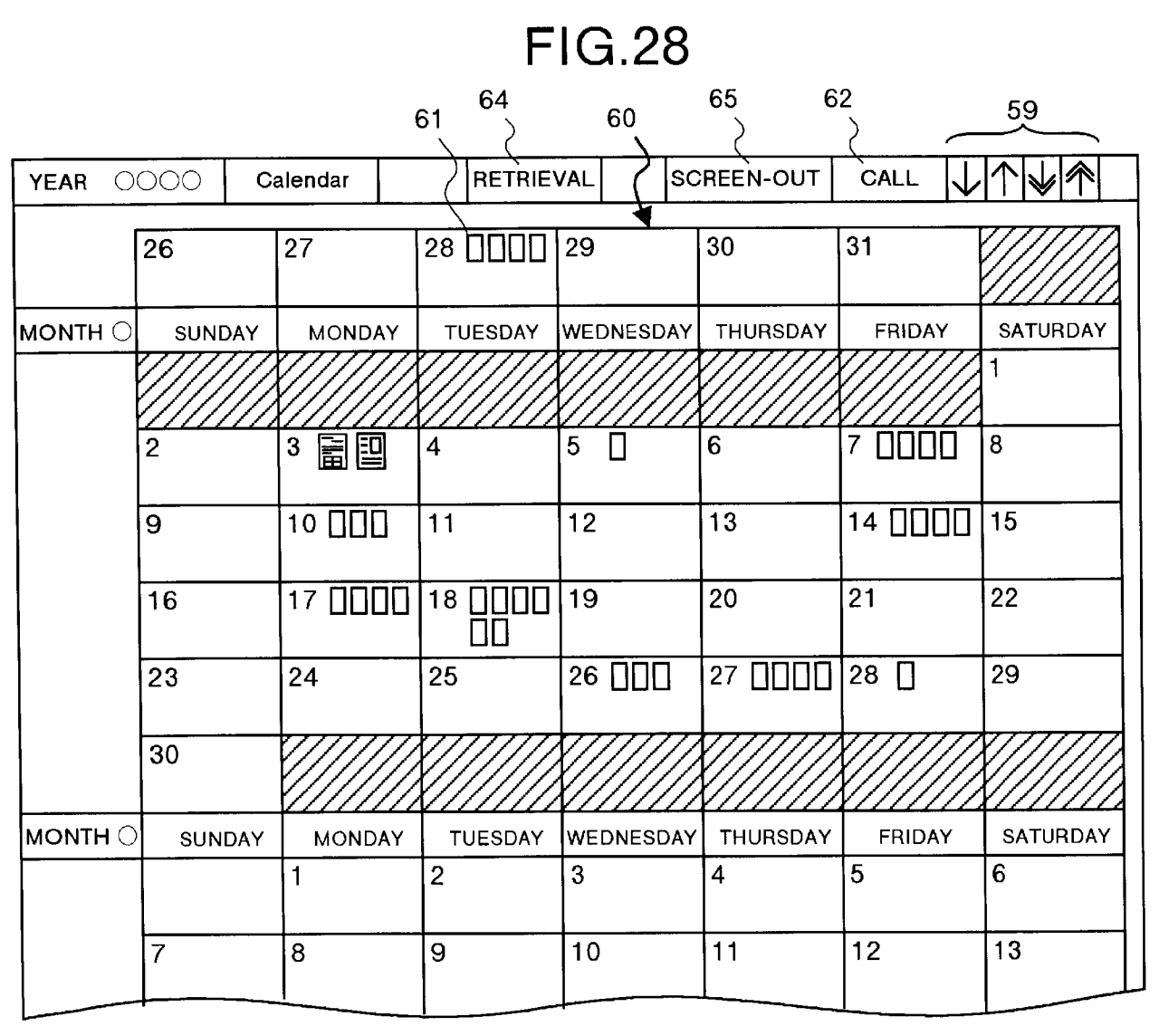
Figure 29:
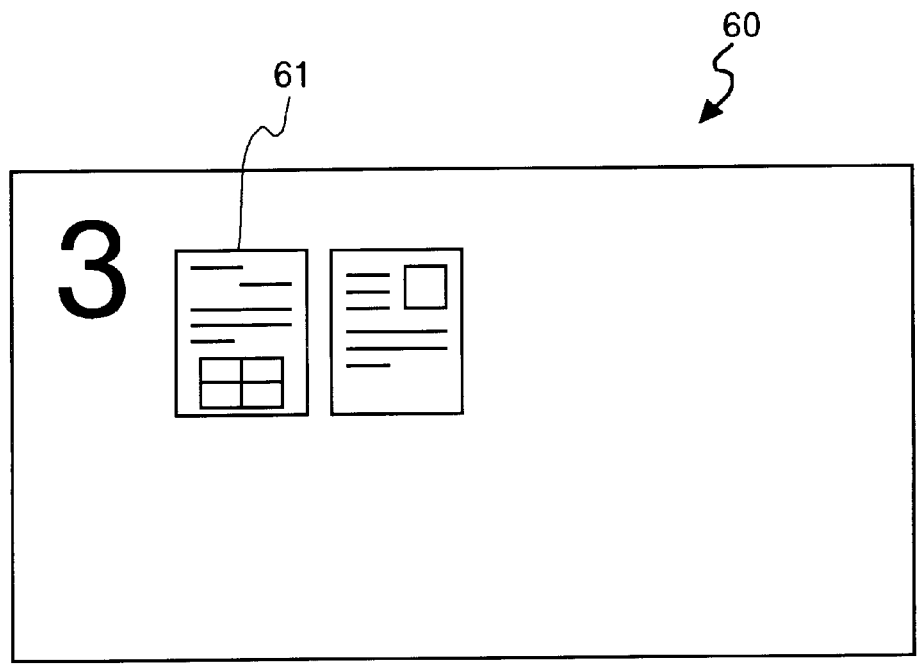
FIG. 29 is a partially enlarged view showing the display screen according to Embodiment 2.

In the server 12, when a user requests reference to document data by inputting the user ID, the CPU 41 reads out document data correlated to the user ID from the infinite memory server 13 and Web IMS 16 and appended data from the hard disk drive 43 according to the reference instruction and outputs for display the document data and appended data to the display 44, and in this step, as shown in the flow chart in FIG. 27, the CPU 41 prepares a display screen with a calendar view format scrollable at a high or low speed with the scroll button 59 shown in FIG. 28 and FIG. 29, at the same time prepares a thumbnail image 61 obtained by contracting a header head of the document data and outputs for display for each corresponding processing data and time (processing data and time information) (step P151), and, when an instruction for displaying the document data in correlation to the related documents described later is issued, executes the processing (steps P152, P153), and further when an operation instruction for retrieving document data to be used again is inputted (step P154), executes the various types of processing (step P155).

For instance, if it is desired to confirm contents of a document such as a character therein, it is possible to scrollably display the selected document data on the entire screen of the display 44 by means of clicking the mouse 47 on the thumbnail image 61 or pressing the section to be displayed on the touch panel 45, and further it is possible to have also other appended data displayed in a list form document by document for confirmation by selecting the retrieve button 64 on a display screen with the calendar view form 60 on the display 44, and also it is possible to omit the thumbnail image 61 for not required document data from the calendar view 60 or to have the thumbnail image 61 in the calendar view 60 flickered with red color in the inverted mode for the purpose to reduce a number of documents to be checked by selecting a screen-out button 65 and specifying other processing date and time in an arbitrary period or other appended data.

When desired document data is present and a user selects the thumbnail image 61 for the document data and specifies a destination for output by selecting the call button 62 (step P156), the server 12 reads out document data from the infinite memory server 13 (all of processed document data is again read out) and outputs for display on the display 44, or restore the document data by sending together with the appended data to the copying machine 11 and decoding the data with the image processor 29 and outputs for recording according to the appended data used in image processing (step P157), and with this feature the user can reproduces and obtain the document data outputted when filing the document data without executing any specific operation for inputting the processing conditions. Then the system control returns to step P151 with the same processing repeated until the terminate button not shown herein is selected, and when the terminate button is selected, the processing is terminated (step P158).

It should be noted that the appended data used for processing an image may be inputted by a referring user from the operating section 23 of the copying machine 11. When reference to document data older than those accumulated in the infinite memory server 13 is instructed, such data as an address of s service provider, an registration ID for each user ID, and a password are read out from an incorporated non-volatile RAM, the server 12 can execute the processing for referring to the accumulated document data by accessing the service provider on the Internet, sending an instruction for reference to the document data, and also treating the Web IMS 16 similarly. Also the server 12 can process shared document data processing without requiring input of user ID, if a user ID used in the copying machine 11 is inputted, by regarding the shared ID for the copying machine 11 as a user ID used in reference upon an instruction for reference to the shared document, and also by similarly referring to the document data correlated to the user ID (shared ID).

Further the CPU 41 in the server 12 checks whether the document data sent from the copying machine 11 has any relativity with the document data already accumulated in the infinite memory server 13 and Web IMS 16 in correlation to the same user ID in the database or not, and if it is determined that there is some relativity, the server 12 appends link information to both data and accumulates the data, and more specifically, in FIG. 26, the server 12 subjects document data received from the copying machine in steps P134, P135 to the OCR processing to get the keywords and registers the keywords in a database (step P134, P135), and then checks whether the new document data is related to the already accumulated document data (existing data) or not, for instance whether the new document data is the completely same document, or an updated document prepared by partially rewriting the existing document data, or a related document having contents related to those of any existing document data or not (step P136).

As a result of determination, when it is determined that new document data is completely the same as any existing document data (step P137), by correlating the same link information to the two appended data based on the recognition that only preparation of a database (registration of appended data) was executed by deleting the new document data from the infinite memory server 13 (step P138), the thumbnail image 61 is prepared and display by using the shared existing document data, and when the other appended data is to be confirmed, existence of the same document is indicated in a list so that the appended data can be used again.

Figure 30:
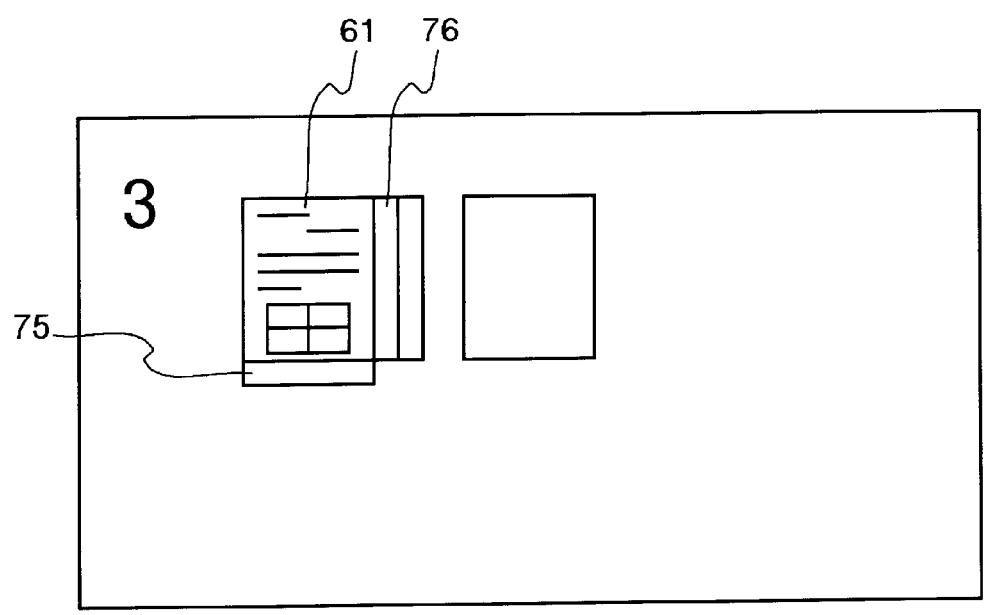
FIG. 30 is a partially enlarged view showing a display screen according to Embodiment 2 which is different from that shown in FIG. 29.

When it is determined that the new document data is an updated document data prepared by rewriting a portion of any existing document data (step P139), a portion of the document data other than the updated portion (updated data) is deleted from the infinite memory server 13 (only the updated data is correlated to appended data and is accumulated in the infinite memory server 13 and Web IMS 16), and the thumbnail image 61 is prepared and display by correlating the updated link information (so-called the version information) to appended data for the two types of data (step P140) and substituting the corresponding portion of the existing document data with the updated data, and in the calendar view 60, by executing the step P153 in FIG. 27, as shown in FIG. 30, the thumbnail image 61 is displayed in a layered form under and at the back of the other thumbnail image 61 as a related image 75, so that the user can easily display, check and use again the thumbnail image 75 by clicking the thumbnail image 75 and the appended data by clicking on the related image 75.

When it is determined that the new document data is related document data relating to any existing document data, for instance, in the point that keywords in the both data coincide by a preset number or more (step P141), link information is correlated to both of the appended data step P142), one thumbnail image 61 is displayed in a layered form in the right side to and at the back of the other thumbnail image 61 as a relation image, so that the user can easily display check and use again the thumbnail image 75 by clicking the thumbnail image 75 and the appended data by clicking on the related image 75.

Therefore, when filing the same document, namely an updated document, wasteful use of the infinite memory server 13 and Web IMS 16 can be eliminated, and a number of document data which can be accumulated therein can be increased with the apparent file capacity enlarged. A form of display of the related images 75, 76 is not limited to a layered form, and they may be displayed in adjacent to each other side by side, so that the user can easily check the related images 75, 76.

Whether the new document data is the completely same document data as any existing document data or one prepared by updating any existing document data can be conformed by preserving image data in an image area together with character code data obtained by converting document data with the CPU 41 by way of subjecting the document data to the OCR processing for a certain period of time (for instance, for one month) in the hard disk drive 43, comparing the new document data to any existing document data page by page or block by block in a page (in a case of image data, comparison is made by matching edges of new and old images, or block by block when document blocks p1 to p4 or image blocks p5, p6 are displayed in a document P as shown in FIG. 31), and for instance, if the block p4 is not coincident, the block p4 is regarded as updated data and accumulated for management. It should be noted that, as sometimes the OCR processing for document data can not be executed completely, in a case of document data consisting of only characters, when a number of characters, positions of periods and commas, a number of words (a number of spaces between characters in English sentences) in both documents are completely coincident to each other, it is determined that the two documents are completely coincident to each other, and in this step, if font size or colors specified for each character are different, or when any correction mark (a specific sign indicating correction) is included in the document, it may be determined that the new document data is an updated document data.

Even if it is determined that the new document data is not the completely same as any existing document data nor update document data, when there are common keywords more than a specified number in both the new document data and existing document data, or when the titles of both document data are coincident to each other, the new document data is accumulated for management as related document data, and in this step the new document data may be regarded and accumulated as related document data, if it is determined by extracting important sentences in the two document data (according to the method described, for instance, in Japanese Patent Laid-Open Publication HEI 9-34905) that the key sentences are coincident to each other. Further in this step, key words not included in other document data correlated to the existing document data correlated to the new document data may be added so that the keywords extracted in the processed are appended as common keywords (so-called merging) and a user can retrieve the document data according to the keywords which is originally not included in the document data), and in that case, related document data can relationally be retrieved according to the added keywords, which improved efficiency in retrieval.

Correlation of document data is usually executed automatically, but may be executed (when not automated) by removing and piling up the thumbnail image 61 in the calendar 60 by way of operating the mouse 47 in the server 12 (so-called drag and drop) and registering the link information in the database for correlation, and even when a certain period of time has passed and the relativity becomes unclear, correlation may be executed by specifying appended data such as keywords and titles in each document data and displaying the appended data in a list (or outputting for recording), by displaying the document data side by side for comparison, or by displaying only different sections through the OCR processing, then registering the link information by way of drug and drop for correlation.

In Embodiment 2 of the present invention, the same document data processed by the copying machine 11 can easily be stored and managed, without requiring an operator to carry out any specific operation for inputting data, by authorizing an operator by reading out and checking a user ID from an ID card (or by confirming the shared ID on the recognition that "Setting is not specified" for authorization of the operator) and accumulating (filing) the user ID in the infinite memory server 13 automatically on the Intranet, and further when the infinite memory server 13 becomes full, the data can be accumulated in a Web IMS 16 on the Intranet by making use of services provided by a provider, so that it is possible to use the copying machine 11 without preparing an extremely large capacity storage unit for each user or without being scared by the possibility of data overflow. In that case, the document data can again be acquired and used, when required, by issuing an instruction for reference processing from the server 12 and having the document data transferred from the infinite memory server 13 and Web IMS 16 to the copying machine 11.

When processing conditions for document data processed by the copying machine 11 is correlated as appended data and accumulated for management and, for instance, the document data subjected to the copy processing is again outputted for recording by retrieving and identifying the document data, the desired document data may be selected, by referring to the thumbnail image 61, according to the processing data of the appended data or keywords, or by screening out the thumbnail images 61 required to confirm according to the appended data (namely by specifying a range of selection), and further when the selected document data is to be processed again, for instance, by appending appended data such as a reduction ratio as processing condition for the copy processing to the document data and sending the document data to the copying machine 11, the filed document data can be reproduced with the same format without requiring the operator to carry out any specific operation for inputting a processing condition. Thus, desired document data cane easily be retrieved and also can be processed with the same format as that in accumulation without following the processing sequence in the copying machine 11 or without requiring an operator to carry out any specific operation for inputting processing conditions or other data, which improves convenience in use.

When link information is correlated to document data displayed in the calendar view 60, it is possible to check presence of the same document processed again, an updated document as an updated "version", related documents coincident in keywords to the document to a certain degree (such as documents used in the same conference) from a list of appended data for the document data, and further it is possible to check presence of updated documents or related documents according to related images 75, 76 for the thumbnail images 61 displayed with one date, so that the thumbnail images 75, 76 can be displayed and confirmed only by clicking on the thumbnail image according to the necessity and the document data can be used again without the necessity of retrieving and checking other date. In a case of the same document, the newly-processed data itself is not accumulated, and data already processed can be used, and in a case of an updated data, only the updated data is accumulated and substituted with a portion of the existing data already processed to restore and reuse the updated document, so that wasteful use of the infinite memory server 13 and Web IMS 16 by the same data can be presented and an apparent file capacity of the document data can be enlarged.

As accumulation of document data can be suspended by pressing the "undo" button (a reading operation is suppressed), accumulation of data which is clearly not required to be filed or data requiring security can be suspended, and negative effects by automatically filing document data can be eliminated.

Figure 32:
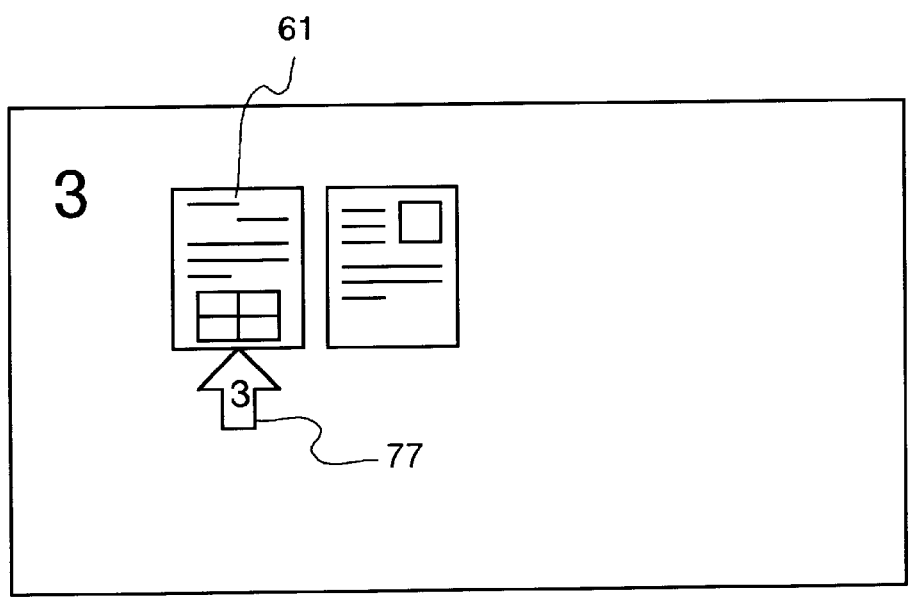
FIG. 32 is a partially enlarged view of a display screen according to another mode of Embodiment 2 different from those shown in FIG. 29 and FIG. 31.

As a first mode of Embodiment 2, different from Embodiment 1 described above in which the thumbnail image 61 and related images (thumbnail images) 75, 76 are displayed in a layered form and presence of contents of other relating document data can be checked according to one date, as shown in FIG. 32, presence of related documents in the calendar view 60 may visually be displayed by attaching an arrow mark 77 with a differently-colored number for each relativity type to the thumbnail image 61, and the arrow marks 77 may be linked with different types of line to each other, so that the position of the thumbnail image 61 for the document data can visually be determined.

As a second mode of Embodiment 2, although not shown herein, after one user ID is fetched, another user ID may be inputted, and when a plurality of user IDs are appended, an address and other appended data for t he document data for each user ID may be stored in a database in the hard disk drive 43, so that documents to be shared in a conference or for circulation can be used again by each user by identifying the same document inputting the user's ID.

As a third mode of Embodiment 2, different from the Embodiment 2 described above in which end of processing by the same operator is detected by setting that an ID card is set or by detecting with a timer function that a prespecified period of time has passed, a "Document Zoning" button not shown herein may be processed in the operating section 23, and in that case, when a plurality of documents are to be processed, by pressing the "Document Zoning" button between sections of a document to be separated, the document data can be separated to several sections and sent to the infinite memory server 13 and Web IMS 16 for accumulation there as separated document data, so that each of the newly-prepared document can be used discretely.

As a fourth mode of Embodiment 2, the server 12 may directly be connected to the copying machine 11, or the server 12 may be incorporated in the copying machine 11. A buffer unit may directly be connected to the copying machine 11 to relay document data or the like to the server 12, and in that case, by directly accumulating the document data or the like in a large capacity storage unit through transferring the document data or the like through the Intranet, it is possible to accurately file the document data or the like without fail and without the document data or the like being lost on the Intranet even if any trouble occurs in a multi-functional box 15 or in the server 12. When taking into considerations limitations concerning a site for installation, a freedom degree is higher when the copying machine 11 and server 12 are connected through the Intranet, and in that case it is better from a viewpoint of reliability to directly connect a buffer unit to the copying machine 11.

Although the above description of Embodiment 2 assumes a case where an operation for reusing document data is executed in the server 12, configuration is allowable in which the PC 14 functions as an output managing unit and an user carries out an input operation from a job site like in the server 12 described in Embodiment 2 above by accessing the server 12, and in a system having this configuration, the user can input a request for specific document data also with the PC 14 by visually checking the calendar view 60 and returning the image data prepared for display through the Intranet. It is needless to say that the server 12 may not has an operating system such as the display 44.

Although the above description of Embodiment 2 assumes a case where each user has a specific user ID, it is needless to said that Embodiment 2 can be carried out without any problem even in a case where a user ID is specified, for instance, for each department or group.

Figure 33:
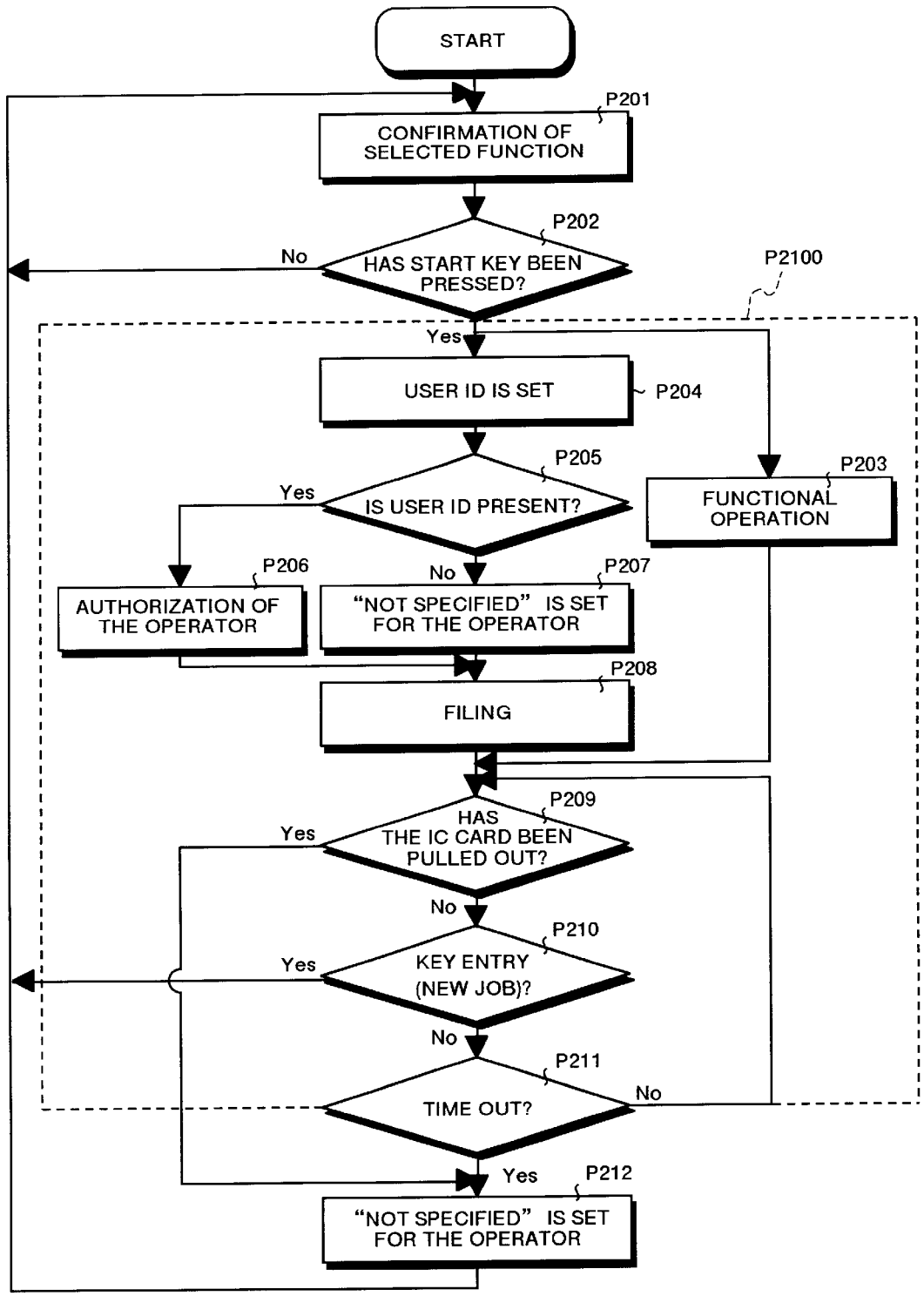
FIG. 33 is a flow chart showing a portion of the file processing according to Embodiment 3.
Figure 35:
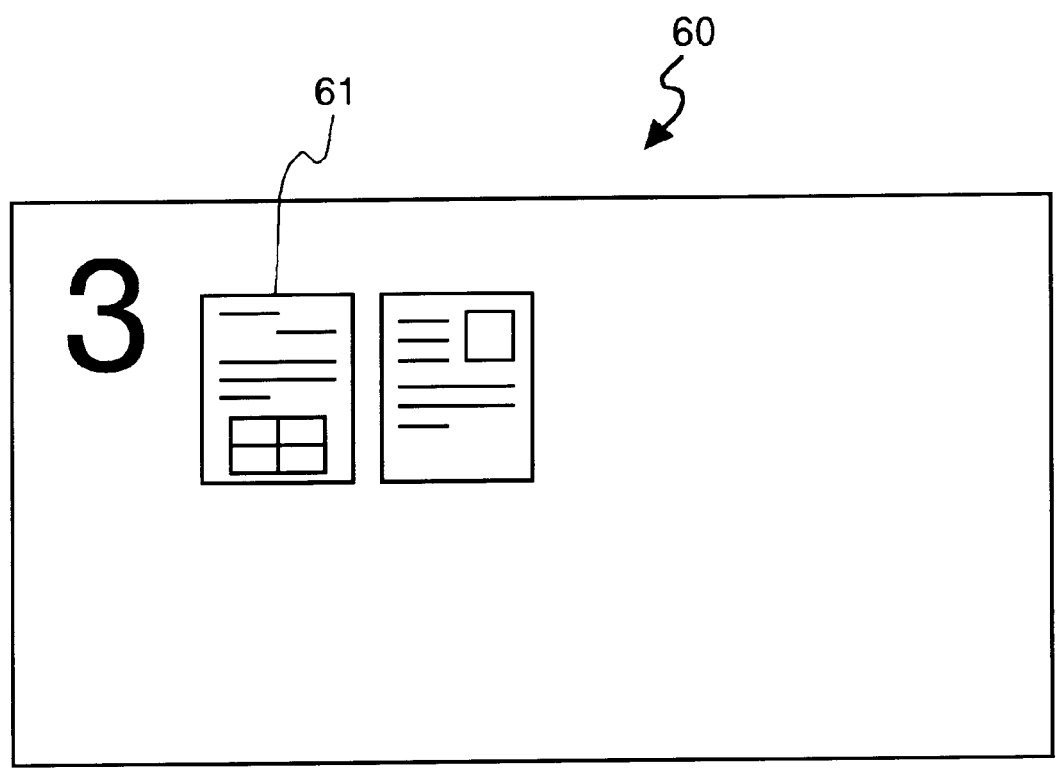
FIG. 35 is a partially enlarged view showing the display screen according to Embodiment 3.

As configuration of a file system according to Embodiment 3 is basically the same as that of the file system according to Embodiment 1, description and illustration of the common portions are omitted herein, and description is made herein only for the characteristic portions by using the FIG. 33 to FIG. 35.

As shown in the flow chart in FIG. 33, for instance when a user selects the copy mode by operating the operating section 23 of the copying machine 11 and presses the start key as it is (step P201, P202), the copying machine 11 copies document data obtained by reading an image of a document set on the reader 26 (step P203), and when an IC card is set on the operating section, the copying machine 11 executes setting for authorization of the operation (user of the copying machine 11) according to a user ID read from the IC card (step P204, P205 and P206).

On the other hand, when a user ID can not be fetched, a shared ID read out from the non-volatile RAM of the control section 21 is regarded as ID for the user and "Setting is not specified" is set for authorization of the operator (steps P204, P205 and P206).

Then the copying machine 11 encodes and compresses the same document data with the image processor 29, in parallel to the processing with the selection function, then appends the processing date and time information indicating a point of time of processed counted with the timer function not shown herein or processing condition (such as a reduction ratio) together with the user ID for accumulation in the infinite memory server 13 on the Intranet as appended data (code data) to the document data and sends the document data to the server 12 for accumulation (filing) herein (step P208).

With this feature, the same document data processed by the copying machine 11 is automatically accumulated and filed with appended data for identifying the document data appended (correlated ) thereto and without requiring an operator to carry out any specific operation for inputting data for execution of the processing) irrespective of whether an accumulate instruction is inputted or not). Also in this step, even the document data to be processed without checking the user ID is accumulated using the shared ID as it is without requiring input of the user ID. It should be noted that, although it is needless to say that data and time information indicating a point of time of processing for accumulation counted by the timer function 50 of the server 12 may be used, Embodiment 3 is preferable because the date and time information from the copying machine 11 is those prepared by the operator.

When an IC card is pulled out, it is determined as the terminal processing by the operator (step P209), and also when it is detected that a time counted by a timer function not shown herein after end of the processing for reading a document set on the reader 26 has surpassed a preset period of time, it is determined that the processing is terminated by the operator (step P211), and when either one of the two conditions above is satisfied, the user ID identifying the operator having carried out the processing for the document data is cleared with the default shared ID set in preparation for a case where the user ID can not be fetched and "Setting is not specified" set for authorization of the operator, and thus it is possible to prevent a different user from using the same user ID (step P212). Then, in the steps P209, P211, if a start instruction for new processing is issued according to other key entry, for instance when a user pressed any F key or the start key, before a period of time counted by the timer surpasses the preset period of time in the state where the IC card is kept set (step P210), system control returns to step P201 with the same user ID preserved, and the same processing sequence is repeated.

Because of the feature as described above, change of an operator can accurately be detected, and the user ID is appended to the document data without being fetched again.

When the "undo" button not shown but provided on the operating section 23 for specifying an accumulation suspend instruction is pressed in any of the steps P202 to P211 (step P210), a step of backup processing in the program is skipped with only the processing with prepared functions continued, and when the "undo" button is pressed after accumulation of data is started by executing the processing in step P208, accumulated data being accumulated or just having been accumulated is deleted to make it impossible to read out the document data, thus accumulation of document data being suspended.

With this feature, accumulation of document data filed without requiring any specific input operation other than an operation for using a function of the copying machine 11 is suspended only by pressing the "undo" button in the operating section 23 in any of the steps P202 to P211, and for instance when an image with a higher degree of security is to be copied, it is possible to prevent the document data from being filed for using it again. Even if accumulation of document data has not been suspended by pressing the "undo" button in the operating section 23 of the copying machine 11, document data can be deleted (or accumulation thereof can be suspended) by inputting a user ID in the server 12.

Furthermore, in the server 12, the CPU 41 can fetch appended data for identifying document data to the document data so that the document data can easily be used as a file unit, and as the appended data, additional information such as a title appended to document data received from the PC 14 or a time of repeated output of the same document data may be fetched, or character data is coded by subjecting the document data to the OCR processing with keywords repeatedly used in sentences fetched and appended to accumulated document data.

Thus, document data accumulated in the infinite memory server 13 and Web IMS 16 can easily be identified according to the appended data.

In the server 12, because document data accumulated in the infinite memory server 13 and Web IMS 16 can easily be retrieved, a data base for storing therein appended data is divided for each user ID in the hard disk drive 43, and an address of the infinite memory server 13 and Web IMS 16 for accumulating, the document data therein is stored for each user ID appended to the document data, and the appended data fetched is stored in a column prepared for each type of appended data. Therefore, when the user requests reference to any document data by inputting the user ID, the CPU 41 in the server 12 reads out document data correlated to the user ID from the infinite memory server 13 and Web IMS 16 and appended data from the hard disk drive 43 according to the reference instruction and outputs for display to the display 44, and in this step, the CPU 41 prepares a display screen with the calendar view format 60 scrollable at a high speed or at a low speed when the scroll button 59 shown in FIG. 34 and FIG. 35 is pressed, also prepares the thumbnail image 61 obtained by contracting a header page of the document data, and outputs for display the thumbnail image 61 for each processing date (processing date and time information), and because of this feature, when it is desired to confirm contents of a document such as characters when retrieving, the selected document data can scrollably be displayed on the entire screen of the display 44 by clicking the mouse 47 on the thumbnail image 61 or pressing a section of the touch panel to be displayed. Furthermore, by selecting the retrieve button 64 in the display screen with the calendar view format 60 of the display 44, also other appended data can be displayed in a list form in the order of processing dates for each document, and further by selecting the screen-out button 65 and specifying input of processing dates in an arbitrary period of time or other appended data, it is possible to omit the thumbnail image 61 for unnecessary document data from the calendar view 60 or to display the corresponding thumbnail image 61 with a red color in an inverted mode, thus a number of documents to be checked being reduced.

Then when there is some desired document data and a user select the document data by selecting the data with a mouse or a touch panel and further by selecting the call button 62, the server 12 reads out the document data from the infinite memory server 13 (reacquires all the processed document data) and outputs for displayed the document data to the entire screen of the display 44, or send the document data together with appended data to the copying machine 11 to decode the document data with the image processor 29 and outputs for recording the decoded document data according to the appended data used for processing the images, so that a user can reproduce and acquire document data outputted when filed without carrying out an operation for inputting a processing condition. It should be noted that appended data used in processing of images may be inputted by a referring user from the operating section 23 of the copying machine 11. When reference to document data older than those accumulated in the infinite memory server 13 is instructed, the server 12 can execute the processing for reference to the accumulated document data by reading out an address of a service provider, a registration ID for each user ID, a password or the like from the non-volatile RAM incorporated therein, accessing the service provider on the Internet, sending an instruction for reference to the document data to the Web IMS 16. Also the server 12 can process the shared document data processing without input of any user ID, on the condition that a user ID used in the copying machine 11 is inputted, by regarding the shared ID in the copying machine 11 as a user ID to be used in reference and referring to the document data correlated with the user ID (shared ID).

As described above, in Embodiment 3 of the present invention, the same document data processed by the copying machine can easily be stored for management without requiring an operator to carry out any specific input operation by verifying the operator by way of checking a user ID read out from an IC card (and when a user ID can not be fetched, a shared ID is used and "Setting is not specified" for authorization of the operator) and automatically accumulated (filed) in the infinite memory server 13 on the Intranet, and further when the infinite memory server 13 becomes full, the server 12 can accumulate the document data in the Web IMS 16 on the Internet by making use of services provided by the service provider, so that a user can use the copying machine 11 without preparing an extremely large capacity storage unit for each user and also without being scared of data overflow. Then the user can have the document data transferred from the infinite memory server 13 and Web IMS 16 by instructing the processing for reference from the server 12 and reacquire the document data, for instance, by outputting for recording the document data to the copying machine 11.

In this step, by accumulating the processing conditions for document data processed by the copying machine 11 as appended data in correlation thereto, for instance when document data subjected to the copy processing can be retrieved and identified for output for recording again, a user can select desired document data by referring to the thumbnail image 61 according to the processing date and time or a keyword as appended data or screening out the thumbnail image 61 required to be authorized (a range of selection), and when the selected document data is to be processed again, for instance, by appending appended data such as a reduction ratio like the processing conditions for the copy processing to the document data and sending the document data to the copying machine 11, the filed document data can be reproduced with the same format without requiring an operator to carry out any specific operation for inputting a processing condition.

Because of this feature, a user can easily retrieve desired document data and can also process the document data with the same format skipping the processing sequence in the copying machine 11 or without requiring a user to carry out any specific operation for inputting a processing condition, which improves convenience in use.

As accumulation of document data can be suspended (a reading operation can be disabled) by pressing the "undo" button, it is possible to prevent data clearly not required to be filed or requiring security from be accumulated, and a trouble caused by automatically accumulating document data can be prevented.

As a first mode of Embodiment 3, although not shown herein, after one user ID is fetched, further another user ID can be inputted, and when a plurality of user IDs are appended as appended data, an address of or other appended are stored for each user ID in a database in the hard disk drive 43, so that, when common documents or the like are required in a conference or for circulation, each user can use the document data again by identifying the user ID.

As a second mode of Embodiment 3, termination of the processing by the same operator is detected by detecting an IC card set by an operator or passage of a specified period of time with a timer function, but a configuration is allowable in which the "Document Zoning" button is provided, and when a plurality of document are to be processed, each document is separated into several portions and sent to the server 12 by pressing the "Document zoning" button, and each divided portion of the document is accumulated as discrete document data in the infinite memory server 13 and Web IMS 16, so that each of the discrete document data can be referred to and used again.

A fourth mode of Embodiment 3, the server 12 may directly be connected to the copying machine 11, or incorporated in the copying machine 11. Furthermore, a buffer unit may directly be connected to the copying machine 11 to relay document data or the like to the server 12, and in that case, by directly accumulating the document data or the like in a large capacity storage unit through transferring the document data or the like through the Intranet, it is possible to accurately file the document data or the like without fail and without the document data or the like being lost on the Intranet even if any trouble occurs in a multi-functional box 15 or in the server 12. When taking into consideration the limitations concerning a site for installation, a degree of freedom is higher when the copying machine 11 and server 12 are connected through the Intranet, and in that case it is better from a viewpoint of reliability to directly connect a buffer unit to the copying machine 11.

Figure 36:
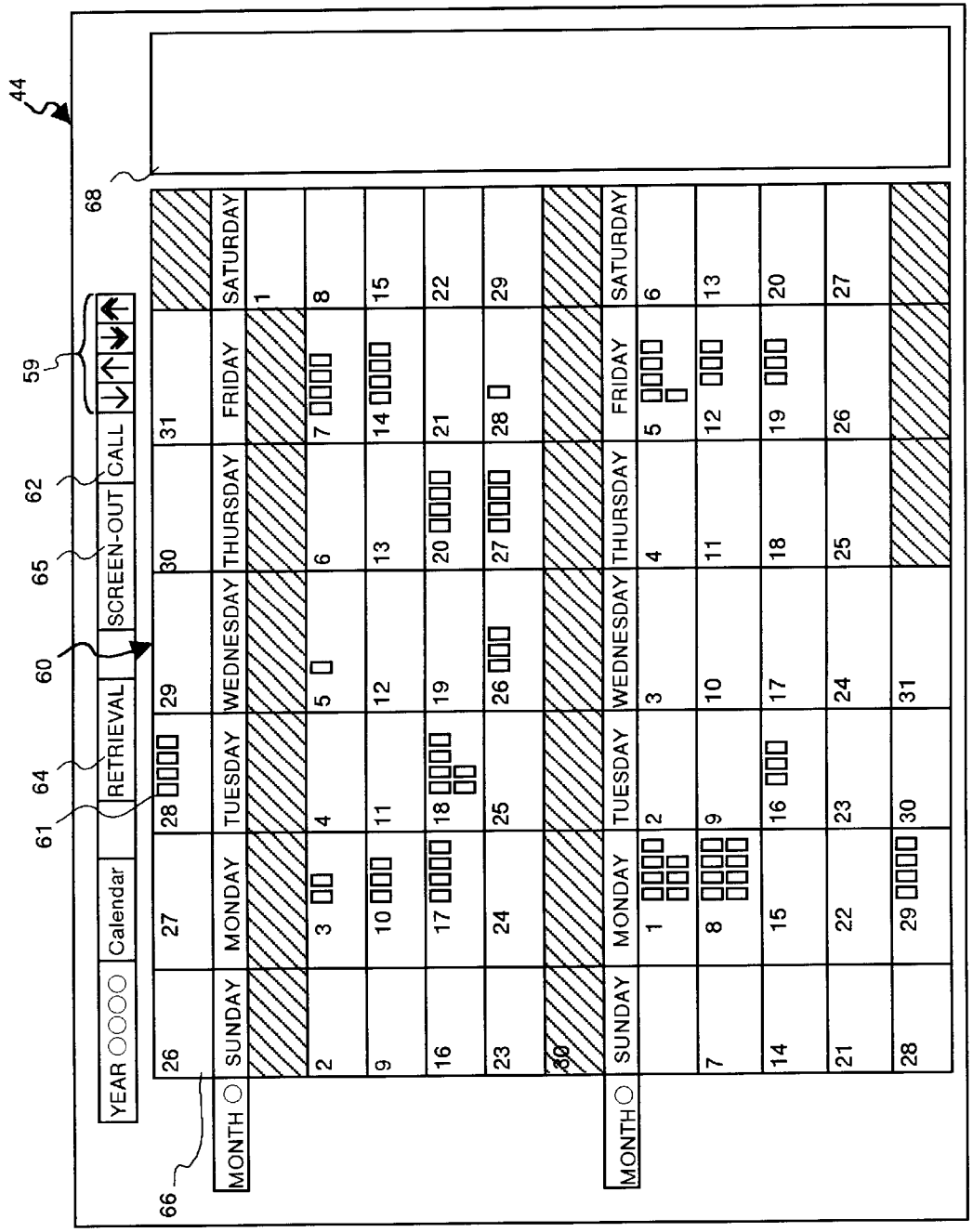
FIG. 36 is a view showing Embodiment 4 of the file system functioning according to a program in a recording medium according to the present invention, and also showing a display screen thereof.
Figure 37A:
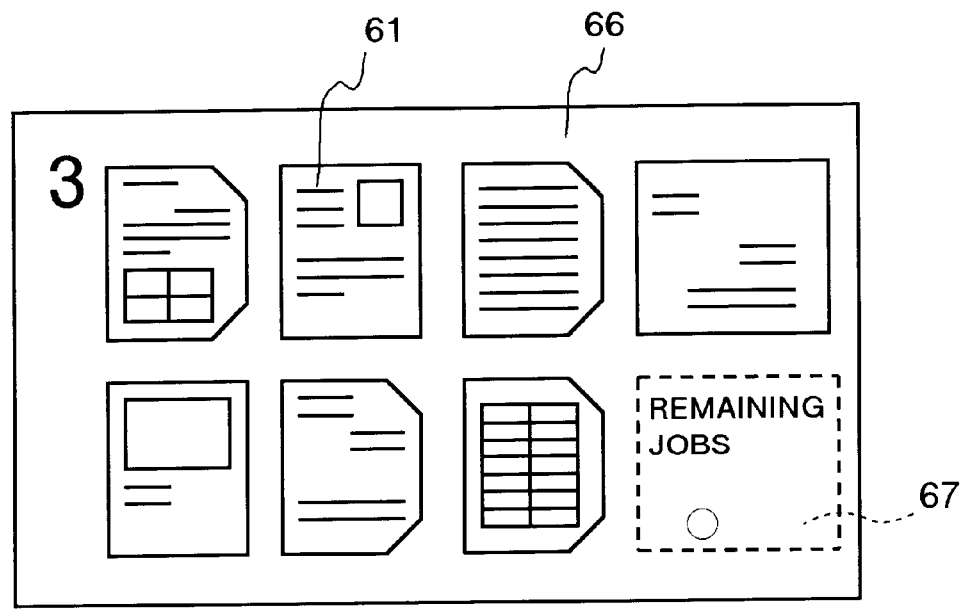
FIGS. 37A and 37B are partially enlarged views showing a display screen according to Embodiment 4.
Figure 37B:
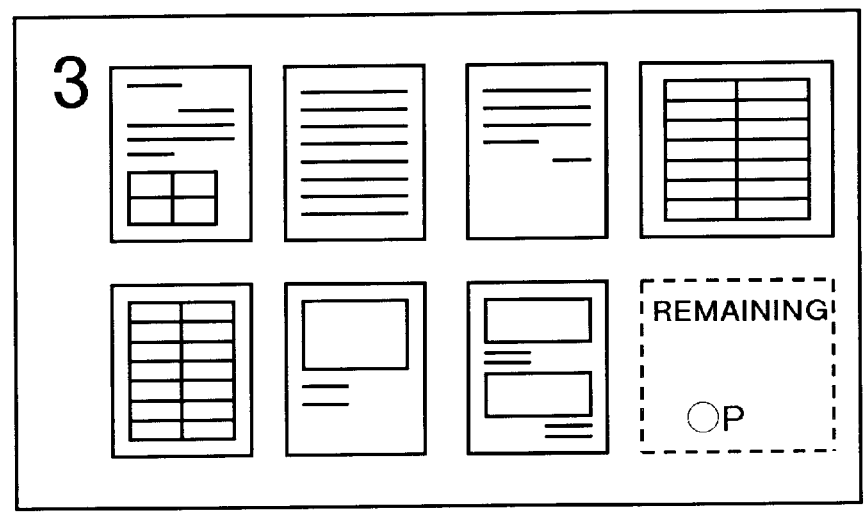

FIG. 36, FIG. 37A and FIG. 37B are views each showing Embodiment 4 of a file system functioning according to a program in a recording medium according to the present invention. As configuration of Embodiment 4 is basically the same as that in Embodiment 1, the same reference numerals are assigned to the same portions and description is made only for the characteristics portions with reference to FIG. 1 to FIG. 3.

In FIG. 36, FIG. 37A and FIG. 37B when it is impossible to display all of the thumbnail images 61 specified in the date column 66 of the calendar view 60 on the display section 22, the CPU 41 in the server 12 can display information concerning the thumbnail images 61 not displayed in the final area 67, and in Embodiment 4, thumbnail images 61 for 8 pages can be displayed, so that, as the thumbnail images 61, a header page of each of the document data as shown in FIG. 37A or each discrete page as shown in FIG. 37B, in a case where there is only one document data, can be displayed in the input column 68 by selecting a switch button not shown herein. In this step, when only the thumbnail image 61 for the header page is displayed in the date column 66 of the calendar view 60, the server 12 displaces the image 61 with the top and bottom corners lacked indicating that another page succeeds when the document data extends over a plurality of pages, shows a number of documents not displayed in the final area 67 when there are 9 or more documents and a portion of the document data can not be displayed, and also displays a number of pages not displayed in the final area 67 when there are 9 or more documents and a portion of the document data can not be displayed. In this server 12, the thumbnail image 61 for a header page of document data is displayed in the date column 66 of the calendar view 60 in the default mode.

Thus, in a case where there is only one document data, the thumbnail image 61 for all pages can be displayed and checked, and when there are a plurality of document data, a user can check other pages by efficiently checking each header page and clicking on the thumbnail image 61 according to the necessity. In this step, for checking the thumbnail image 61, for instance, thumbnail images 61 for clocked document data may be prepared for each page and displayed as if each page is turned, or a window is provided in other area of the date column 66 to display the thumbnail image 61 for the document data. Further, as a first page often includes a title of a transfer slip, a number of pages to be displayed may be set from the beginning according to the necessity so that contents of document data can easily be confirmed. Furthermore, document data extending over a plurality of pages can easily be determined because the thumbnail image 61 lacks the top and bottom corners, but the configuration is not limited to this one, and for instance, like in a copied document or a facsimile document, also other characteristics of document data may be displayed, and not only a display format but also a color of display may be changed.

When an instruction for input of a date for display in the input column 68 is not inputted, the CPU 41 in the server 12 displays the current data as a default condition in the final end of the right bottom column of the calendar view 60, and when a user inputs a date or a position for display from the input column 68, the CPU 41 can display the date at the final end, at a center, or at a right top header position.

Thus, it is possible to have the data processed before the latest processing date at maximum or to input the date when the document data was processed from a user's memory for confirming desired document data from a data before or after the inputted data.

As described above, in Embodiment 4, in addition to the effects achieved in Embodiment 3, a user can easily and accurately check and select contents of document data by having the thumbnail images 61 in the calendar view 60 according to the necessity, and also can easily use desired data already processed according to the necessity.

Figure 38:
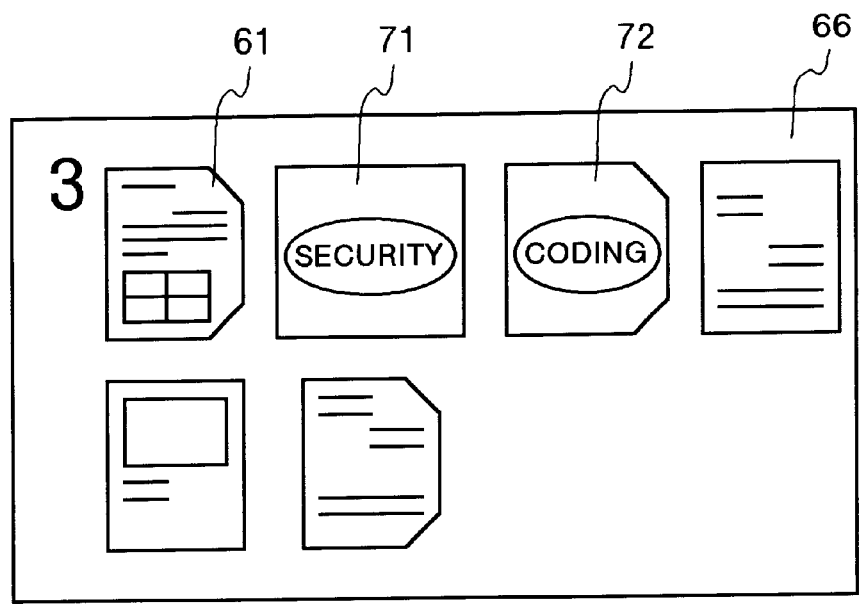
FIG. 38 is a view showing Embodiment 5 of the file system functioning according to a program in a recording medium according to the present invention, and is a partially enlarged view showing a display screen thereof.

FIG. 38 is a view showing Embodiment 5 of the file system functioning according to a program in a recording medium according to the present invention. Configuration of Embodiment 5 is basically the same as that of Embodiment 1, so that the same reference numerals are assigned to the same components and description is made herein only for the characteristic portions with reference to FIG. 1 to FIG. 3, FIG. 33 and FIG. 36.

In FIG. 38, the copying machine 11 has, in addition to the "undo" button provided in the operating section 23 to be pressed in any of the steps P202 to P211 in FIG. 23, a "Security" button for inputting a security instruction for allowing accumulation of document data to be processed and also insuring security for the document data, and a "Code" button for inputting a coding instruction, and the server 12 correlates, when the server 12 receives the document data together with the security instruction, the security instruction to corresponding document data in a database for each user ID and has the document data accumulated in the infinite memory server 13 and Web IMS 16, and correlates, when the server 12 receives a coding instruction, the coding instruction to the document data, encodes the document data according to a system specified according to the user ID and has the encoded document data accumulated in the infinite memory server 13 and Web IMS 16, displays a security mark (so-called the icon) 71 or a coding mark 72 in the calendar view 60 on the display 44, so that contents of the document data can not be seen by the other persons. When a password is not set for the user ID, input of the password is prompted when the "Security" button or "Code" button is pressed, and also when a user ID is not fetched and processing is to be executed according to a shared ID, input of the user ID is required to substitute the user ID with the shared ID.

Then, when the security mark 71 in the calendar view 60 is selected, if a password previously set in correlation to the user ID is inputted, the server 12 prepares and displays the thumbnail image 61 for the document data with the security instruction appended thereto, reads out the document data from the infinite memory server 13 and Web IMS 16, and sends the document data to the copying machine 11 or other sections, and when the coding mark 72 is selected, also if the password correlated to the user ID is inputted, the server 12 decodes the document data with the coding instruction appended thereto, prepares and displays the thumbnail image 61 for the document data to insure security for the document data with the security instruction or coding instruction appended thereto. It is needless to say that, contents of the coded document data can not be checked even if raw data is directly obtained from the infinite memory server 13 and Web IMS 16, so that security of the document data can be insured more readily. In addition to operations of the "Security" button or "Code" button in the operating section, it is possible to append a security instruction or a coding instruction to document data by inputting a user ID in the server 12.

As described above, in Embodiment 5, in addition to the effects achieved in Embodiment 4, a user can suspends accumulation of document data by pressing the "undo" button so that document data with a higher degree of security will not be filed and used again, but at the same can file and reuse even document data with a higher degree of security by inhibiting reuse by other persons.

Figure 39:
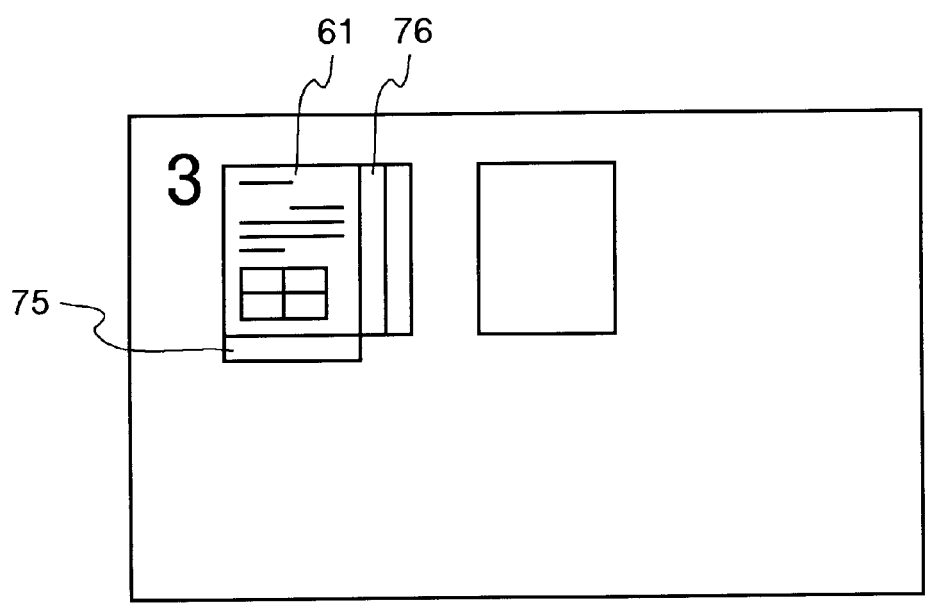
FIG. 39 is a view showing Embodiment 6 of the file system functioning according to a program in a recording medium according to the present invention, and is a partially enlarged view showing a display screen thereof.
Figure 40:
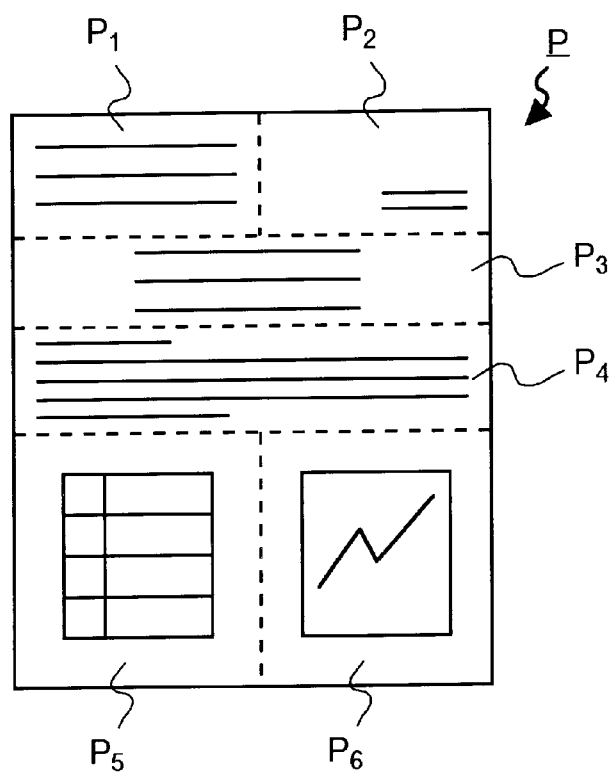
FIG. 40 is a view showing one example of processed document according to Embodiment 6.

FIG. 39 and FIG. 40 are views each showing Embodiment 6 of the file system functioning according to a program in a recording medium according to the present invention. Configuration of Embodiment 6 is basically the same as that of Embodiment 1, so that the same reference numerals are assigned to the same components and description is made herein only for the characteristic portions with reference to FIG. 1 to FIG. 3, FIG. 33 and FIG. 34.

In FIG. 39, the CPU 41 in the server 12 checks document data transferred from the copying machine 11 to examine whether the document data has any relation with the document data already accumulated in the infinite memory server 13 and Web IMS 16 in correlation to the same user ID in a database or not, and when it is determined that there is some relation between the two documents, the CPU 41 appends link information and relativity type information to both of the documents and accumulates the document data for management, and more specifically, when it is determined that the new document data (new document) is completely the same as other document data already accumulated (existing document), the CPU 41 only prepares a database, prepares and displays the thumbnail image 61 using the existing document data, and when checking appended data for one of the two documents, the CPU 41 displays the appended data for another document, so that a user can readily use the document again.

Furthermore, when it is determined that new document data is an updated document prepared by rewriting a portion of any existing document data, only document data for the updated area is accumulated in the infinite memory server 13 and Web IMS 16, and the thumbnail image 61 for the updated document data is prepared and displayed by replacing the thumbnail image 61 with a corresponding area for the existing document data, so that one thumbnail image 61 is displayed as a related image 75 in a layered form under and at the back of another thumbnail image 61, and in that case, a user can easily use the document data again by having the thumbnail image 61 and appended data displayed for confirmation, for instance, by clicking with a mouse. Furthermore, the new document data is for a related document having some relativity with any existing document data in the point, for instance, that a number of coincident keywords in the two document is more than a preset value, the thumbnail image for one document is displayed as a related image 76, for instance, in a layered form, in the right side to and at the back of the thumbnail image 61 for another document, and in that case a user can easily use the document data again by having the thumbnail image 61 and appended data displayed for confirmation, for instance, by clicking with a mouse.

When filing the same document, namely an updated document, wasteful use of the infinite memory server 13 and Web IMS 16 can be eliminated, and a number of document data which can be accumulated therein can be increased with the apparent file capacity enlarged. A form of display of the related images 75, 76 is not limited to a layered form, and they may be displayed in adjacent to each other side by side, so that the user can easily check the related images 75, 76.

Whether the new document data is completely same document data as any existing document data or one prepared by updating any existing document data can be confirmed by preserving image data in an image area together with character code data obtained by converting document data with the CPU 41 by way of subjecting the document data to the OCR processing for a certain period of time (for instance, one month) in the hard disk drive 43, comparing the new document data to any existing document data page by page or block by block in a page (in a case of image data, comparison is made by matching edges of new and old images, or block by block when document blocks p1 to p4 or image blocks p5, p6 are displayed in a document P as shown in FIG. 31), and for instance, if the block p4 is not coincident, the block p4 is regarded as updated data and accumulated for management. It should be noted that, as sometimes the OCR processing for document data can not be executed completely, in a case of document data consisting of only characters, when a number of characters, positions of periods and commas, a number of words (a number of spaces between characters in English sentences) in both documents are completely coincident to each other, it is determined that the two documents are completely coincident to each other, and in this step, if font size or colors specified for each character are different, or when any correction mark (a specific sign indicating correction) is included in the document, it may be determined that the new document data is updated document data.

Even if it is determined that the new document data is not the completely same as any existing document data nor update document data, when there are common keywords more than a specified number in both the new document data and existing document data, or when the titles of both document data are coincident to each other, the new document data is accumulated for management as related document data, and in this step the new document data may be regarded and accumulated as related document data, if it is determined by extracting important sentences in the two document data (according to the method described, for instance, in Japanese Patent Laid-Open Publication HEI 9-34905) that the key sentences are coincident to each other. Furthermore, in this step, key words not included in other document data correlated to the existing document data correlated to the new document data may be added so that the keywords extracted in the processed are appended as common keywords (so-called merging) and a user can retrieve the document data according to the keywords which is originally not included in the document data), and in that case, related document data can relationally be retrieved according to the added keywords, which improved efficiency in retrieval.

As described above, in Embodiment 6, in addition to actions and effects in Embodiment 3, it is possible to check presence of related documents such as the same document written again, an updated document as an updated "version", or those having the same theme and used at the same conference from thumbnail images 61 each having the same date in the calendar view 60, and also it is possible to have the documents displayed for checking and use the documents again without retrieving and checking document data having other date.

Correlation of document data is usually executed automatically, but may be executed (when not automated) by removing and piling up the thumbnail image 61 in the calendar 60 by way of operating the mouse 47 in the server 12 (so-called drag and drop) and registering the link information in the database for correlation, and even when a certain period of time has passed and the relativity becomes unclear, correlation may be executed by specifying appended data such as keywords and titles in each document data and displaying the appended data in a list (or outputting for recording), by displaying the document data side by side for comparison, or by displaying only different sections through the OCR processing, then registering the link information by way of drug and drop for correlation.

Figure 41:
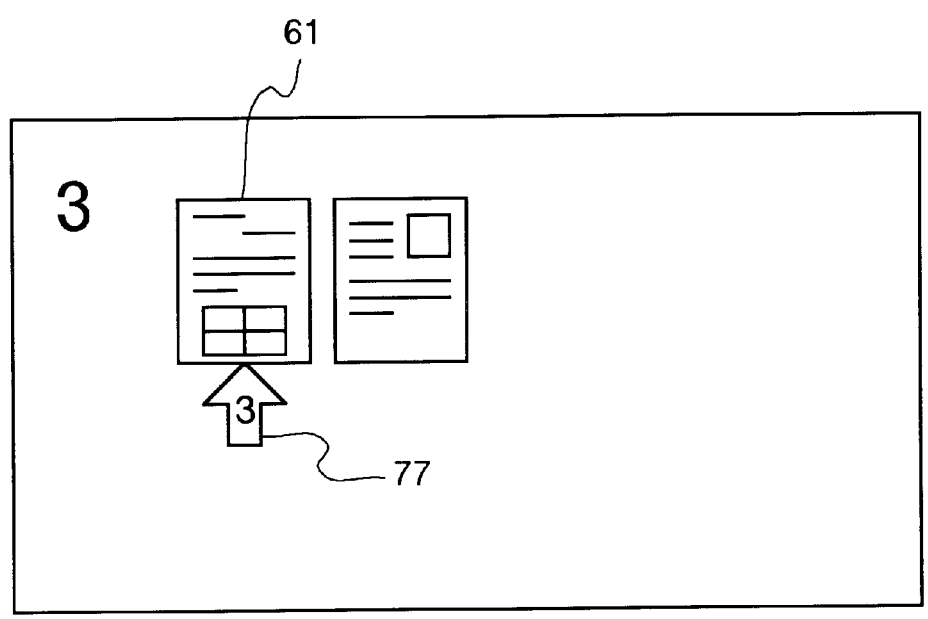
FIG. 41 is a partially enlarged view showing a display screen according to another mode of Embodiment 6.

In another mode of Embodiment 6, although related images (thumbnail images) 75, 76 are displayed in a layered form so that a user can check presence or contents of other related document data according to one date in Embodiment 6 described above, a configuration is allowable in which numbered arrow marks 77 each having a different color are assigned to the thumbnail images 61 according to the relativity types as shown in FIG. 41, or in that case the arrow marks 77 may be linked with different types of line to clarify positions of thumbnail images 61 for related document data.

Figure 42:
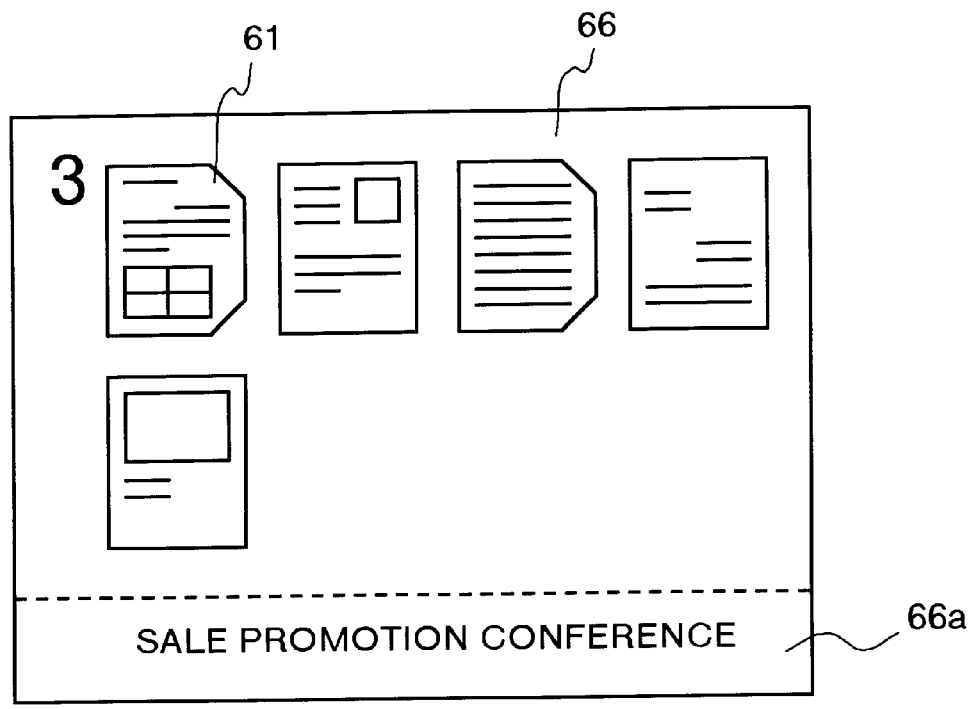
FIG. 42 is a view showing Embodiment 7 of the file system functioning according to a program in a recording medium according to the present invention, and is a partially enlarged view showing a display screen thereof.

FIG. 42 is a view showing Embodiment 7 of the file system functioning according to a program in a recording medium according to the present invention. As configuration of Embodiment 7 is basically the same as that in Embodiment 1, same reference numerals are assigned to the same components and description is made herein only for the characteristic portions with reference to FIG. 1 to FIG. 3, FIG. 33 and FIG. 34.

In FIG. 42, with the CPU 41 in the server 12, a user can input schedule of events executed on a fixed date such as conference or a travel into the date column 66 of the calendar view 60 displayed on the display 44 by inputting the user ID and operating the keyboard to register the processing date and time information having the date as appended data for the correlated document data in the database, and this event information is outputted for display in an area 66a under the thumbnail image 61, and in that case a user can find a date when desired document data was processed (for instance, one day before the conference), specify the document data having the date as appended data by clicking the corresponding thumbnail image 61 to use the document again. If it is necessary to obtain document data used in a series of conferences, the user selects the screen-out button 65 and inputs, for instance, "Sales promotion conference in Division xx" to have the corresponding thumbnail images 61 displayed in the calendar view 60 with a red color in the inverted mode so that the user can easily obtain desired document data.

When a user inputs the user ID, selects the thumbnail image 61 by clicking, and inputs an arbitrary date from the keyboard 46, the CPU 41 registers the date as processing date and time information to be treated preferentially over the processing date and time information in a database and display the thumbnail image 61 for the date information in the calendar view 60, and in that case a user can set and register a date and schedule for sue of the same date to easily obtain and use necessary document data. Also in this step, as described in Embodiment 2 above, by specifying a place for display such as a center or a left top header position together with a displayed data in the input column 68, a user can check thumbnail images 61 for document data to be used in the figure together with the schedule for use of the document data.

As described above, in Embodiment 7, in addition to actions and effects in Embodiment 3, a user can check and select thumbnail images 61 for document data according to the relativity information displayed together with a date for event, so that the user can easily obtain and use the desired document data.

Figure 43:
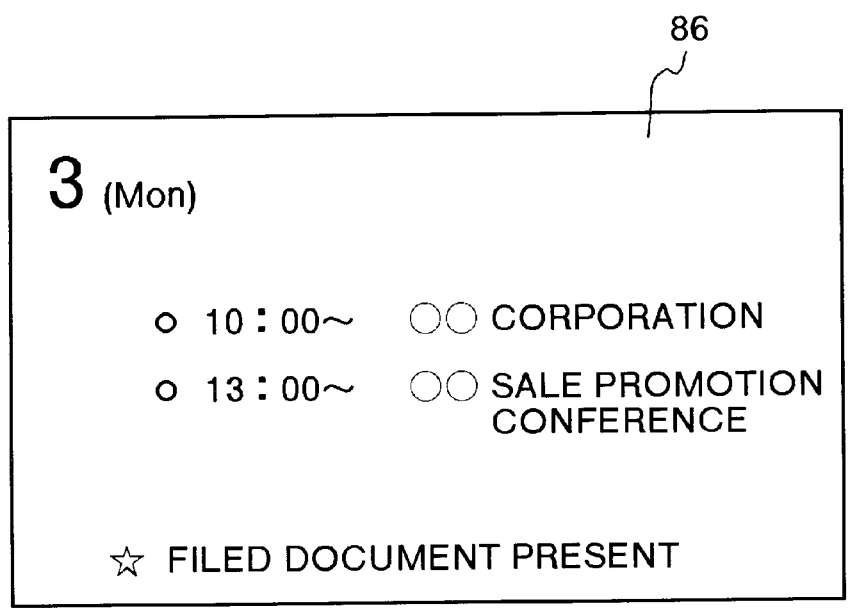
FIG. 43 is a view showing Embodiment 8 of the file system functioning according to a program in a recording medium according to the present invention, and is a partially enlarged view showing a display screen thereof.

FIG. 43 is a view showing Embodiment 8 of the file system functioning according to a program in a recorder according to the present invention. As configuration of Embodiment 8 is basically the same as that of Embodiment 1, so that the same reference numerals are assigned to the same components and description is made herein only for the characteristic portions with reference to FIG. 1 to FIG. 3, FIG. 33 and FIG. 34.

With the PC 14, a user can request the operations by the server 12 described in the Embodiments above by accessing the server 12 and executing an input operation, and in that case the server 12 returns image data prepared for display on the display of the PC 14 through the Intranet, so that user can visually check the same display screen with calendar view 60 also on the PC 14. Furthermore, the PC 14 can be used as a general PC, the PC 14 can function as a so-called scheduler for displaying the calendar view as shown in FIG. 36 on a display and outputting for display a schedule such as "Sale promotion conference in Division xx" inputted and managed by a user in the date column 66 with a schedule software downloaded to a hard disk drive not shown herein, and in that case, when a user starts the scheduler, inquires presence of any filed document, and also starts the program for registering the backup document on the schedule, the server 12 shows and registered the accumulation information of "Backup document is present" indicating presence of a newly filed document at the bottom of column for the processing data for management. Namely, in Embodiment 8, the PC 14 constitutes an output managing unit. It is needless to say that the server 12 may not have an operating system such as the display 44 or the like.

Thus, the PC 14 can be used as a scheduler, and also when a user wants to retrieve and obtain any specific document data and clicks on the accumulation information displayed on the processing date, the PC 14 sends a request for returning images (image data) in the calendar view 60 centering around the date to the server 12, and when the server 12 receives this request, the server 12 checks the user ID or other related data, prepares image data of the calendar view 60 for displaying the requested thumbnail images 61, and returns the image data to the PC 14, and then operations for preparing images and reading out and transferring document data to the infinite memory server 13 and Web IMS 16 like those executed by the server 12 can be carried out with the PC 14.

As described above, in Embodiment 8, in addition to the actions and effects in Embodiment 3, it is possible to screen out and selected desired document data according to a schedule in a scheduler usually used without requiring an operator for inputting a specific schedule for managing document data. Therefore, a user can easily use the desired document data. In addition, in this embodiment, even if a scheduler function is not used, the processing executed by the server 12 in the embodiments described above can be executed by a user's PC 14, so that the file system can conveniently be used.

Figure 44:
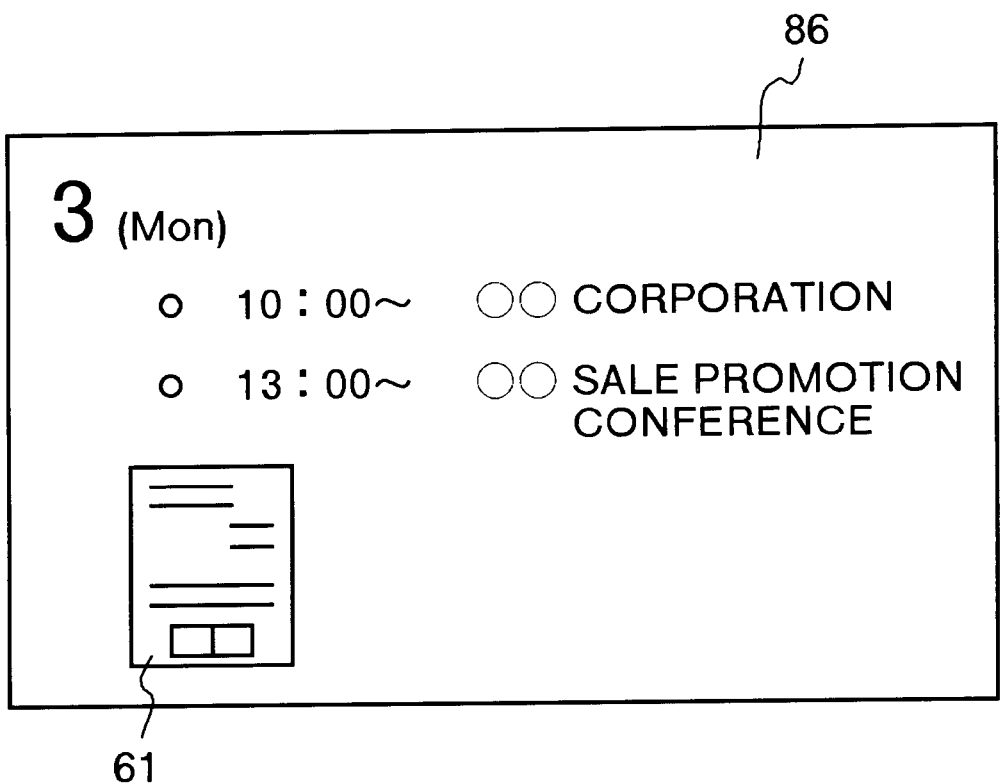
FIG. 44 is a partially enlarged view showing a display screen according to another mode of Embodiment 8.

As another mode of Embodiment 8, as shown in FIG. 44, when the scheduler adheres not only character data such as accumulation information but also image data in the date column 86 in a calendar view, the thumbnail images 61 for newly accumulated document data may be returned and registered in the PC for management. In this case, contents of document data can directly be checked by referring to the thumbnail images 61, so that a user can quickly obtain desired document data from the server 12.

Although the above description of Embodiment 8 assumes a case where each user has his or her user ID personally, Embodiment 8 can be applied without a problem in a case where the user ID is shared by people belonging to, for instance, the same business organization (division or department).

With the present invention, when data is processed by a processing system, more specifically when image data is read from a document with the copying function and is outputted for recording (copied) the processing condition can be accumulated together with the same processed data in a storage unit. The processed data accumulated in the storage unit can be read out and used according to the necessity, and for instance, when a copied document is lost, it is possible to output for recording the filed processed data and use the processed data again. In this step, for instance, a user can have a number of copies, size and orientation of a document, size and orientation of a paper displayed as processing conditions in the processing for copying and select processed data from the storage unit, and further the user can select processed data to be processed again by repeatedly specifying a processing condition according to the user's memory, screening out a range of selection, and checking contents of processed data in the range. Furthermore, for instance, a copy density, an image mode, a reduction ratio, post processing, double-sided copy, divided copy, integrated copy, printing while copying, or editorial copy can be inputted as a processing conditions for copying or appended to the processed data, so that the image can be reproduced according to the specified processing condition. In addition, by introducing the requirement that one processing condition is applicable to one processing, a memory space can effectively be used. Therefore, it is possible to easily retrieve desired processed data as well as to process the desired data with the same format as that in accumulation by easily inputting the same processing condition, and further it is possible to process the data with the same form as that specified in a accumulation without requiring an operator to carry out an operation for inputting any specific data. As a result, the convenience in use is largely improved.

Furthermore, by enabling accumulation of processed data in a storage unit without requiring a user to input data other than specifying desired data processing, it is possible to automatically file processed data regardless of whether accumulation is instructed by a user or not, and also to freely read out and process the accumulated processed data, so that the user is not required to carry out a filing work and can record or obtain again any document data even if the data is lost.

In addition, when processing data with a processing system, by inputting an accumulation suspend instruction, it is possible to suspend accumulation of processed data, and it is possible to prevent data clearly not required to be accumulated or data requiring security from being accumulated, and also to prevent the processed data from being accumulated automatically, which improves the convenience in use.

With the present invention, when data is processed by a processing system, more specifically when image data is read from a document with the copying function and is outputted for recording (copied) the processing condition can be accumulated together with the same processed data in a storage unit, and ID information used in retrieval or other related operations is correlated to the processed data, and when the processed data is completely or partially identical or similar to other process data, link information relating the other processed data to the newly processed data is correlated to the processed data. The processed data in the storage unit can be outputted to the processing site to be processed therein by reading out all of or a portion of the processed data or ID information for the processed data for display and selection, and when this selection is made, it is possible to easily select and check also other related data by displaying relativity indicated by the link information together with a portion of the processed data or ID information for the processed data. Thus, it is possible to file and store for management processed data to be processed without requiring a user to carry out a filing work, and for instance, it is possible to easily obtain desired processed data again even if a copied document or the like is lost, and also to easily retrieve and use other related processed data.

In this step, when it is determined that newly processed data to be accumulated anew is the same as any existing processed data, the newly processed data itself is not accumulated, ID information for the newly processed data is appended to the existing processed data, and the existing processed data is accumulated and used again as the newly processed data. When it is determined that the newly processed data was obtained by updating a portion of any existing processed data, only updated data for the updated portion is accumulated, and the newly processed data is used again after a portion of the existing processed data is substituted with the updated data and restored. Thus, wasteful consumption of a storage capacity by the same data can be suppressed, and an apparent file capacity can be enlarged.

When the newly processed data is correlated to any existing processed data because of coincidence of some keywords, the keywords are additionally appended to other processed data correlated to the existing processed data, so that the correlation is extended also to other processed data having similar contents not extracted according to the keywords, and a user can easily retrieve and select other related processed data according to the keywords.

Further by enabling correlation of processed data by inputting required data from an operating unit, it is possible to correlate other related processed data not satisfying any of the conditions described above, and also to easily retrieve and select related processed data.

With the present invention, when processed data is processed by a processing system, namely when, for instance, image data is read from a document with the copying function and is outputted for recording (copying), it is possible to append ID information such as processing date and time information (indicating date of processing for accumulation or a date schedule to use the processed data) and accumulate the processed data in a storage unit. Processed data in the storage unit can easily be selected, according to the necessity, by having contracted images or accumulation information according to a sequence of processing date and time at corresponding positions in a dedicated screen or a calendar screen of a scheduler, and also can be outputted to a processing site such as a processing system for processing therein. In this step, if a conference or the like can be displayed on the calendar screen, it is possible to screen out contracted images for the processed data according to the relativity and to easily select desired processed data. Thus, it is possible to file processed data to be processed for management without requiring a user to carry out a filing work, and a user can easily select the processed data, have the processed data outputted for recording, and obtain and use the processed data.

Furthermore, when there is any relativity between processed data with the contracted images thereof displayed on the calendar screen, it is possible to easily confirm a contracted image for the related processed data and to easily select the desired processed data by having related images such as lines connecting the contracted images to each other or arrow marks or the contract images in a layered form side by side.

Furthermore, it is possible to screen out and confirm contracted images for processed data and to easily select desired processed data by screening out processed data, for which contracted images are to be displayed on the calendar screen, according to, for instance, common ID information, and having the contracted images so that a user can easily differentiate the images from those for not-desired ones.

Furthermore, by displaying contracted images for processed data to be displayed on the calendar screen, when the processed data extends over a plurality of pages, so that all pages or an arbitrary portion of the processed data can easily be discerned according to the display color or display format. In addition, a current or inputted data can be displayed at a final end, a header, or a central point of the calendar screen, so that a user can easily select and use again desired processed data by having as many contracted images for data processed in the past as possible displayed or by having also processed to be used in the future displayed together with the data above.

When a security degree of processed data to be accumulated is high, by having only the security mark or code mark displayed on the calendar screen and at the same time by preventing the processed data from being read out so long as a user does not input a password when using the data again, it is possible to prevent processed data from being exposed as a contracted image to, read and used by other persons, and a security of processed can readily be raised by encoding the processed data in accumulation.

This application is based on Japanese patent applications No. HEI 9-313051, No. HEI 9-313055 and No. HEI 9-313056 filed in the Japanese Patent Office on Nov. 14, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A file system comprising:
   a storage unit for storing data therein connected to a processing unit;
   said processing unit having at least one of a copying function for reading an image data and output for recording on a paper, a transfer function for receiving and transmitting image data or character data through a communication line, and a recording function for recording the received image data or character data onto a paper and processing the data with these functions;
   a accumulation managing unit for accumulating the same data processed by said functions in said storage unit;
   wherein the accumulation managing unit fetches, together with data processed by said functions, processing conditions for the processed data, correlates the data to the processing conditions, and accumulates the correlated data and processing conditions in said storage unit.

2. A file system according to claim 1 comprising:
   an output managing unit for reading the processed data accumulated in said storage unit upon input of a processing instruction and outputting the read-out data;

an operating unit for inputting instructions;

a display unit for displaying the data;

wherein said output managing unit reads out at least the processing conditions accumulated in said storage unit according to a processing instruction inputted using said operating unit and outputs the processing conditions to said display unit, further reads outs at least processed data corresponding to the processing conditions accumulated in the storage unit, and outputs the processed data to a processing site.

3. A file system according to claim 1 comprising:

an output managing unit for reading the processed data accumulated in said storage unit upon input of a processing instruction and outputting the read-out data;

wherein the output managing unit reads out processed data correlated to processing conditions specified simultaneously or processing conditions correlated to the processed data stored in said storage unit according to a processing instruction inputted using said operating unit and outputs the processed data and processing conditions to said display unit, and also reads outs at least corresponding processed data in said storage unit selected using said operating unit and outputs the processed data to a processing site.

4. A file system according to claim 1 wherein at least one of a number of copies to be obtained through a copying operation, size and orientation of a document, and size and orientation of a paper is obtained as the processing conditions.

5. A file system according to claim 1 wherein at least one of a copy density in copying, an image mode, a size change ratio, post-processing, copying on both the sides of a paper, divided copy, integrated copy, printing while copying, edited copy is obtained as the processing condition.

6. A file system according to claim 1 wherein said accumulation managing unit has the processing conditions for processing to process data extending over a plurality of pages accumulated in said storage unit.

7. A file system according to claim 1 wherein said accumulation managing unit has the same data processed by said functions automatically accumulated in said storage unit regardless of whether an accumulate instruction has been inputted or not.

8. A file system according to claim 1 wherein said accumulation managing unit cancels accumulation of the processes data, when an accumulation abort order is inputted before or during the operation for accumulating the same data processed by said functions in said storage unit.

9. A recording medium with a program used by a central processing unit connected to or incorporated in a processing unit having at least one of a copying function for reading image data and recording on a paper, a transfer function for receiving and transmitting image data or character data through a communication line, and a recording function for receiving the received image data or character data onto a paper and processing data with these functions;

wherein a program for making the central processing unit execute the processing for sending the same data processed by said processing unit to a storage unit for accumulation therein and also for fetching processing conditions for processed data, correlating the processed data to the processing conditions and accumulating the processed data and processing conditions in said storage unit is recorded in said recording medium so that said central processing unit can read out the program.

10. A recording medium according to claim 9 wherein a program for making the central processing unit execute the processing for reading out upon input of a processing instruction at least processing conditions accumulated in said storage unit and outputting the read processing conditions for display or for reading out and outputting for display processed data correlated to the processing conditions simultaneously specified or processing conditions correlated to the processed data, reading out processed data selected from the display from said storage unit and outputting to a processing site is stored in said recording medium so that said central processing unit can read out the program.

11. A recording medium according to claim 9 wherein a program for making said central processing unit execute the processing for accumulating the same processed data processes by said functions in said storage unit regardless of whether an accumulate instruction has been inputted into the central processing unit or not is recorded in said recording medium so that said central processing unit can read out the program.

12. A recording medium according to claim 9 wherein the processing for canceling accumulation of the processed data when an accumulation abort order is inputted before or during the operation for accumulating the processed data and processing conditions in said storage unit is incorporated in the program to be executed by said central processing unit and the program is recorded in said recording unit so that said central processing unit can read out the program.

13. A file system comprising:

a storage unit for storing data therein connected to a processing unit;

said processing unit having at least one of a copying function for reading an image data and output for recording on a paper, a transfer function for receiving and transmitting image data or character data through a communication line, and a recording function for recording the received image data or character data onto a paper and processing the data with these functions;

an accumulation managing unit for accumulating the same data processed by said functions in said storage unit; and an output managing unit for reading the processed data from said storage unit selected upon input of a processing instruction and outputting the read-out data to a processing site;

wherein the accumulation managing unit comprises an information fetching unit for fetching ID information for identifying processed data to be accumulated in said storage unit, and a relativity determining unit for determining whether the processes data accumulated in said storage unit is correlated to each other or not, and correlates link information to each of the processed data determined as relating as well as to the ID information for accumulation in said storage unit; and said output managing unit comprises a display unit for outputting at least a portion of the processed data from said storage unit or ID information for the processed data, and an operating unit for selecting the displayed processed data or ID information to input a processing instruction for the processed data, and correlates link information to the processed data and selectably outputting the link data and processed data for display.

14. A file system according to claim 13 wherein, when it is determined by said relativity determining unit that new processed data to be newly accumulated in a storage unit is the same as the processed data already accumulated in said storage unit, then said accumulation managing unit does not accumulate the newly processed data and correlates the ID information to the newly processed data.

15. A file system according to claim 13 wherein said accumulation managing unit accumulates, when it is determined by said relativity determining unit that newly processed data accumulated in said storage unit is those obtained by updating a portion of previously processes data already stored in said storage unit, only update data for the updated portion of the newly processed data, and at the same time, said output managing unit processes updated data in said storage unit as newly processed data by substituting the updated data with a corresponding section of the previously processed data correlated to link information.

16. A file system according to claim 13 wherein said accumulation managing unit fetches at least one of a keyword extracted by an information fetching unit from processed data as ID information for the processed data, appended information appended to processed data, and an important sentence extracted from the processed data and correlates the ID information to the processed data to be accumulated in said storage unit, and correlates link information to each of processed data to be accumulated in said storage unit when it is determined by said relativity determining unit that a number of keywords more than a preset value are identical, appended information is identical, or the important sentence is identical between processed data to be accumulated in said storage unit.

17. A file system according to claim 16 wherein said accumulation managing unit adds the identical keyword to other processed data correlated with the same or different link information from that to processed data correlated because of coincidence of the keyword.

18. A file system according to claim 13 wherein said accumulation managing unit correlates the link information to the processed data to be accumulated for management in said storage unit upon an input operation from said operating unit.

19. A recording medium with a program used by a central processing unit connected to or incorporated in a processing system having at least one of a copying function for reading image data and recording onto a paper, a transfer function for receiving and transmitting image data or character data through a communication line, and a recording function for recording the received image data or character data on a paper and processing data with these functions;

wherein a program for executing either the processing for sending same processed data processed by said processing unit to a storage unit for accumulation therein, fetching ID information for identifying the processed data and correlating the ID information to the processed data, determining whether the processed data to be accumulated in said storage unit are related to each other or not, and correlating link information for each of the processed data when it is determined that the processed data is related to each other, or the processing for reading out data from said storage unit upon input of a processing instruction, outputting for display at least a portion of the processed data or ID information for the processed data on a display unit connected to said central processing unit, outputting the processed data selected with a selecting unit from said storage unit and outputting the selected processed data to a processing site correlates the processed data each with link information correlated thereto upon input of the processing instruction and selectably outputting the processed data is recorded in said recording medium so that said central processing unit can read out the program.

20. A recording medium according to claim 19 wherein a program for executing, when it is determined that newly processed data to be accumulated anew in said storage unit is the same as the processed data already accumulated therein, the processing for correlating the ID information to the processed data without accumulating the newly processed data in said storage unit is recorded in said recording medium so that said central processing unit can read out the program.

21. A recording medium according to claim 19 wherein a program for executing either one or both of the processing for accumulating, when it is determined that the newly processed data to be accumulated anew in said storage unit is those obtained by updating a portion of processed data previously accumulated, only updated data for an updated portion of the newly processed data in said storage unit and the processing for substituting the updated data in said storage unit with a corresponding portion of the processed data already accumulated and correlated to the link information to generate newly processed data is recorded in said recording medium so that said central processing unit can read out the program.

22. A recording medium according to claim 19 wherein a program for fetching as ID data at least one of a keyword extracted from the processed data, appended information appended to the processed data, or an important sentence extracted from the processed data and accumulating the fetched data in said storage medium and also correlating link information to each of processed data accumulated in said storage medium when a number of keywords more than a specified number are identical to each other, when the appended information are identical to each other, or when the extracted sentences are identical to each other between the processed data accumulated in said storage unit is recorded in said recording medium so that said central processing unit can read out the program.

23. A recording medium according to claim 22 wherein a program for simultaneously executing, in the processing for correlating link information to each of the processed data, the processing for appending same keyword as appended data to the processed data correlated thereto because of identity of the keyword or other processed data correlated thereto with the same or different link information is recorded in said recording medium so that said central processing unit can read out the program.

24. A file system comprising:

a storage unit for storing data therein connected to a processing unit;

said processing unit having at least one of a copying function for reading an image data and output for recording on a paper, a transfer function for receiving and transmitting image data or character data through a communication line, and a recording function for recording the received image data or character data onto a paper and processing the data with these functions;

an accumulation managing unit for accumulating the same processed data processed by said functions in said storage unit; and an output managing unit for reading processed data accumulated in said storage unit upon input of a processing instruction and outputting the read data;

wherein said accumulation managing unit comprises an information fetching unit for fetching at least processing data information for the processed data as ID information for identifying processed data to be accumulated in said storage unit, and append the ID information to and accumulated the processed data in the storage medium, and on the other hand, said output managing unit comprises a contracted image forming unit for displaying processed data in the storage unit in a contracted form on a screen of a display unit and a calendar screen forming unit for displaying a calendar screen corresponding to the current or inputted date and time information, and reads the processed data corresponding to a contracted image selected by outputting for display a contracted image of the processed data read out from said storage unit on a position corresponding to the processing data on the calendar screen of said display unit and outputs the process data to a processing site.

25. A file system according to claim 24 wherein said output managing unit outputs for display contracted image of all or a portion of the processed data, when the process data extends over a plurality of pages, according to a processing instruction inputted from an operating unit, or according to a number of pages of the processed data, on the calendar screen of said display unit.

26. A file system according to claim 25 wherein said contracted image forming unit outputs for display the contracted images in a form where user can determine whether the contracted images are for all of the pages or a portion of the pages on a calendar screen of said display unit.

27. A file system according to claim 24 wherein said calendar screen forming unit displays the calendar screen on said display unit so that a data corresponding to the current or inputted date and time information is positioned at the final end.

28. A file system according to claim 24 wherein said calendar screen forming unit displays the calendar screen on said display unit so that a date corresponding to the current or inputted date and time information is positioned at a middle point or at the head.

29. A file system according to claim 24 wherein said accumulation managing unit has an event fetching unit for fetching an event to be executed according to a date, and accumulates the event information as ID information for identifying processed data to be accumulated in said storage unit to the processed data and accumulate the event information in said storage unit, and on the other hand, said output managing unit outputs for display the event information together with a contracted image for the processed data read out from said storage unit on a position of the corresponding data on the calendar screen of said display unit.

30. A file system according to claim 24 further comprising:

a scheduler function for displaying a calendar screen according to current or specified date and time information on a screen of said display unit, managing schedule information with a schedule of programs to be executed on the date inputted therein, and displaying the schedule information at a position for the corresponding date on the calendar screen;

wherein said output managing unit outputs for display, according to a processing instruction inputted from said operating unit, a contracted image for the processed data read out from said storage unit at a position for the processing data on the calendar screen displayed by the scheduler function on said display unit and outputs the processed data to a processing site.

31. A file system according to claim 24 further comprising:

a scheduler function for displaying a calendar screen corresponding to current or specified date and time information on a screen of a display unit, managing schedule information with a schedule of programs to be executed on the date inputted therein, and displaying the schedule information at a position for the corresponding data on the calendar screen;

wherein said output managing unit executes the processing for outputting the processed data corresponding to the date and time information in turn corresponding to the accumulated information selected by outputting for display the accumulated information indicating accumulation of processed data in said storage unit at a position for the processing data on the calendar screen on said display unit by the scheduler function.

32. A file system according to claim 24 wherein said information fetching unit fetches at least one or more of, in addition to processing date and time information for processed data as ID information for the processed data, a keyword extracted from the processed data, appended data appended to the processed data, times of output of the processed data selected and outputted by said output managing unit, operator information for said processing unit, or conditions for processing by said processing unit, and appends the ID information to processed data accumulated by said accumulation managing unit in said storage unit; and said output managing unit has a data retrieving unit for retrieving processed data having shared ID information from said storage unit, retrieves processed data with ID information inputted using said operating unit correlated thereto with the data retrieving unit from said storage unit, and displays for output only contracted images in the processed data with a format different from contracted images in other processed data on a calendar screen on said display unit.

33. A file system according to claim 24 wherein said accumulation managing unit accumulates, when a security instruction for the same processed data processed by the function is inputted, correlated the processed data to a password for each operator information fetched by said information fetching unit and accumulates the processed data in said storage unit; and said output managing unit makes, in a case of processed data with a password correlated thereto, the contracted image preparing unit prepare a security mark indicating the operator's duty to keep promise and outputs for display the security mark on a calendar screen on said display unit, and also when the password is inputted, prepares and displays a contracted image of the processed data and outputs the contracted image to a processing site.

34. A file system according to claim 24 wherein said accumulation managing unit has a coding unit for coding data, and correlates, when a coding instruction for the same processed data processed by the function is inputted, the processed data coded by said coding unit to a password for each operator information fetched by said information fetching unit and accumulates the processed data in said storage unit, and said output managing unit makes, in a case of processed data with a password correlated thereto, said contracted image preparing unit prepare a coded mark indicating execution of coding in place of generating a contracted image and outputs for displays the coded mark on a calendar screen of said display unit, and when the password is inputted, decodes the processed data and prepares and displays a contracted image thereof or outputs the processed data to a processing site.

35. A file system according to claim 24 wherein said accumulation managing unit has a correlation fetching unit for fetching correlation of processed data to be accumulated in said storage unit and, when correlation between processed data to be accumulated in the storage unit is fetched, appends link information for each correlating processed data to the processed data, and said output managing unit makes said contracted image preparing unit prepare a correlating image indicating correlation between processed data with link information appended thereto and outputs for displays a correlating image correlating other processed data correlated to the processed data together with a contracted image for the processed data on a calendar screen on said display unit.

36. A file system according to claim 35 wherein said contracted image preparing unit prepares an image linking contracted images for processed data each with ink information appended thereto as a correlating image.

37. A file system according to claim 35 wherein said output managing unit selectably outputs for display a contracted image of the processed data with link information with link information relating to the processed data appended thereto under or adjacent to a contracted image of processed data to be outputted for display, as a correlated image, at a position corresponding to the processing data in a calendar screen of said display unit using a contracted image of processed data prepared by said contracted image preparing unit.

38. A recording medium with a program used by a central processing unit connected to or incorporated in a processing unit having at least one of a copying function for reading image data and recording on a paper, a transfer function receiving and transmitting image data or character data through a communication line, and a recording function for recording the received image data or character data onto a paper and processing data with these functions;

wherein a program for executing either one or both of processing for sending the same processed data processed by said processing unit to a storage unit to accumulate the processed data therein and also fetching and appending at least processing data information as ID information for identifying the processed data, and processing for outputting for display a calendar screen corresponding to the current or inputted data information on a display unit connected to a central processing unit, reading out processed data upon a processing instruction from inside of the storage unit to prepare a contracted image for the processed data, and outputting for display the contracted image at a position corresponding to the processing data on the calendar screen, and then reading out processed data corresponding to the selected contracted image from the storage unit and outputted the processing data to a processing site is recorded in said recording medium so that said central processing unit can read out the program.

39. A recording medium according to claim 38 wherein a program for executing the processing for positioning display of the calendar screen at the end, the head, or the intermediate point of a date corresponding to the current or inputted data information is recorded in said recording medium so that said central processing unit can read out the program.

40. A recording medium according to claim 38 wherein a program for executing either one or both of processing for fetching event information on an event executed according to a date as the ID information, correlating the event information to processed data, and accumulated the event information in said storage unit, and processing for outputting for display the event information together with a contracted image for processed data on a calendar screen on said display unit is recorded in said recording medium so that said central processing unit can read out the program.

41. A recording medium according to claim 38 wherein a program for outputting for display, during execution of a program for displaying a calendar screen corresponding to the current or inputted data information on said display unit connected to said central processing unit and also managing schedule information with events to be executed according to date and time inputted therein to display the schedule information at corresponding dates in the calendar screen, a contracted image of processed data at a position corresponding to the processed data in the calendar screen to eliminate the necessity of preparing a dedicated calendar screen is recorded in said recording medium so that said central processing can read out the program.

42. A recording medium according to claim 38 wherein a program for outputting for display, during execution of a program for displaying a calendar screen corresponding to the current or inputted data information on said display unit connected to said central processing unit and also managing schedule information with events to be executed according to date and time inputted therein to display the schedule information at corresponding dates in the calendar screen, accumulation information indicating accumulation of processed data at a position corresponding to the processing data in the calendar screen and also outputting processed data corresponding to the date and time information according to the selected accumulation information is recorded in said recording medium so that said central processing can read out the program.

43. A recording medium according to claim 38 wherein a program for executing the processing of retrieving processed data with ID information inputted from said operating unit correlated thereto from said storage unit and displaying only a contracted image of the processed data or in some cased with a format different from a contracted image of other processed data in the calendar screen of said display unit is recorded in said recording medium so that said central processing unit can read out the program.

44. A recording medium according to claim 38 wherein a program for executing either one or both of the processing for having, when a security instruction for the same processed data as those processed by the function is inputted, the processed data correlated to a password for each fetched operator information and accumulated in said storage unit, and the processing for outputting for display, when a contracted image of processed data is outputted for display and the processed data has a password correlated thereto, a security mark indicating the duty of keeping the secret in place of the contracted image, and further preparing for display or outputting to a processing site, when the security mark is selected and the password is inputted, a contracted image of the processed data is recorded in said recording medium so that said central processing unit can read out the program.

45. A recording medium according to claim 38 wherein a program for executing either one or both of the processing for coding, when a coding instruction for the same processed data processed by the function is inputted, the processed data and correlating the processed data password for each fetched operator information to accumulate the processed data in said storage unit, and the processing for displaying for output, when a contracted image for processed data is outputted for display and a password is correlated to the processed data, a coding mark indicating that coding was executed in place of the contracted image in a calendar screen of said display unit, and also for decoding the processed data, when the coding mark is selected and the password is inputted, to prepare for display a contract image for the processed data or output the processed data to a processing site is recorded in said recording medium so that said central processing unit can read out the program.

46. A recording medium according to claim 38 wherein a program for executing either one or both of the processing for fetching relativity between processed data accumulated in said storage unit and appending link information to each related processed data and the processing for preparing a correlation image showing correlation between the processed data each with the link information appended thereto and outputting for display the correlation image together with a contracted screen for processed data in a calendar screen of said display unit is recorded in said recording medium so that said central processing unit can read out the program.

* * * * *